US010834643B2

(12) United States Patent
Park et al.

(10) Patent No.: US 10,834,643 B2
(45) Date of Patent: *Nov. 10, 2020

(54) PER PACKET FLOW V2X SERVICE IN A WIRELESS NETWORK

(71) Applicant: Ofinno, LLC, Reston, VA (US)

(72) Inventors: Kyungmin Park, Herndon, VA (US); Esmael Dinan, McLean, VA (US)

(73) Assignee: Ofinno, LLC, Reston, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/551,009

(22) Filed: Aug. 26, 2019

(65) Prior Publication Data

US 2019/0380069 A1 Dec. 12, 2019

Related U.S. Application Data

(63) Continuation of application No. 15/796,286, filed on Oct. 27, 2017, now Pat. No. 10,397,836.

(Continued)

(51) Int. Cl.
*H04W 36/00* (2009.01)
*H04W 36/36* (2009.01)
*H04W 4/40* (2018.01)
*H04W 4/46* (2018.01)
*H04W 76/14* (2018.01)
(Continued)

(52) U.S. Cl.
CPC ... *H04W 36/0044* (2013.01); *H04W 36/0016* (2013.01); *H04W 36/0022* (2013.01); *H04W 36/0072* (2013.01); *H04W 36/36* (2013.01); *H04W 4/40* (2018.02); *H04W 4/46* (2018.02); *H04W 4/70* (2018.02); *H04W 28/0268* (2013.01); *H04W 36/00* (2013.01);
(Continued)

(58) Field of Classification Search
CPC ......... H04W 36/0044; H04W 36/0072; H04W 36/0022; H04W 36/36; H04W 36/0016; H04W 36/00; H04W 84/005; H04W 28/0268; H04W 4/70; H04W 36/08; H04W 76/14; H04W 4/46; H04W 4/40; H04W 36/0033
See application file for complete search history.

(56) References Cited

U.S. PATENT DOCUMENTS

2017/0099624 A1 4/2017 Baghel
2017/0280325 A1 9/2017 Xu
(Continued)

OTHER PUBLICATIONS

3GPP TS 36.300 V14.0.0 (Sep. 2016); Technical Specification; 3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 14).

(Continued)

*Primary Examiner* — Jaime M Holliday
(74) *Attorney, Agent, or Firm* — David Grossman; Kavon Nasabzadeh; Philip Smith

(57) ABSTRACT

A first base station receives a handover request. The handover request indicates for each packet flow of packet flows of a wireless device: whether the packet flow is for at least one V2X service; and a quality-of-service indicator of the packet flow. A determination is made whether to accept each packet flow of the packet flows based on whether the packet flow is for the at least one V2X service. The first base station sends an indication of an acceptance or rejection of each packet flow of the packet flows.

20 Claims, 20 Drawing Sheets

Related U.S. Application Data

(60) Provisional application No. 62/413,820, filed on Oct. 27, 2016, provisional application No. 62/413,824, filed on Oct. 27, 2016, provisional application No. 62/413,832, filed on Oct. 27, 2016, provisional application No. 62/413,835, filed on Oct. 27, 2016.

(51) Int. Cl.
  *H04W 36/08* (2009.01)
  *H04W 4/70* (2018.01)
  *H04W 28/02* (2009.01)
  *H04W 84/00* (2009.01)

(52) U.S. Cl.
  CPC ........ *H04W 36/0033* (2013.01); *H04W 36/08* (2013.01); *H04W 76/14* (2018.02); *H04W 84/005* (2013.01)

(56) References Cited

U.S. PATENT DOCUMENTS

2018/0262887 A1   9/2018   Futaki
2019/0028854 A1   1/2019   Hua

OTHER PUBLICATIONS

3GPP TS 36.423 V14.0.0 (Sep. 2016); Technical Specification; 3rd Generation Partnership Project; Technical Specification Group Radio Access Network; Evolved Universal Terrestrial Radio Access Network (E-UTRAN); X2 application protocol (X2AP) (Release 14).
R2-166176; 3GPP TSG-RAN WG2 Meeting #95bis; Kaohsiung, Oct. 10-14, 2016; Source: CATT; Title: Consideration on P2X.
R2-166594; 3GPP TSG-RAN WG2 Meeting #95bis;; Kaohsiung, Oct. 10-14, 2016; Agenda Item: 8.13.3; Source: Coolpad; Title: Discussion on power saving for P-UE.
R2-166173; 3GPP TSG-RAN WG2 Meeting #95bis; Kaohsiung, Oct. 10-14, 2016; Source: CATT; Title: Impact of Multiple TMGI; Agenda Item: 8.13.1.
R2-166174; 3GPP TSG-RAN WG2 Meeting #95bis; Kaohsiung, Oct. 10-14, 2016; Title: [Draft] LS Response on Multiple TMGIs for support of small and variable MBMS areas.
R2-166175; 3GPP TSG RAN WG2 Meeting #95bis; Kaohsiung, Taiwan, Oct. 10-14, 2016; Source: CATT; Title: Discussion on V2X SPS.
R2-166189; 3GPP TSG-RAN2 Meeting #95bis; Kaohsiung, Oct. 10-14, 2016; Agenda Item:8.13.2; Source: OPPO; Title: Discussion on Details of V2X SPS Enhancements.
R2-166190, 3GPP TSG-RAN2 Meeting #95bis; Kaohsiung, Oct. 10-14, 2016; Agenda Item:8.13.3; Source: OPPO; Title: Discussion on V2P.
R2-166261; 3GPP TSG RAN WG2 Meeting #95bis; Kaohsiung, Oct. 10-14, 2016; Agenda item: 8.13.3; Source: Intel Corporation; Title: Resource pool management.
R2-166297; 3GPP TSG RAN WG2 Meeting #95-bis; Kaohsiung, Oct. 10-14, 2016; Agenda Item: 8.13.1; Source: Huawei, HiSilicon; Title: Inter-PLMN operation for Uu-based V2X.
R2-166298, 3GPP TSG RAN WG2 Meeting #95-bis; Kaohsiung, Oct. 10-14, 2016; Agenda Item: 8.13.3; Source: Huawei, HiSilicon; Title: Discussion on P2X Sidelink Communication.
R2-166299; 3GPP TSG RAN WG2 Meeting #95-bis; Kaohsiung, Oct. 10-14, 2016; Agenda Item: 8.13.2; Source: Huawei, HiSilicon; Title: Enhancements of Uplink SPS for Uu-based V2X.
R2-166300; 3GPP TSG RAN WG2 Meeting #95-bis; Kaohsiung, Oct. 10-14, 2016; Agenda Item: 8.13.2; Source: Huawei, HiSilicon; Title: Further Discussion of SPS over Sidelink.
R2-166431; 3GPP TSG RAN WG2 Meeting #95bis; Kaohsiung, Oct. 10-14, 2016; Source: ITL; Title: Reporting issues on SL SPS.
R2-166465; 3GPP TSG-RAN WG2 Meeting #95bis; Kaohsiung, Taiwan, Oct. 10-14, 2016; Agenda: 8.13.1; Source: MediaTek; Title: SC-PTM Enhancements for LTE V2X.
R2-166466; 3GPP TSG-RAN WG2 Meeting #95bis; Kaohsiung, Taiwan, Oct. 10-14, 2016; Agenda: 8.13.1; Source: MediaTek; Title: On suitability of Uu transport and PC5 transport for V2X Solutions.
R2-166471; 3GPP TSG-RAN WG2 Meeting #95bis; Kaohsiung, Oct. 10-14, 2016; Source: Potevio; Title: Discussion on Sidelink SPS configuration and UE assistant information.
R2-166489; 3GPP TSG-RAN WG2 Meeting#95b; Kaohsiung, Oct. 10-14, 2016; Agenda item: 8.13.3; Source: Fujitsu; Title: Discussion on power saving for V2P communications.
R2-166609; 3GPP TSG-RAN WG2 Meeting #95bis; Kaohsiung, Oct. 10-14, 2016; Title: Discussion on V2P aspects; Source: ZTE.
R2-166616; 3GPP TSG-RAN WG2 #95bis; Kaohsiung, Oct. 10-14, 2016; Agenda Item: 8.13.2; Source: ZTE, Title: Discussion on SPS related issues.
R2-166721; 3GPP TSG-RAN WG2 Meeting #95bis; Kaohsuing, Oct. 10-14, 2016; Agenda item: 8.13.2; Source: Qualcomm Incorporated; Title: Details of DCI and SPS Configuration.
R2-166733; 3GPP TSG-RAN WG2 Meeting #95bis; Kaohsuing, Oct. 10-14, 2016; Agenda item: 8.13.3; Source: Qualcomm Incorporated; Title: V2P Services over PC5.
R2-166750; 3GPP TSG-RAN WG2 Meeting #95bis; Kaohsiung, Taiwan, Oct. 10-14, 2016; Agenda item: 8.13.1; Source: Nokia, Alcatel-Lucent Shanghai Bell;Title: MBMS Session Reception for V2X.
R2-166752; 3GPP TSG-RAN WG2 Meeting #95bis; Kaohsiung, Taiwan, Oct. 10-14, 2016; Agenda item: 8.13.3; Source: Nokia, Alcatel-Lucent Shanghai Bell; Title: Efficient V2P/P2V activation.
R2-166861; 3GPP TSG-RAN WG2 #95bis; Kaohsiung, Taiwan, Oct. 10-14, 2016; Agenda item: 8.13.3; Source: Kyocera; Title: Consideration of the P2V transmission scheme.
R2-166872; 3GPP TSG-RAN WG2 #95bis; Kaohsiung, Taiwan, Oct. 10-14, 2016; Agenda Item: 8.13.2; Source: Interdigital; Title: Details on SPS for V2X.
R2-166961; 3GPP TSG-RAN WG2 Meeting #95bis; Kaohsiung, Taiwan, Oct. 10-14, 2016; Title: Introducing Sidelink SPS in MAC; Source to WG: Ericsson;Source to TSG: R2.
R2-166962; 3GPP TSG-RAN WG2 Meeting #95bis; Kaohsiung, Taiwan, Oct. 10-14, 2016; Title: Introducing Sidelink SPS in RRC.
R2-166964; 3GPP TSG-RAN WG2 #95bis; Kaohsiung, Taiwan, Oct. 10-14, 2016; Agenda Item: 8.13.2; Source: Ericsson; Title: Configuration of UE Assistance Information.
R2-166967; 3GPP TSG-RAN WG2 #95bis; Kaohsiung, Taiwan, Oct. 10-14, 2016; Agenda Item: 8.13.3; Source: Ericsson; Title: Discussion on Sidelink Operations for Pedestrian.
R2-166975; 3GPP TSG-RAN WG2 #95bis; Kaohsiung, Taiwan, Oct. 10-14, 2016; Agenda Item: 8.13.2; Source: Ericsson (Rapporteur); Title: Report from [95#32][LTE/V2V] SPS.
R2-166976; 3GPP TSG-RAN WG2 #95bis; Kaohsiung, Taiwan, Oct. 10-14, 2016; Agenda Item: 8.13.2; Source: Ericsson; Title: Sidelink SPS Configuration.
R2-166977; 3GPP TSG-RAN WG2 #95bis; Kaohsiung, Taiwan, Oct. 10-14, 2016; Agenda Item: 8.13.2; Source: Ericsson; Title: SPS Protocol for Uu.
R2-166980; 3GPP TSG-RAN WG2 #95bis; Kaohsiung, Taiwan, Oct. 10-14, 2016; Title: [Draft] LS Reply on Multiple TMGIs for support of small and variable MBMS areas.
R2-166982; 3GPP TSG-RAN WG2 #95bis; Kaohsiung, Taiwan, Oct. 10-14, 2016; Agenda Item: 8.13.1; Source: Ericsson; Title: V2X Message Broadcasting.
R2-166983; 3GPP TSG-RAN WG2 #95bis; Kaohsiung, Taiwan, Oct. 10-14, 2016; Agenda Item: 8.13.1; Source: Ericsson; Title: On MBMS Latency.

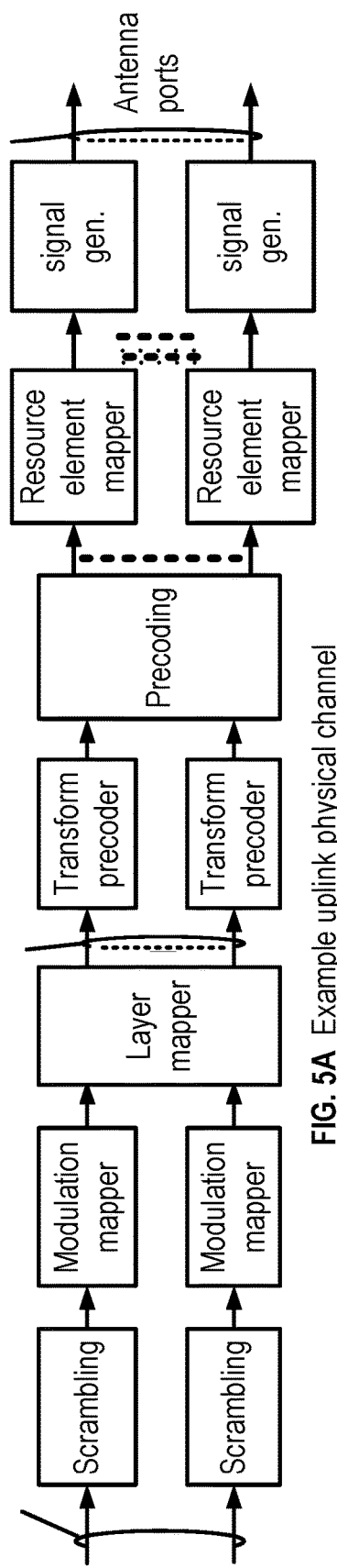
FIG. 5A Example uplink physical channel
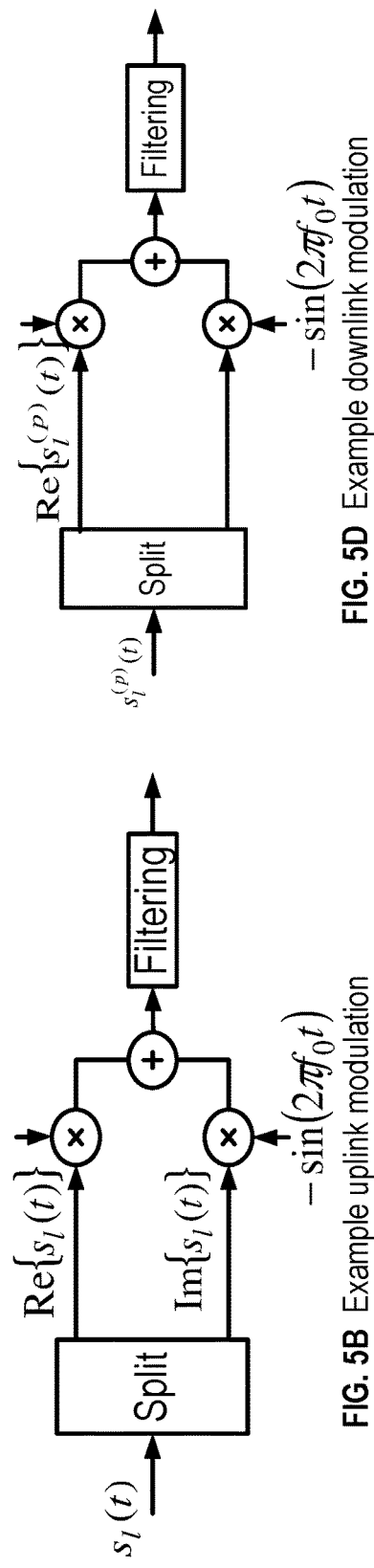
FIG. 5B Example uplink modulation
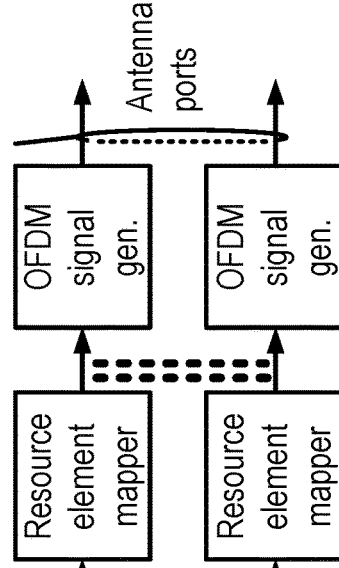
FIG. 5D Example downlink modulation
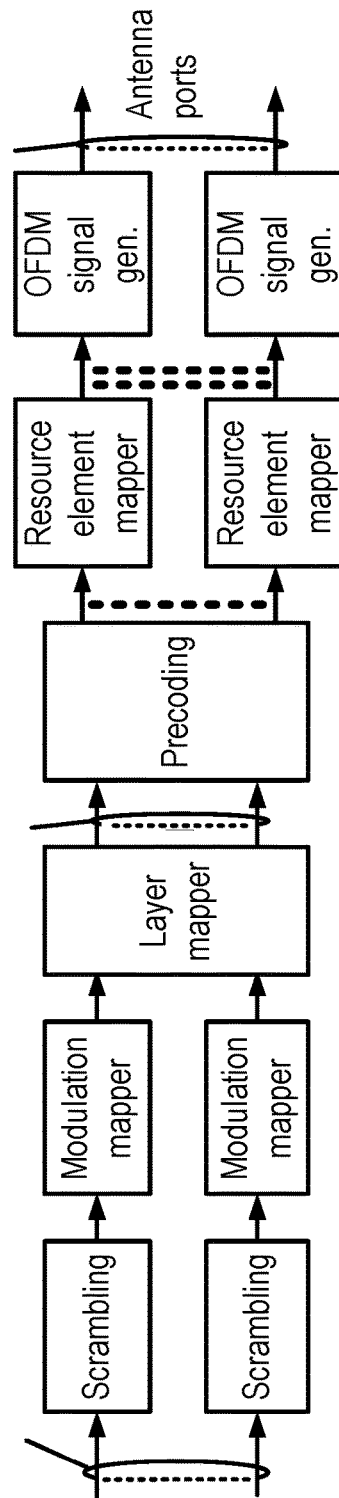
FIG. 5C Example downlink physical channel Dual-Connectivity at eNB FIG. 7 Dual-Connectivity- two MAC entities at UE side

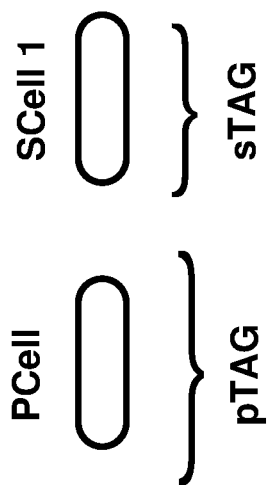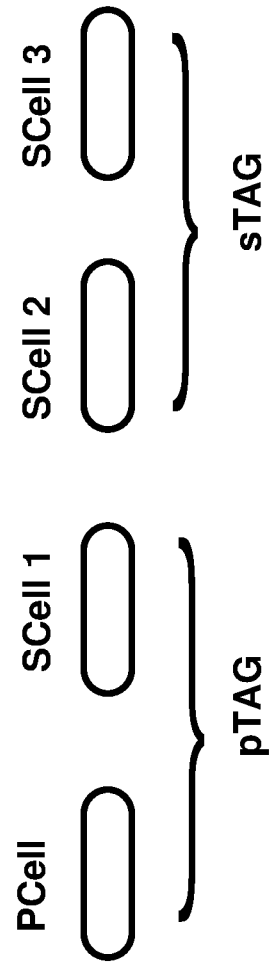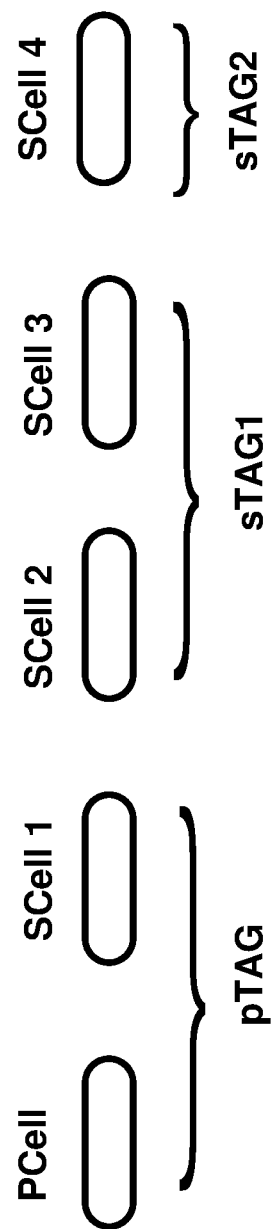
FIG. 8

Send to a 2nd base station, a 1st message for a handover request for a wireless device, where the 1st message comprises configuration parameters associated with packet flow(s) of the wireless device, the configuration parameters comprising: a 1st identifier of a 1st packet flow of the packet flow(s); V2X parameter(s) of the 1st packet flow indicating whether the 1st packet flow is for 1st V2X service(s); and a QoS indicator of the 1st packet flow
1610

Receive a 2nd message indicating acceptance of the 1st packet flow, where: the acceptance is determined based at least on the 1st V2X parameter(s); and the 2nd message comprises configuration parameter(s) for the wireless device
1620

Transmit to the wireless device, a handover command message comprising the configuration parameter(s)
1630

FIG. 16

PER PACKET FLOW V2X SERVICE IN A WIRELESS NETWORK

CROSS-REFERENCE TO RELATED APPLICATIONS

This application is a continuation of U.S. patent application Ser. No. 15/796,286, filed Oct. 27, 2017, which claims the benefit of U.S. Provisional Application No. 62/413,820, filed Oct. 27, 2016, U.S. Provisional Application No. 62/413,824, filed Oct. 27, 2016, U.S. Provisional Application No. 62/413,832, filed Oct. 27, 2016, and U.S. Provisional Application No. 62/413,835, filed Oct. 27, 2016, which are hereby incorporated by reference in their entirety.

BRIEF DESCRIPTION OF THE SEVERAL VIEWS OF THE DRAWINGS

Examples of several of the various embodiments of the present invention are described herein with reference to the drawings.

FIG. 5A, FIG. 5B, FIG. 5C and FIG. 5D are example diagrams for uplink and downlink signal transmission as per an aspect of an embodiment of the present invention.

FIG. 8 shows example TAG configurations as per an aspect of an embodiment of the present invention.

FIG. 16 is an example flow diagram as per an aspect of an embodiment of the present disclosure.

DETAILED DESCRIPTION OF EMBODIMENTS

Figure 1:
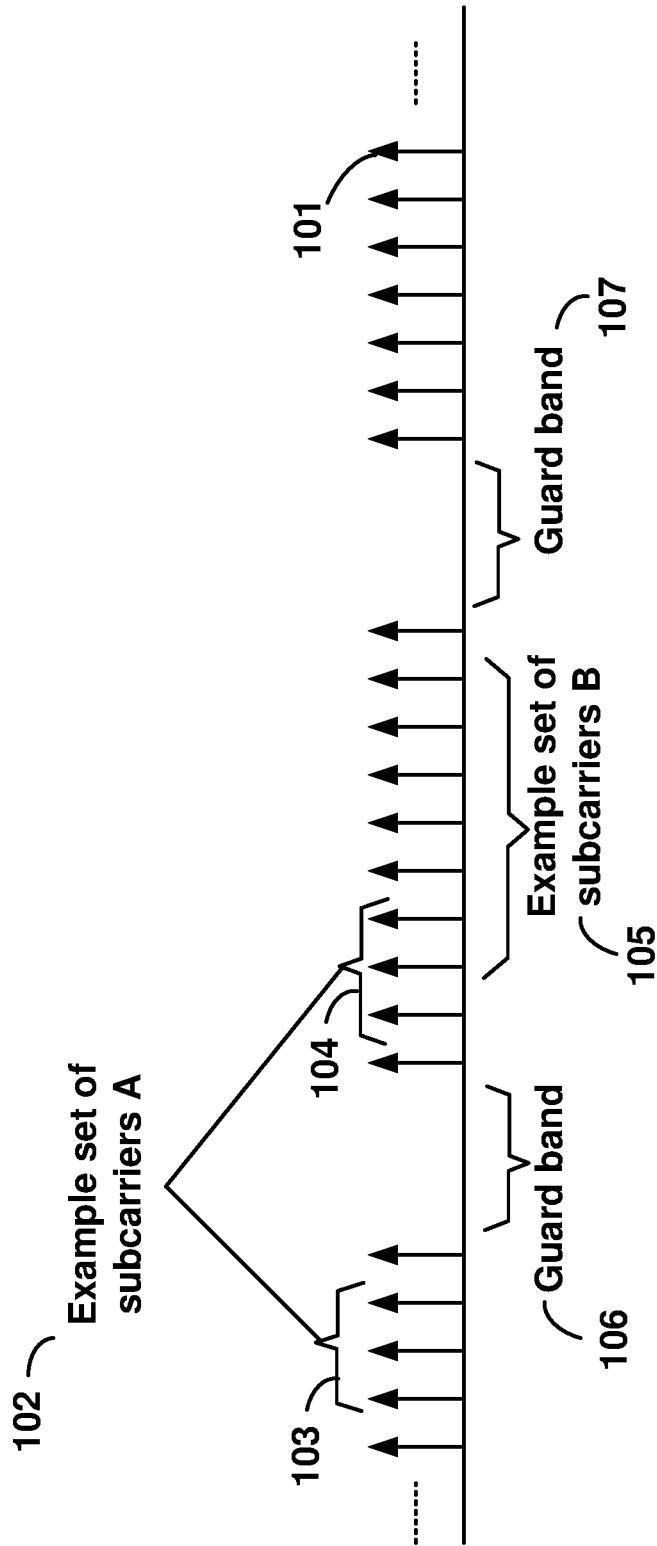
FIG. 1 is a diagram depicting example sets of OFDM subcarriers as per an aspect of an embodiment of the present invention.

Example embodiments of the present invention enable operation of carrier aggregation. Embodiments of the technology disclosed herein may be employed in the technical field of multicarrier communication systems. More particularly, the embodiments of the technology disclosed herein may relate to signal timing in a multicarrier communication systems.

The following Acronyms are used throughout the present disclosure:

ASIC application-specific integrated circuit
BPSK binary phase shift keying
CA carrier aggregation
CSI channel state information
CDMA code division multiple access
CSS common search space
CPLD complex programmable logic devices
CC component carrier
DL downlink
DCI downlink control information
DC dual connectivity
EPC evolved packet core
E-UTRAN evolved-universal terrestrial radio access network
FPGA field programmable gate arrays
FDD frequency division multiplexing
HDL hardware description languages
HARQ hybrid automatic repeat request
IE information element
LTE long term evolution
MCG master cell group
MeNB master evolved node B
MIB master information block
MAC media access control
MAC media access control
MME mobility management entity
NAS non-access stratum
OFDM orthogonal frequency division multiplexing
PDCP packet data convergence protocol
PDU packet data unit
PHY physical
PDCCH physical downlink control channel
PHICH physical HARQ indicator channel
PUCCH physical uplink control channel
PUSCH physical uplink shared channel
PCell primary cell
PCell primary cell
PCC primary component carrier
PSCell primary secondary cell
pTAG primary timing advance group
QAM quadrature amplitude modulation
QPSK quadrature phase shift keying
RBG Resource Block Groups
RLC radio link control
RRC radio resource control
RA random access
RB resource blocks
SCC secondary component carrier
SCell secondary cell
Scell secondary cells
SCG secondary cell group
SeNB secondary evolved node B
sTAGs secondary timing advance group SDU service data unit
S-GW serving gateway
SRB signaling radio bearer
SC-OFDM single carrier-OFDM
SFN system frame number
SIB system information block
TAI tracking area identifier
TAT time alignment timer
TDD time division duplexing
TDMA time division multiple access
TA timing advance
TAG timing advance group
TB transport block
UL uplink
UE user equipment
VHDL VHSIC hardware description language Example embodiments of the invention may be implemented using various physical layer modulation and transmission mechanisms. Example transmission mechanisms may include, but are not limited to: CDMA, OFDM, TDMA, Wavelet technologies, and/or the like. Hybrid transmission mechanisms such as TDMA/CDMA, and OFDM/CDMA may also be employed. Various modulation schemes may be applied for signal transmission in the physical layer. Examples of modulation schemes include, but are not limited to: phase, amplitude, code, a combination of these, and/or the like. An example radio transmission method may implement QAM using BPSK, QPSK, 16-QAM, 64-QAM, 256-QAM, and/or the like. Physical radio transmission may be enhanced by dynamically or semi-dynamically changing the modulation and coding scheme depending on transmission requirements and radio conditions.

FIG. 1 is a diagram depicting example sets of OFDM subcarriers as per an aspect of an embodiment of the present invention. As illustrated in this example, arrow(s) in the diagram may depict a subcarrier in a multicarrier OFDM system. The OFDM system may use technology such as OFDM technology, DFTS-OFDM, SC-OFDM technology, or the like. For example, arrow 101 shows a subcarrier transmitting information symbols. FIG. 1 is for illustration purposes, and a typical multicarrier OFDM system may include more subcarriers in a carrier. For example, the number of subcarriers in a carrier may be in the range of 10 to 10,000 subcarriers. FIG. 1 shows two guard bands 106 and 107 in a transmission band. As illustrated in FIG. 1, guard band 106 is between subcarriers 103 and subcarriers 104. The example set of subcarriers A 102 includes subcarriers 103 and subcarriers 104. FIG. 1 also illustrates an example set of subcarriers B 105. As illustrated, there is no guard band between any two subcarriers in the example set of subcarriers B 105. Carriers in a multicarrier OFDM communication system may be contiguous carriers, non-contiguous carriers, or a combination of both contiguous and non-contiguous carriers.

Figure 2:
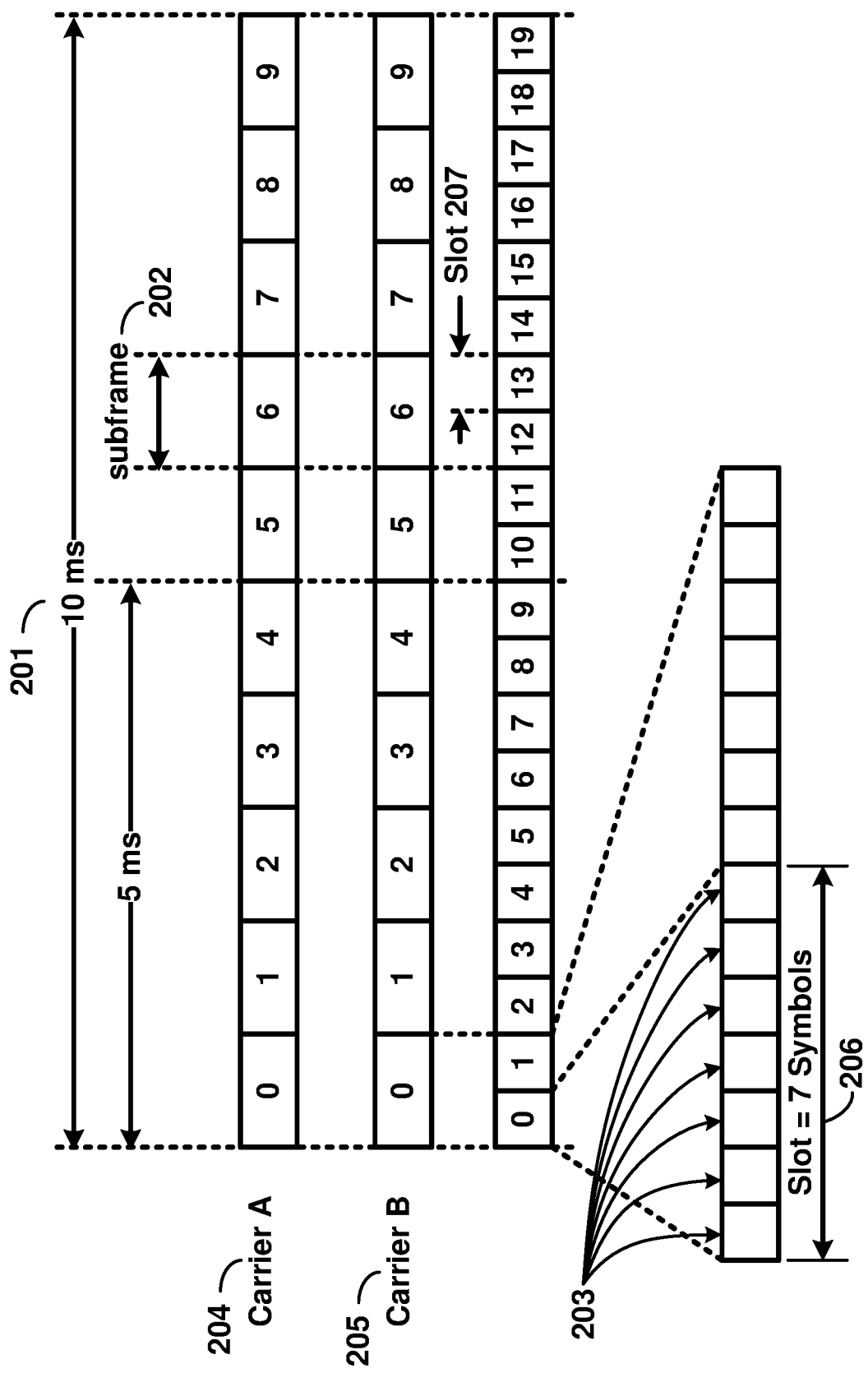
FIG. 2 is a diagram depicting an example transmission time and reception time for two carriers in a carrier group as per an aspect of an embodiment of the present invention.

FIG. 2 is a diagram depicting an example transmission time and reception time for two carriers as per an aspect of an embodiment of the present invention. A multicarrier OFDM communication system may include one or more carriers, for example, ranging from 1 to 10 carriers. Carrier A 204 and carrier B 205 may have the same or different timing structures. Although FIG. 2 shows two synchronized carriers, carrier A 204 and carrier B 205 may or may not be synchronized with each other. Different radio frame structures may be supported for FDD and TDD duplex mechanisms. FIG. 2 shows an example FDD frame timing. Downlink and uplink transmissions may be organized into radio frames 201. In this example, radio frame duration is 10 msec. Other frame durations, for example, in the range of 1 to 100 msec may also be supported. In this example, each 10 ms radio frame 201 may be divided into ten equally sized subframes 202. Other subframe durations such as including 0.5 msec, 1 msec, 2 msec, and 5 msec may also be supported. Subframe(s) may consist of two or more slots (e.g. slots 206 and 207). For the example of FDD, 10 subframes may be available for downlink transmission and 10 subframes may be available for uplink transmissions in each 10 ms interval. Uplink and downlink transmissions may be separated in the frequency domain. Slot(s) may include a plurality of OFDM symbols 203. The number of OFDM symbols 203 in a slot 206 may depend on the cyclic prefix length and subcarrier spacing.

Figure 3:
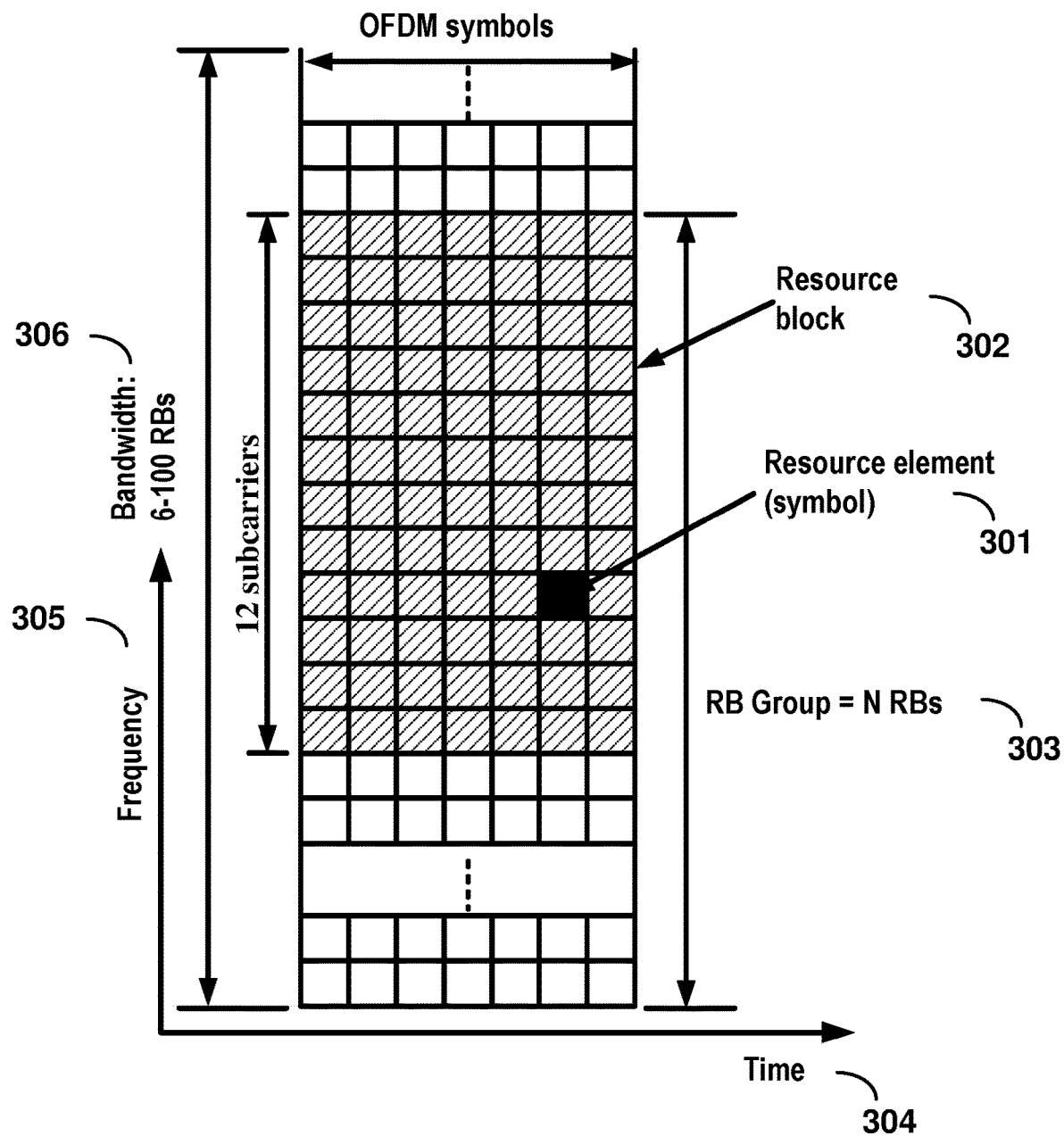
FIG. 3 is a diagram depicting OFDM radio resources as per an aspect of an embodiment of the present invention.

FIG. 3 is a diagram depicting OFDM radio resources as per an aspect of an embodiment of the present invention. The resource grid structure in time 304 and frequency 305 is illustrated in FIG. 3. The quantity of downlink subcarriers or RBs (in this example 6 to 100 RBs) may depend, at least in part, on the downlink transmission bandwidth 306 configured in the cell. The smallest radio resource unit may be called a resource element (e.g. 301). Resource elements may be grouped into resource blocks (e.g. 302). Resource blocks may be grouped into larger radio resources called Resource Block Groups (RBG) (e.g. 303). The transmitted signal in slot 206 may be described by one or several resource grids of a plurality of subcarriers and a plurality of OFDM symbols. Resource blocks may be used to describe the mapping of certain physical channels to resource elements. Other pre-defined groupings of physical resource elements may be implemented in the system depending on the radio technology. For example, 24 subcarriers may be grouped as a radio block for a duration of 5 msec. In an illustrative example, a resource block may correspond to one slot in the time domain and 180 kHz in the frequency domain (for 15 KHz subcarrier bandwidth and 12 subcarriers).

FIG. 5A, FIG. 5B, FIG. 5C and FIG. 5D are example diagrams for uplink and downlink signal transmission as per an aspect of an embodiment of the present invention. FIG. 5A shows an example uplink physical channel. The baseband signal representing the physical uplink shared channel may perform the following processes. These functions are illustrated as examples and it is anticipated that other mechanisms may be implemented in various embodiments. The functions may comprise scrambling, modulation of scrambled bits to generate complex-valued symbols, mapping of the complex-valued modulation symbols onto one or several transmission layers, transform precoding to generate complex-valued symbols, precoding of the complex-valued symbols, mapping of precoded complex-valued symbols to resource elements, generation of complex-valued time-domain DFTS-OFDM/SC-FDMA signal for each antenna port, and/or the like.

Example modulation and up-conversion to the carrier frequency of the complex-valued DFTS-OFDM/SC-FDMA baseband signal for each antenna port and/or the complex-valued PRACH baseband signal is shown in FIG. 5B. Filtering may be employed prior to transmission.

An example structure for Downlink Transmissions is shown in FIG. 5C. The baseband signal representing a downlink physical channel may perform the following processes. These functions are illustrated as examples and it is anticipated that other mechanisms may be implemented in various embodiments. The functions include scrambling of coded bits in each of the codewords to be transmitted on a physical channel; modulation of scrambled bits to generate complex-valued modulation symbols; mapping of the complex-valued modulation symbols onto one or several transmission layers; precoding of the complex-valued modulation symbols on each layer for transmission on the antenna ports; mapping of complex-valued modulation symbols for each antenna port to resource elements; generation of complex-valued time-domain OFDM signal for each antenna port, and/or the like.

Example modulation and up-conversion to the carrier frequency of the complex-valued OFDM baseband signal for each antenna port is shown in FIG. 5D. Filtering may be employed prior to transmission.

Figure 4:
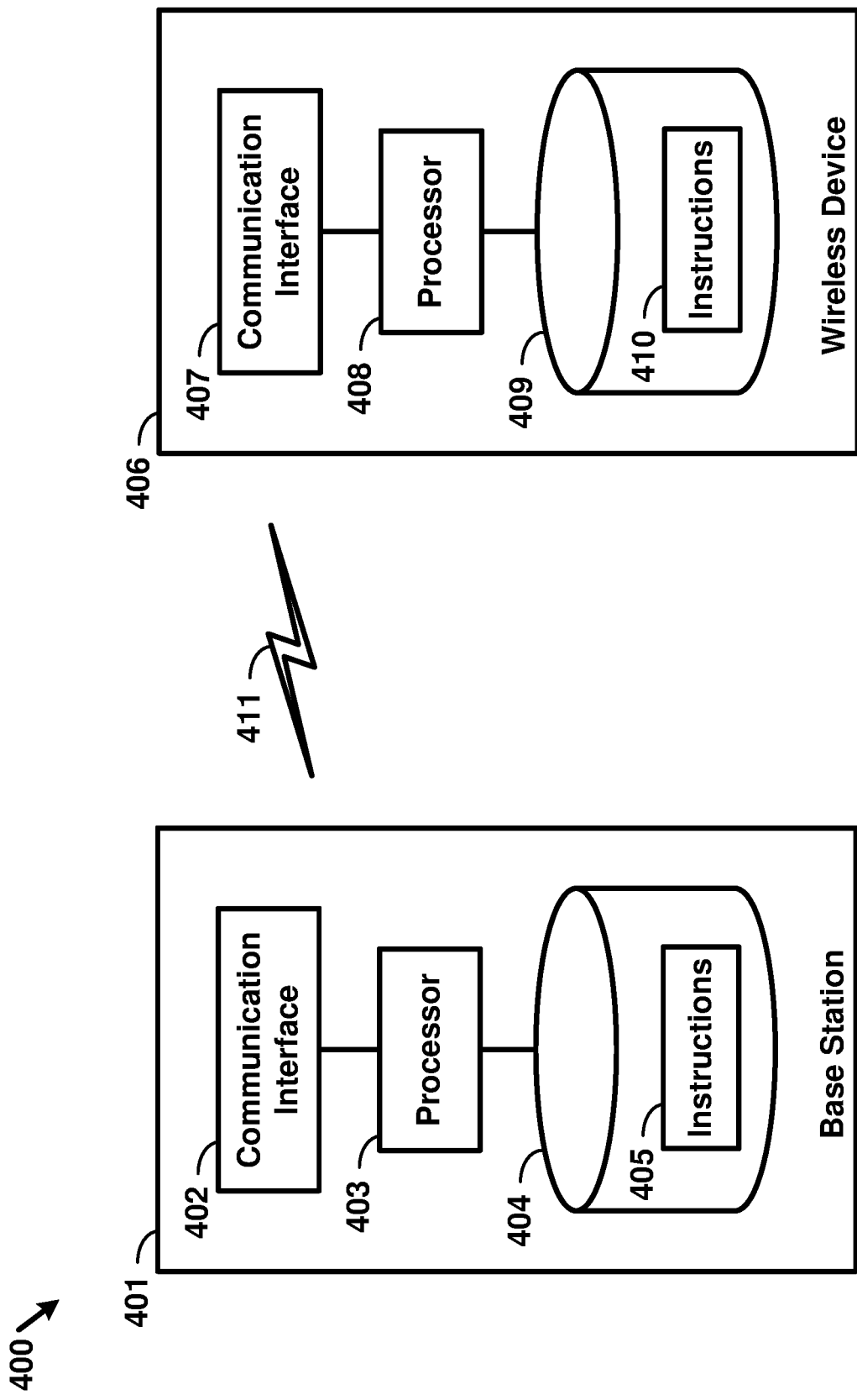
FIG. 4 is a block diagram of a base station and a wireless device as per an aspect of an embodiment of the present invention.

FIG. 4 is an example block diagram of a base station 401 and a wireless device 406, as per an aspect of an embodiment of the present invention. A communication network 400 may include at least one base station 401 and at least one wireless device 406. The base station 401 may include at least one communication interface 402, at least one processor 403, and at least one set of program code instructions 405 stored in non-transitory memory 404 and executable by the at least one processor 403. The wireless device 406 may include at least one communication interface 407, at least one processor 408, and at least one set of program code instructions 410 stored in non-transitory memory 409 and executable by the at least one processor 408. Communication interface 402 in base station 401 may be configured to engage in communication with communication interface 407 in wireless device 406 via a communication path that includes at least one wireless link 411. Wireless link 411 may be a bi-directional link. Communication interface 407 in wireless device 406 may also be configured to engage in a communication with communication interface 402 in base station 401. Base station 401 and wireless device 406 may be configured to send and receive data over wireless link 411 using multiple frequency carriers. According to some of the various aspects of embodiments, transceiver(s) may be employed. A transceiver is a device that includes both a transmitter and receiver. Transceivers may be employed in devices such as wireless devices, base stations, relay nodes, and/or the like. Example embodiments for radio technology implemented in communication interface 402, 407 and wireless link 411 are illustrated are FIG. 1, FIG. 2, FIG. 3, FIG. 5, and associated text.

An interface may be a hardware interface, a firmware interface, a software interface, and/or a combination thereof. The hardware interface may include connectors, wires, electronic devices such as drivers, amplifiers, and/or the like. A software interface may include code stored in a memory device to implement protocol(s), protocol layers, communication drivers, device drivers, combinations thereof, and/or the like. A firmware interface may include a combination of embedded hardware and code stored in and/or in communication with a memory device to implement connections, electronic device operations, protocol(s), protocol layers, communication drivers, device drivers, hardware operations, combinations thereof, and/or the like.

The term configured may relate to the capacity of a device whether the device is in an operational or non-operational state. Configured may also refer to specific settings in a device that effect the operational characteristics of the device whether the device is in an operational or non-operational state. In other words, the hardware, software, firmware, registers, memory values, and/or the like may be "configured" within a device, whether the device is in an operational or nonoperational state, to provide the device with specific characteristics. Terms such as "a control message to cause in a device" may mean that a control message has parameters that may be used to configure specific characteristics in the device, whether the device is in an operational or non-operational state.

According to some of the various aspects of embodiments, an LTE network may include a multitude of base stations, providing a user plane PDCP/RLC/MAC/PHY and control plane (RRC) protocol terminations towards the wireless device. The base station(s) may be interconnected with other base station(s) (e.g. employing an X2 interface). The base stations may also be connected employing, for example, an S1 interface to an EPC. For example, the base stations may be interconnected to the MME employing the S1-MME interface and to the S-G) employing the S1-U interface. The S1 interface may support a many-to-many relation between MMEs/Serving Gateways and base stations. A base station may include many sectors for example: 1, 2, 3, 4, or 6 sectors. A base station may include many cells, for example, ranging from 1 to 50 cells or more. A cell may be categorized, for example, as a primary cell or secondary cell. At RRC connection establishment/re-establishment/handover, one serving cell may provide the NAS (non-access stratum) mobility information (e.g. TAI), and at RRC connection re-establishment/handover, one serving cell may provide the security input. This cell may be referred to as the Primary Cell (PCell). In the downlink, the carrier corresponding to the PCell may be the Downlink Primary Component Carrier (DL PCC), while in the uplink, it may be the Uplink Primary Component Carrier (UL PCC). Depending on wireless device capabilities, Secondary Cells (SCells) may be configured to form together with the PCell a set of serving cells. In the downlink, the carrier corresponding to an SCell may be a Downlink Secondary Component Carrier (DL SCC), while in the uplink, it may be an Uplink Secondary Component Carrier (UL SCC). An SCell may or may not have an uplink carrier.

A cell, comprising a downlink carrier and optionally an uplink carrier, may be assigned a physical cell ID and a cell index. A carrier (downlink or uplink) may belong to only one cell. The cell ID or Cell index may also identify the downlink carrier or uplink carrier of the cell (depending on the context it is used). In the specification, cell ID may be equally referred to a carrier ID, and cell index may be referred to carrier index. In implementation, the physical cell ID or cell index may be assigned to a cell. A cell ID may be determined using a synchronization signal transmitted on a downlink carrier. A cell index may be determined using RRC messages. For example, when the specification refers to a first physical cell ID for a first downlink carrier, the specification may mean the first physical cell ID is for a cell comprising the first downlink carrier. The same concept may apply to, for example, carrier activation. When the specification indicates that a first carrier is activated, the specification may equally mean that the cell comprising the first carrier is activated.

Embodiments may be configured to operate as needed. The disclosed mechanism may be performed when certain criteria are met, for example, in a wireless device, a base station, a radio environment, a network, a combination of the above, and/or the like. Example criteria may be based, at least in part, on for example, traffic load, initial system set up, packet sizes, traffic characteristics, a combination of the above, and/or the like. When the one or more criteria are met, various example embodiments may be applied. Therefore, it may be possible to implement example embodiments that selectively implement disclosed protocols.

A base station may communicate with a mix of wireless devices. Wireless devices may support multiple technologies, and/or multiple releases of the same technology. Wireless devices may have some specific capability(ies) depending on its wireless device category and/or capability(ies). A base station may comprise multiple sectors. When this disclosure refers to a base station communicating with a plurality of wireless devices, this disclosure may refer to a subset of the total wireless devices in a coverage area. This disclosure may refer to, for example, a plurality of wireless devices of a given LTE release with a given capability and in a given sector of the base station. The plurality of wireless devices in this disclosure may refer to a selected plurality of wireless devices, and/or a subset of total wireless devices in a coverage area which perform according to disclosed methods, and/or the like. There may be a plurality of wireless devices in a coverage area that may not comply with the disclosed methods, for example, because those wireless devices perform based on older releases of LTE technology.

Figure 6:
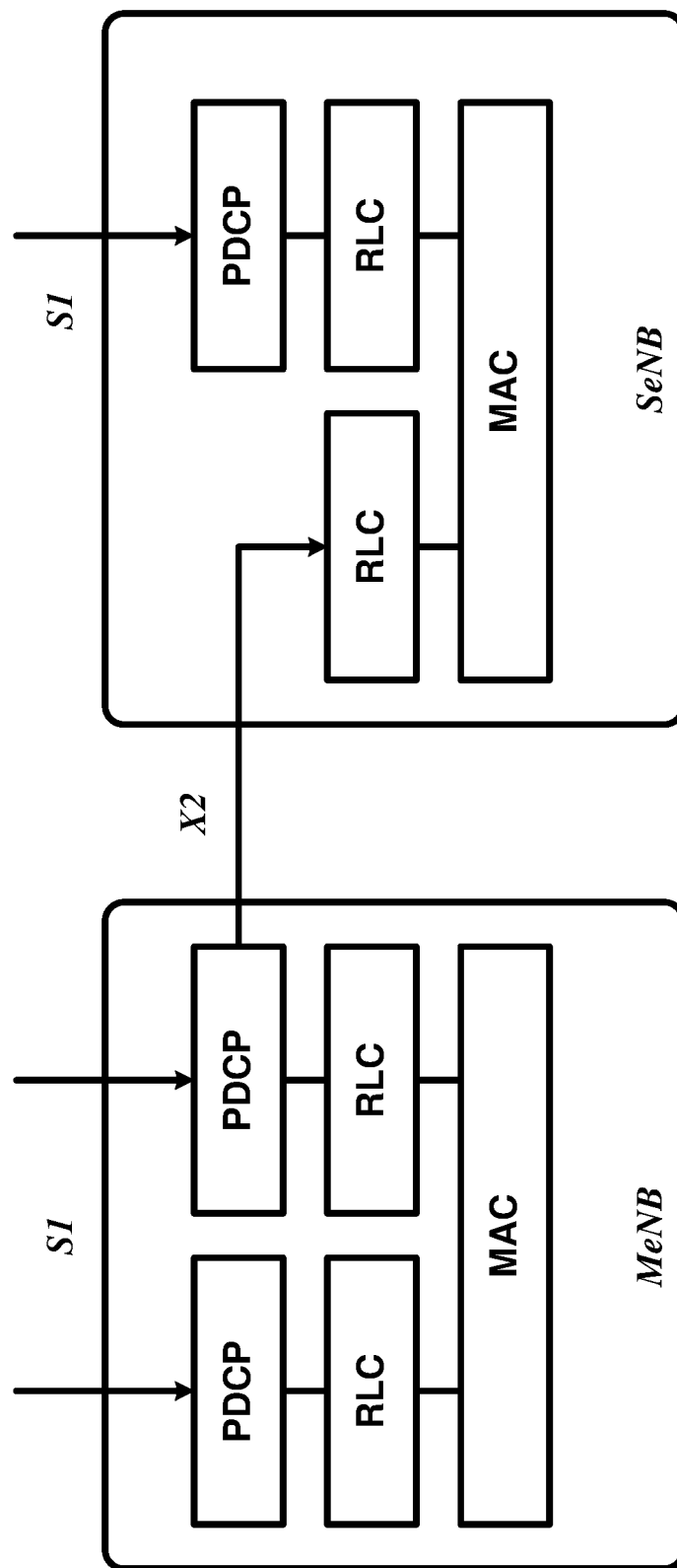
FIG. 6 is an example diagram for a protocol structure with CA and DC as per an aspect of an embodiment of the present invention.
Figure 7:
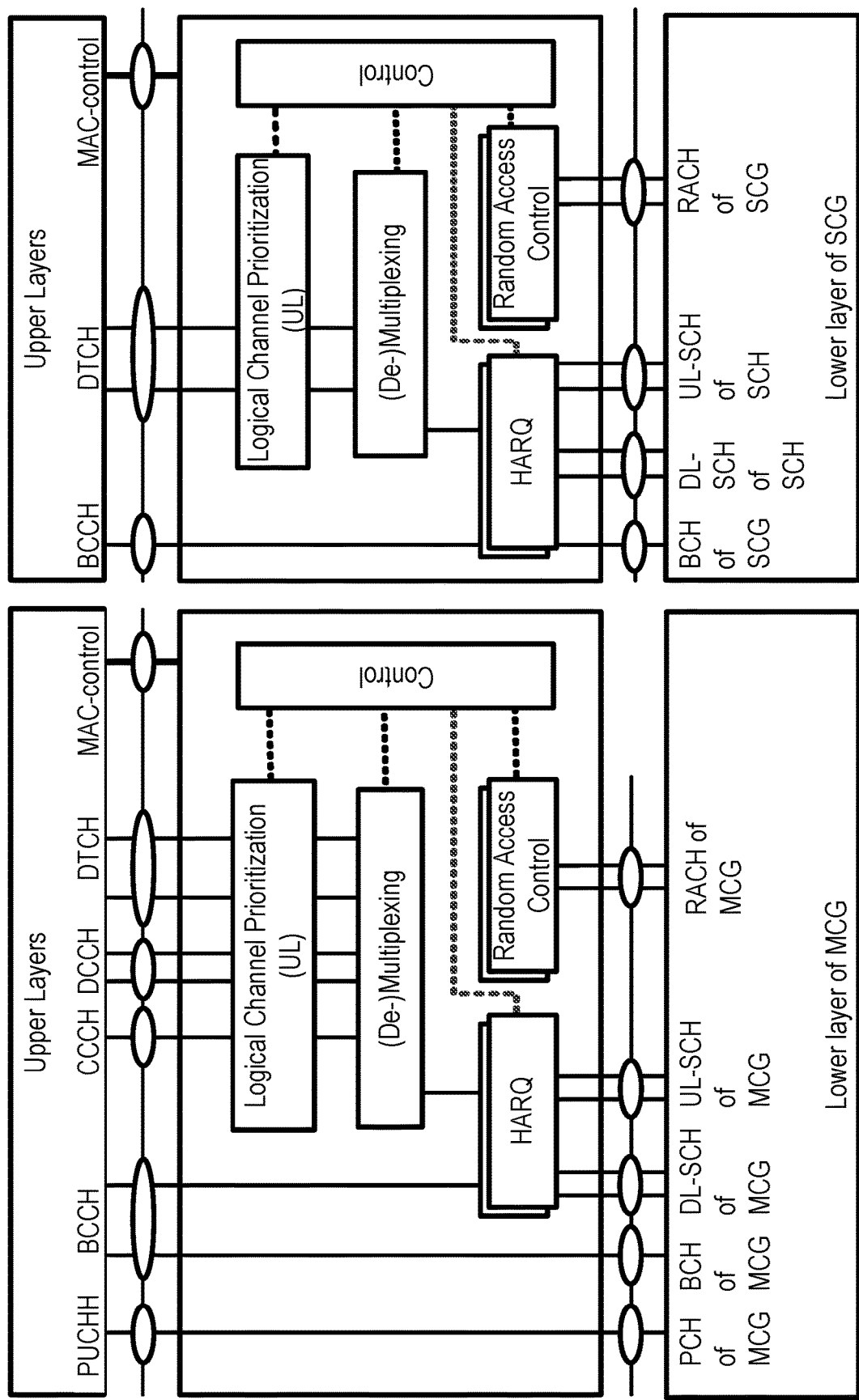
FIG. 7 is an example diagram for a protocol structure with CA and DC as per an aspect of an embodiment of the present invention.

FIG. 6 and FIG. 7 are example diagrams for protocol structure with CA and DC as per an aspect of an embodiment of the present invention. E-UTRAN may support Dual Connectivity (DC) operation whereby a multiple RX/TX UE in RRC_CONNECTED may be configured to utilize radio resources provided by two schedulers located in two eNBs connected via a non-ideal backhaul over the X2 interface. eNBs involved in DC for a certain UE may assume two different roles: an eNB may either act as an MeNB or as an SeNB. In DC a UE may be connected to one MeNB and one SeNB. Mechanisms implemented in DC may be extended to cover more than two eNBs. FIG. 7 illustrates one example structure for the UE side MAC entities when a Master Cell Group (MCG) and a Secondary Cell Group (SCG) are configured, and it may not restrict implementation. Media Broadcast Multicast Service (MBMS) reception is not shown in this figure for simplicity.

In DC, the radio protocol architecture that a particular bearer uses may depend on how the bearer is setup. Three alternatives may exist, an MCG bearer, an SCG bearer and a split bearer as shown in FIG. 6. RRC may be located in MeNB and SRBs may be configured as a MCG bearer type and may use the radio resources of the MeNB. DC may also be described as having at least one bearer configured to use radio resources provided by the SeNB. DC may or may not be configured/implemented in example embodiments of the invention.

In the case of DC, the UE may be configured with two MAC entities: one MAC entity for MeNB, and one MAC entity for SeNB. In DC, the configured set of serving cells for a UE may comprise of two subsets: the Master Cell Group (MCG) containing the serving cells of the MeNB, and the Secondary Cell Group (SCG) containing the serving cells of the SeNB. For a SCG, one or more of the following may be applied: at least one cell in the SCG has a configured UL CC and one of them, named PSCell (or PCell of SCG, or sometimes called PCell), is configured with PUCCH resources; when the SCG is configured, there may be at least one SCG bearer or one Split bearer; upon detection of a physical layer problem or a random access problem on a PSCell, or the maximum number of RLC retransmissions has been reached associated with the SCG, or upon detection of an access problem on a PSCell during a SCG addition or a SCG change: a RRC connection re-establishment procedure may not be triggered, UL transmissions towards cells of the SCG are stopped, a MeNB may be informed by the UE of a SCG failure type, for split bearer, the DL data transfer over the MeNB is maintained; the RLC AM bearer may be configured for the split bearer; like PCell, PSCell may not be de-activated; PSCell may be changed with a SCG change (e.g. with security key change and a RACH procedure); and/or neither a direct bearer type change between a Split bearer and a SCG bearer nor simultaneous configuration of a SCG and a Split bearer are supported.

With respect to the interaction between a MeNB and a SeNB, one or more of the following principles may be applied: the MeNB may maintain the RRM measurement configuration of the UE and may, (e.g, based on received measurement reports or traffic conditions or bearer types), decide to ask a SeNB to provide additional resources (serving cells) for a UE; upon receiving a request from the MeNB, a SeNB may create a container that may result in the configuration of additional serving cells for the UE (or decide that it has no resource available to do so); for UE capability coordination, the MeNB may provide (part of) the AS configuration and the UE capabilities to the SeNB; the MeNB and the SeNB may exchange information about a UE configuration by employing of RRC containers (inter-node messages) carried in X2 messages; the SeNB may initiate a reconfiguration of its existing serving cells (e.g., PUCCH towards the SeNB); the SeNB may decide which cell is the PSCell within the SCG; the MeNB may not change the content of the RRC configuration provided by the SeNB; in the case of a SCG addition and a SCG SCell addition, the MeNB may provide the latest measurement results for the SCG cell(s); both a MeNB and a SeNB may know the SFN and subframe offset of each other by OAM, (e.g., for the purpose of DRX alignment and identification of a measurement gap). In an example, when adding a new SCG SCell, dedicated RRC signalling may be used for sending required system information of the cell as for CA, except for the SFN acquired from a MIB of the PSCell of a SCG.

In an example, serving cells may be grouped in a TA group (TAG). Serving cells in one TAG may use the same timing reference. For a given TAG, user equipment (UE) may use at least one downlink carrier as a timing reference. For a given TAG, a UE may synchronize uplink subframe and frame transmission timing of uplink carriers belonging to the same TAG. In an example, serving cells having an uplink to which the same TA applies may correspond to serving cells hosted by the same receiver. A UE supporting multiple TAs may support two or more TA groups. One TA group may contain the PCell and may be called a primary TAG (pTAG). In a multiple TAG configuration, at least one TA group may not contain the PCell and may be called a secondary TAG (sTAG). In an example, carriers within the same TA group may use the same TA value and/or the same timing reference. When DC is configured, cells belonging to a cell group (MCG or SCG) may be grouped into multiple TAGs including a pTAG and one or more sTAGs.

FIG. 8 shows example TAG configurations as per an aspect of an embodiment of the present invention. In Example 1, pTAG comprises PCell, and an sTAG comprises SCell1. In Example 2, a pTAG comprises a PCell and SCell1, and an sTAG comprises SCell2 and SCell3. In Example 3, pTAG comprises PCell and SCell1, and an sTAG1 includes SCell2 and SCell3, and sTAG2 comprises SCell4. Up to four TAGs may be supported in a cell group (MCG or SCG) and other example TAG configurations may also be provided. In various examples in this disclosure, example mechanisms are described for a pTAG and an sTAG. Some of the example mechanisms may be applied to configurations with multiple sTAGs.

In an example, an eNB may initiate an RA procedure via a PDCCH order for an activated SCell. This PDCCH order may be sent on a scheduling cell of this SCell. When cross carrier scheduling is configured for a cell, the scheduling cell may be different than the cell that is employed for preamble transmission, and the PDCCH order may include an SCell index. At least a non-contention based RA procedure may be supported for SCell(s) assigned to sTAG(s).

Figure 9:
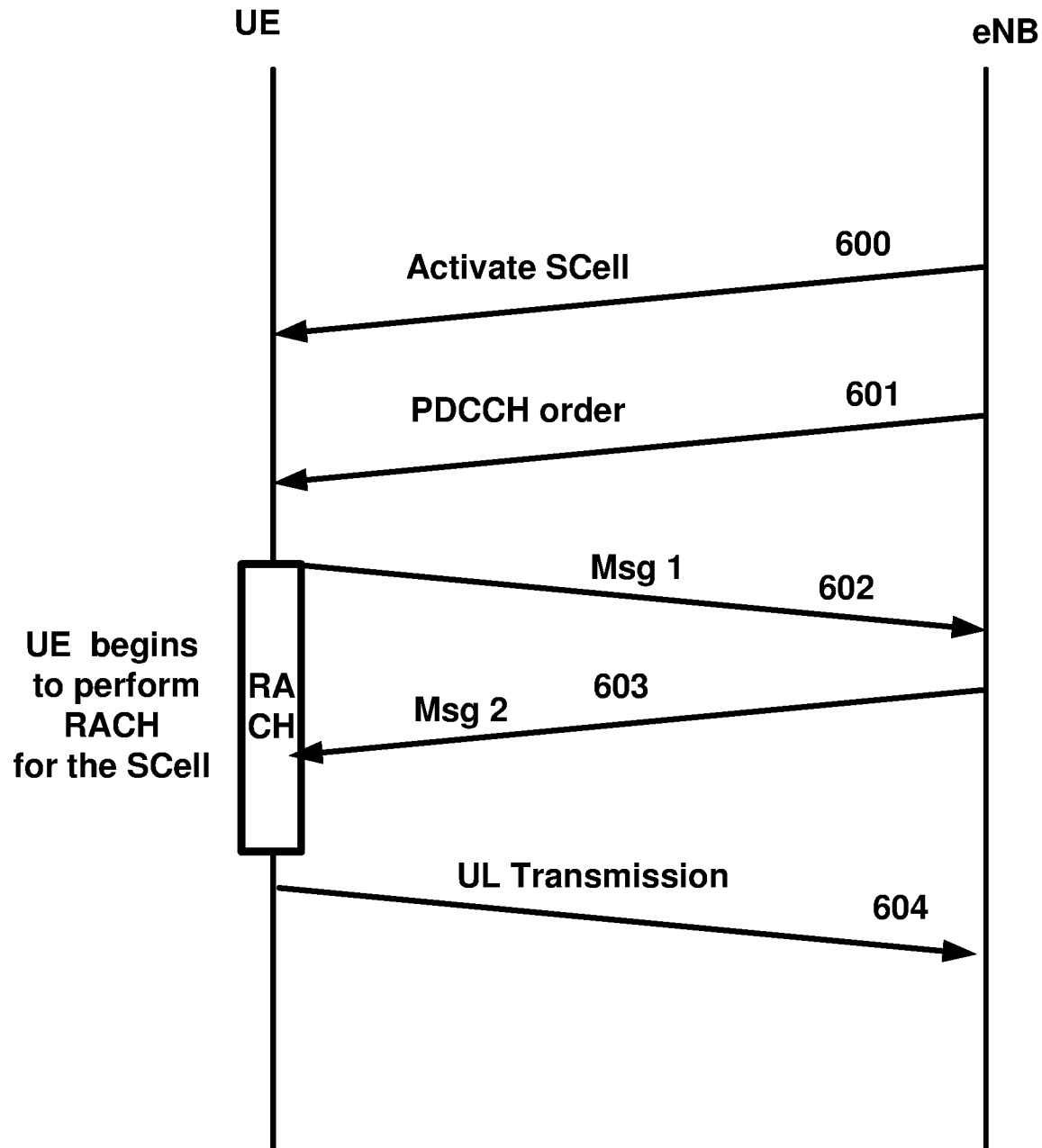
FIG. 9 is an example message flow in a random access process in a secondary TAG as per an aspect of an embodiment of the present invention.

FIG. 9 is an example message flow in a random access process in a secondary TAG as per an aspect of an embodiment of the present invention. An eNB transmits an activation command 600 to activate an SCell. A preamble 602 (Msg1) may be sent by a UE in response to a PDCCH order 601 on an SCell belonging to an sTAG. In an example embodiment, preamble transmission for SCells may be controlled by the network using PDCCH format 1A. Msg2 message 603 (RAR: random access response) in response to the preamble transmission on the SCell may be addressed to RA-RNTI in a PCell common search space (CSS). Uplink packets 604 may be transmitted on the SCell in which the preamble was transmitted.

According to some of the various aspects of embodiments, initial timing alignment may be achieved through a random access procedure. This may involve a UE transmitting a random access preamble and an eNB responding with an initial TA command NTA (amount of timing advance) within a random access response window. The start of the random access preamble may be aligned with the start of a corresponding uplink subframe at the UE assuming NTA=0. The eNB may estimate the uplink timing from the random access preamble transmitted by the UE. The TA command may be derived by the eNB based on the estimation of the difference between the desired UL timing and the actual UL timing. The UE may determine the initial uplink transmission timing relative to the corresponding downlink of the sTAG on which the preamble is transmitted.

The mapping of a serving cell to a TAG may be configured by a serving eNB with RRC signaling. The mechanism for TAG configuration and reconfiguration may be based on RRC signaling. According to some of the various aspects of embodiments, when an eNB performs an SCell addition configuration, the related TAG configuration may be configured for the SCell. In an example embodiment, an eNB may modify the TAG configuration of an SCell by removing (releasing) the SCell and adding (configuring) a new SCell (with the same physical cell ID and frequency) with an updated TAG ID. The new SCell with the updated TAG ID may initially be inactive subsequent to being assigned the updated TAG ID. The eNB may activate the updated new SCell and start scheduling packets on the activated SCell. In an example implementation, it may not be possible to change the TAG associated with an SCell, but rather, the SCell may need to be removed and a new SCell may need to be added with another TAG. For example, if there is a need to move an SCell from an sTAG to a pTAG, at least one RRC message, for example, at least one RRC reconfiguration message, may be send to the UE to reconfigure TAG configurations by releasing the SCell and then configuring the SCell as a part of the pTAG (when an SCell is added/configured without a TAG index, the SCell may be explicitly assigned to the pTAG). The PCell may not change its TA group and may be a member of the pTAG.

The purpose of an RRC connection reconfiguration procedure may be to modify an RRC connection, (e.g. to establish, modify and/or release RBs, to perform handover, to setup, modify, and/or release measurements, to add, modify, and/or release SCells). If the received RRC Connection Reconfiguration message includes the sCellToReleaseList, the UE may perform an SCell release. If the received RRC Connection Reconfiguration message includes the sCellToAddModList, the UE may perform SCell additions or modification.

In LTE Release-10 and Release-11 CA, a PUCCH is only transmitted on the PCell (PSCell) to an eNB. In LTE-Release 12 and earlier, a UE may transmit PUCCH information on one cell (PCell or PSCell) to a given eNB.

As the number of CA capable UEs and also the number of aggregated carriers increase, the number of PUCCHs and also the PUCCH payload size may increase. Accommodating the PUCCH transmissions on the PCell may lead to a high PUCCH load on the PCell. A PUCCH on an SCell may be introduced to offload the PUCCH resource from the PCell. More than one PUCCH may be configured for example, a PUCCH on a PCell and another PUCCH on an SCell. In the example embodiments, one, two or more cells may be configured with PUCCH resources for transmitting CSI/ACK/NACK to a base station. Cells may be grouped into multiple PUCCH groups, and one or more cell within a group may be configured with a PUCCH. In an example configuration, one SCell may belong to one PUCCH group. SCells with a configured PUCCH transmitted to a base station may be called a PUCCH SCell, and a cell group with a common PUCCH resource transmitted to the same base station may be called a PUCCH group.

In an example embodiment, a MAC entity may have a configurable timer timeAlignmentTimer per TAG. The timeAlignmentTimer may be used to control how long the MAC entity considers the Serving Cells belonging to the associated TAG to be uplink time aligned. The MAC entity may, when a Timing Advance Command MAC control element is received, apply the Timing Advance Command for the indicated TAG; start or restart the timeAlignmentTimer associated with the indicated TAG. The MAC entity may, when a Timing Advance Command is received in a Random Access Response message for a serving cell belonging to a TAG and/or if the Random Access Preamble was not selected by the MAC entity, apply the Timing Advance Command for this TAG and start or restart the timeAlignmentTimer associated with this TAG. Otherwise, if the timeAlignmentTimer associated with this TAG is not running, the Timing Advance Command for this TAG may be applied and the timeAlignmentTimer associated with this TAG started. When the contention resolution is considered not successful, a timeAlignmentTimer associated with this TAG may be stopped. Otherwise, the MAC entity may ignore the received Timing Advance Command In example embodiments, a timer is running once it is started, until it is stopped or until it expires; otherwise it may not be running A timer can be started if it is not running or restarted if it is running. For example, a timer may be started or restarted from its initial value.

Example embodiments of the invention may enable operation of multi-carrier communications. Other example embodiments may comprise a non-transitory tangible computer readable media comprising instructions executable by one or more processors to cause operation of multi-carrier communications. Yet other example embodiments may comprise an article of manufacture that comprises a non-transitory tangible computer readable machine-accessible medium having instructions encoded thereon for enabling programmable hardware to cause a device (e.g. wireless communicator, UE, base station, etc.) to enable operation of multi-carrier communications. The device may include processors, memory, interfaces, and/or the like. Other example embodiments may comprise communication networks comprising devices such as base stations, wireless devices (or user equipment: UE), servers, switches, antennas, and/or the like.

The amount of data traffic carried over cellular networks is expected to increase for many years to come. The number of users/devices is increasing and each user/device accesses an increasing number and variety of services, e.g. video delivery, large files, images. This requires not only high capacity in the network, but also provisioning very high data rates to meet customers' expectations on interactivity and responsiveness. More spectrum is therefore needed for cellular operators to meet the increasing demand Considering user expectations of high data rates along with seamless mobility, it is beneficial that more spectrum be made available for deploying macro cells as well as small cells for cellular systems.

Striving to meet the market demands, there has been increasing interest from operators in deploying some complementary access utilizing unlicensed spectrum to meet the traffic growth. This is exemplified by the large number of operator-deployed Wi-Fi networks and the 3GPP standardization of LTE/WLAN interworking solutions. This interest indicates that unlicensed spectrum, when present, can be an effective complement to licensed spectrum for cellular operators to help addressing the traffic explosion in some scenarios, such as hotspot areas. LAA offers an alternative for operators to make use of unlicensed spectrum while managing one radio network, thus offering new possibilities for optimizing the network's efficiency.

In an example embodiment, Listen-before-talk (clear channel assessment) may be implemented for transmission in an LAA cell. In a listen-before-talk (LBT) procedure, equipment may apply a clear channel assessment (CCA) check before using the channel. For example, the CCA utilizes at least energy detection to determine the presence or absence of other signals on a channel in order to determine if a channel is occupied or clear, respectively. For example, European and Japanese regulations mandate the usage of LBT in the unlicensed bands. Apart from regulatory requirements, carrier sensing via LBT may be one way for fair sharing of the unlicensed spectrum.

In an example embodiment, discontinuous transmission on an unlicensed carrier with limited maximum transmission duration may be enabled. Some of these functions may be supported by one or more signals to be transmitted from the beginning of a discontinuous LAA downlink transmission Channel reservation may be enabled by the transmission of signals, by an LAA node, after gaining channel access via a successful LBT operation, so that other nodes that receive the transmitted signal with energy above a certain threshold sense the channel to be occupied. Functions that may need to be supported by one or more signals for LAA operation with discontinuous downlink transmission may include one or more of the following: detection of the LAA downlink transmission (including cell identification) by UEs; time & frequency synchronization of UEs.

In an example embodiment, DL LAA design may employ subframe boundary alignment according to LTE-A carrier aggregation timing relationships across serving cells aggregated by CA. This may not imply that the eNB transmissions can start only at the subframe boundary. LAA may support transmitting PDSCH when not all OFDM symbols are available for transmission in a subframe according to LBT. Delivery of necessary control information for the PDSCH may also be supported.

LBT procedure may be employed for fair and friendly coexistence of LAA with other operators and technologies operating in unlicensed spectrum. LBT procedures on a node attempting to transmit on a carrier in unlicensed spectrum require the node to perform a clear channel assessment to determine if the channel is free for use. An LBT procedure may involve at least energy detection to determine if the channel is being used. For example, regulatory requirements in some regions, e.g., in Europe, specify an energy detection threshold such that if a node receives energy greater than this threshold, the node assumes that the channel is not free. While nodes may follow such regulatory requirements, a node may optionally use a lower threshold for energy detection than that specified by regulatory requirements. In an example, LAA may employ a mechanism to adaptively change the energy detection threshold, e.g., LAA may employ a mechanism to adaptively lower the energy detection threshold from an upper bound. Adaptation mechanism may not preclude static or semi-static setting of the threshold. In an example Category 4 LBT mechanism or other type of LBT mechanisms may be implemented.

Various example LBT mechanisms may be implemented. In an example, for some signals, in some implementation scenarios, in some situations, and/or in some frequencies no LBT procedure may performed by the transmitting entity. In an example, Category 2 (e.g. LBT without random back-off) may be implemented. The duration of time that the channel is sensed to be idle before the transmitting entity transmits may be deterministic. In an example, Category 3 (e.g. LBT with random back-off with a contention window of fixed size) may be implemented. The LBT procedure may have the following procedure as one of its components. The transmitting entity may draw a random number N within a contention window. The size of the contention window may be specified by the minimum and maximum value of N. The size of the contention window may be fixed. The random number N may be employed in the LBT procedure to determine the duration of time that the channel is sensed to be idle before the transmitting entity transmits on the channel. In an example, Category 4 (e.g. LBT with random back-off with a contention window of variable size) may be implemented. The transmitting entity may draw a random number N within a contention window. The size of contention window may be specified by the minimum and maximum value of N. The transmitting entity may vary the size of the contention window when drawing the random number N. The random number N is used in the LBT procedure to determine the duration of time that the channel is sensed to be idle before the transmitting entity transmits on the channel.

LAA may employ uplink LBT at the UE. The UL LBT scheme may be different from the DL LBT scheme (e.g. by using different LBT mechanisms or parameters) for example, since the LAA UL is based on scheduled access which affects a UE's channel contention opportunities. Other considerations motivating a different UL LBT scheme include, but are not limited to, multiplexing of multiple UEs in a single subframe.

In an example, a DL transmission burst may be a continuous transmission from a DL transmitting node with no transmission immediately before or after from the same node on the same CC. An UL transmission burst from a UE perspective may be a continuous transmission from a UE with no transmission immediately before or after from the same UE on the same CC. In an example, UL transmission burst is defined from a UE perspective. In an example, an UL transmission burst may be defined from an eNB perspective. In an example, in case of an eNB operating DL+UL LAA over the same unlicensed carrier, DL transmission burst(s) and UL transmission burst(s) on LAA may be scheduled in a TDM manner over the same unlicensed carrier. For example, an instant in time may be part of a DL transmission burst or an UL transmission burst.

In an example, vehicle-to-everything (V2X) may operate based on based on PC5 (e.g. direct interface between wireless entity, sidelink). A UE (e.g. wireless device, vehicle, pedestrian, roadside unit, infrastructure, and/or the like) may transmit a V2X message to multiple UEs at a local area in sidelink. For vehicle-to-infrastructure (V2I), either transmitter UE or receiver UE(s) may be UE-type RSU. For vehicle-to-pedestrian (V2P), either transmitter UE or receiver UE(s) may be pedestrian UE.

In an example, UE may autonomously allocate resource, at least mode 2, based on semi-statically network-configured/pre-configured radio parameters. In an example, eNB (e.g. base station) may provide more UE specific or/and more dynamic resource allocation including mode 1.

In an example, UEs may communicate over PC5 across a single carrier, and/or UEs may communicate over PC5 across multiple carriers. In an example, UE may operate with single operator, and/or a set of PC5 operation carrier(s) may be shared by UEs subscribed to different operators. UEs belonging to different operators may transmit on the same carrier. In an example, each operator may be allocated with a different carrier. A UE may transmit on the carrier allocated to the operator which it may belong to. In an example, V2X may use dedicated carriers, and/or there may be no uplink (Uu) traffic on the PC5 operation carrier. In an example, V2X carrier may share with Uu. One or more of scenarios and combinations above may be considered in scope.

In an example, V2X may operate based on Uu. For V2V and V2P, a UE may transmit a V2X message to E-UTRAN in uplink and/or E-UTRAN may transmit it to multiple UEs at a local area in downlink. For V2I, when receiver is eNB type RSU, a UE may transmit a V2I message to E-UTRAN (e.g. eNB type RSU) in uplink; and/or when transmitter is eNB type RSU, E-UTRAN (e.g. eNB type RSU) may transmit a I2V message to multiple UEs at a local area in downlink. In an example, for V2N, the UE may communicate with an application server (e.g. traffic safety server). For V2P, either transmitter UE or receiver UE(s) may be pedestrian UE. To support this scenario, E-UTRAN may perform uplink reception and/or downlink transmission of V2X messages. For downlink, E-UTRAN may use a broadcast mechanism. In an example, E-UTRAN may support RSU for V2V and V2P operation.

In an example, eNB deployment may consider including possibility of network control. eNB deployment and/or network control for radio resources may be in uplink and/or downlink. For UL (uplink), UEs may perform uplink transmissions at a single carrier for V2X messages, and/or UEs may perform uplink transmissions across multiple carriers for V2X messages. For DL, UEs may perform downlink receptions at a single carrier for V2X messages, and/or UEs may perform downlink receptions across multiple carriers for V2X messages. In an example, UE may operate with single operator (i.e. message exchange across operators may not be assumed). In an example, a set of Uu operation carrier(s) may be shared by UEs subscribed to different operators, wherein UEs belonging to different operators may transmit on the shared uplink carrier(s) while receiving on the shared downlink carrier(s). In an example, operators may be allocated with a different carrier for uplink and/or downlink, wherein a UE may transmit on the uplink carrier(s) allocated to the operator to which it may belong to. The UE may receive on multiple DL carriers, i.e. UE may receive on the downlink carrier allocated to the other operator as well as the downlink carrier allocated to the operator to which it belongs. A UE may be allowed to receive downlink broadcast of another operator.

In an example, V2X may operate using both Uu and PC5. In this scenario, a UE may transmit a V2X message to other UEs in sidelink. One of the receiving UEs is a UE type RSU which receives the V2X message in sidelink and transmits it to E-UTRAN in uplink. E-UTRAN receives the V2X message from the UE type RSU and/or transmits it to multiple UEs at a local area in downlink.

In an example, E-UTRAN may perform uplink reception and/or downlink transmission of V2X messages. For downlink, E-UTRAN may use a broadcast mechanism. E-UTRAN may support RSU function. In an example, UE may transmit a V2X message to E-UTRAN in uplink, and/or E-UTRAN may transmit it to one or more UE type RSUs. The UE type RSU may transmit the V2X message to other UEs in sidelink. In an example, E-UTRAN may perform uplink reception and/or downlink transmission of V2X messages. For downlink, E-UTRAN may use a broadcast mechanism. E-UTRAN may support RSU function.

In an example, for both PC5 and Uu, PC5 operation carrier and/or Uu operation carrier may be allocated to the same operator. PC5 operation carrier and Uu operation carrier may be allocated to different operators. In this case, uplink operation carrier and/or downlink operation carrier may be allocated to the same operator. In an example, uplink operation carrier and/or downlink operation carrier may be allocated to different operators. In an example, dedicated operation carrier may be used for V2X on which there may be sidelink traffic but no uplink (Uu) traffic, i.e. uplink and sidelink may be on different carriers. In an example, the uplink carrier may be shared with sidelink, i.e. uplink and sidelink may be on the same carrier. In an example, the uplink carrier may be the dedicated operation carrier for V2X.

An issue with respect to SPS configuration is how eNB configures SPS for the UE and how SPS configuration may be maintained or updated during a handover. In an example embodiment, some UEs may support configuration of SPS on an SCell and/or may support configuration and communication for V2X services. SPS configuration may be employed for V2X communications. In an example, V2X communication configurations may comprise SPS configuration parameters, for example, SPS configuration parameters on PCell and/or SCell. In an example embodiment, SPS may be employed for transmission of V2X traffic. Example V2X messages are shown below.

In an example, cooperative awareness messages (CAM) message generation may be dynamic in terms of size, periodicity and timing. Such changes may result in misalignment between SPS timing and CAM timing. There may be some regularity in size and periodicity between different triggers. SPS may be beneficial for some cases and SPS may be configured. UE assistance may be needed to trigger and/or employ SPS.

In an example, CAM may comprise status information (e.g. time, position, motion state, activated system, and/or the like) and/or attribute information (e.g. data about dimension, vehicle type and/or role in the road traffic, and/or the like). Decentralized environmental notification message (DENM) may comprise information related to a variety of events. Basic safety message (BSM) may comprise some of basic vehicle state information (e.g. message identifier, vehicle identifier, vehicle latitude/longitude, speed, acceleration status, and/or the like) and/or two option data frames (e.g. vehicle safety extension and/or vehicle status).

The eNB may configure multiple SPS configurations for a given UE. At least SPS-configuration-specific MCS (if MCS is part of the SPS-configuration) and SPS-configuration-specific periodicity may be configured. Some SPS parameters may differ across the SPS-configurations. The eNB may dynamically trigger/release the different SPS-configurations by use of (E)PDCCH. The UE may indicate to the eNB that it does not intend to transmit data before a transmission associated to an SPS configuration. V2X configuration in the specification refers to V2X and/or enhanced SPS configuration.

A UE may be configured with a first V2X configuration with a serving eNB. A target eNB may maintain the same V2X configuration, or may update the UE V2X configuration. The target eNB may have a different cell configuration and may require a different V2X configuration. In another example embodiment, the target eNB may employ cells with the same frequencies as the serving cell and may require maintaining the same V2X configuration. The target eNB may configure V2X configuration after the handover is completed or may configure V2X configuration during the handover process. Release 13 of LTE does not support V2X configuration, and addressing the V2X configuration changes during handover is not addressed in release 13 LTE technology. There is a need for developing a signalling flow, UE processes, and eNB processes to address V2X configuration, and V2X configuration parameter handling during the handover to reduce the handover overhead and delay, and increase handover efficiency. Furthermore, there is a need to develop handover signalling and handover message parameters to address V2X configuration during a handover process.

According to some of the various aspects of embodiments, in RRC_CONNECTED mode, the network may control UE mobility, for example, the network may decide when the UE connects to which E-UTRA cell(s) or inter-RAT cell. For network controlled mobility in RRC_CONNECTED, the PCell may be changed using an RRC Connection Reconfiguration message including the mobilityControlInfo (handover). The SCell(s) may be changed using the RRC Connection Reconfiguration message either with or without the mobilityControlInfo. The network may trigger the handover procedure e.g. based on radio conditions, load, QoS, UE category, and/or the like. To facilitate this, the network may configure the UE to perform measurement reporting (possibly including the configuration of measurement gaps). The network may also initiate handover blindly, for example without having received measurement reports from the UE. Before sending the handover message to the UE, the source eNB may prepare one or more target cells. The source eNB may select the target PCell. The source eNB may also provide the target eNB with a list of best cells on each frequency for which measurement information is available, for example, in order of decreasing RSRP. The source eNB may also include available measurement information for the cells provided in the list. The target eNB may decide which SCells are configured for use after handover, which may include cells other than the ones indicated by the source eNB.

According to some of the various aspects of embodiments, the target eNB may generate a message used to configure the UE for the handover, for example, the message including the access stratum configuration to be used in the target cell(s). The source eNB may transparently (for example, does not alter values/content) forward the handover message/information received from the target eNB to the UE. When appropriate, the source eNB may initiate data forwarding for (a subset of) the dedicated radio bearers. After receiving the handover message, the UE may attempt to access the target PCell at the available RACH occasion according to a random access resource selection. When allocating a dedicated preamble for the random access in the target PCell, E-UTRA may ensure the preamble is available from the first RACH occasion the UE may use. Upon successful completion of the handover, the UE may send a message used to confirm the handover to the target eNB.

According to some of the various aspects of embodiments, if the target eNB does not support the release of RRC protocol which the source eNB used to configure the UE, the target eNB may be unable to comprehend the UE configuration provided by the source eNB. In this case, the target eNB may use the full configuration option to reconfigure the UE for handover and re-establishment. Full configuration option includes an initialization of the radio configuration, which makes the procedure independent of the configuration used in the source cell(s) with the exception that the security algorithms are continued for the RRC re-establishment.

According to some of the various aspects of embodiments, after the successful completion of handover, PDCP SDUs may be re-transmitted in the target cell(s). This may apply for dedicated radio bearers using RLC-AM mode and/or for handovers not involving full configuration option. After the successful completion of handover not involving full configuration option, the SN (sequence number) and/or the HFN (hyper frame number) may be reset for some radio bearers. For the dedicated radio bearers using RLC-AM mode both SN and HFN may continue. For reconfigurations involving the full configuration option, the PDCP entities may be newly established (SN and HFN may not continue) for dedicated radio bearers irrespective of the RLC mode. UE behaviour to be performed upon handover may be the same regardless of the handover procedures used within the network (e.g. whether the handover includes X2 or S1 signalling procedures).

The source eNB may, for some time, maintain a context to enable the UE to return in case of handover failure. After having detected handover failure, the UE may attempt to resume the RRC connection either in the source PCell or in another cell using the RRC re-establishment procedure. This connection resumption may succeed if the accessed cell is prepared. For example, when the access cell is a cell of the source eNB or of another eNB towards which handover preparation has been performed. The cell in which the re-establishment procedure succeeds becomes the PCell while SCells, if configured, may be released.

Normal measurement and mobility procedures may be used to support handover to cells broadcasting a CSG (closed subscriber group) identity. In addition, E-UTRAN may configure the UE to report that it is entering or leaving the proximity of cell(s) included in its CSG whitelist. E-UTRAN may request the UE to provide additional information broadcast by the handover candidate cell e.g. cell global identity, CSG identity, CSG membership status. E-UTRAN may use the proximity report to configure measurements as well as to decide whether or not to request additional information broadcast by the handover candidate cell. The additional information may be used to verify whether or not the UE is authorised to access the target PCell and may also be needed to identify handover candidate cell. This may involve resolving PCI confusion, for example, when the physical layer identity that is included in the measurement report may not uniquely identify the cell.

According to some of the various aspects of embodiments, configuration of V2X may be configured by the serving eNB with RRC signalling. The mechanism for V2X configuration and reconfiguration may be based on RRC signalling. When needed, configuration of V2X may be reconfigured with RRC signalling. The mapping between an SCell and a V2X may not be reconfigured with RRC while the SCell is configured. For example if there is a need modify V2X configurations, at least one RRC message, for example at least one RRC reconfiguration message, may be send to the UE to reconfigure V2X configurations.

According to some of the various aspects of embodiments, when an eNB performs Cell addition configuration, the related V2X configuration may be configured for the Cell. eNB may modify V2X configuration of a Cell by removing (releasing) the Cell and adding a new Cell (with same physical cell ID and frequency) with an updated V2X (e.g. updated V2X ID). The new Cell with the updated V2X may be initially inactive subsequent to joining the updated V2X. eNB may activate the updated new SCell and/or start scheduling packets on the activated SCell.

According to some of the various aspects of embodiments, an eNB may consider UE's capability in configuring one or more V2X for a UE. UE may be configured with a configuration that is compatible with UE capability. V2X capability may be an optional feature in LTE release 14 (and/or beyond). UE may transmit its V2X capability to eNB via an RRC message and eNB may consider UE capability in configuring V2X configuration.

The purpose of RRC connection reconfiguration procedure may be to modify an RRC connection, e.g. to establish, modify and/or release RBs, to perform handover, to setup, modify, and/or release measurements, to add, modify, and/or release SCells. As part of the procedure, NAS dedicated information may be transferred from E-UTRAN to the UE. If the received RRC Connection Reconfiguration message includes the sCellToReleaseList, UE performs SCell release. If the received RRC Connection Reconfiguration message includes the sCellToAddModList, UE performs SCell additions or modification.

The UE context within the source eNB may contain information regarding roaming/handover restrictions which may be provided either at connection establishment or at the last TA (tracking area) update process. The source eNB may configure the UE measurement procedures employing at least one RRC connection reconfiguration message. The UE may be triggered to send at least one measurement report by the rules set by, for example, system information, RRC configuration, and/or the like. The source eNB may make a handover decision based on many parameters, for example, the measurement reports, RRM information, traffic and load, a combination of the above, and/or the like. The source eNB may initiate the handover procedure by sending a handover request message to one or more potential target eNBs. When the source eNB sends the handover request message, it may start a handover preparation timer. Upon reception of the handover request acknowledgement message the source eNB may stop the handover preparation timer.

The source eNB may transmit a handover request message to one or more potential target eNB passing information to prepare the handover at the target side. The handover request message may comprise V2X capability information of the UE. The target eNB may employ the V2X capability of the UE in order to properly configure V2X configuration of the UE before UE connects to the target UE. The target eNB may configure the UE considering the V2X configuration limitations and capabilities of the UE. For example, if the UE does not support V2X capability, the target eNB may not configure the UE with V2X(s). In another example, if the UE does not support V2X configuration with a certain band combinations, the eNB may consider this limitation in V2X configurations. In another example, a UE may not support V2X configuration, and eNB may consider this in configuring the UE before the UE accesses the target eNB. In another example embodiment, handover request message may further comprise the current V2X configuration of the UE connected to the serving eNB.

During the handover preparation phase, the serving eNB may transmit UE's V2X capability and/or UE's current V2X configuration (V2X of the UE in connection with the serving eNB) to one or more potential target eNBs. This information may be employed, at least in part, by the potential target eNB to configure the UE, for example, to configure V2X configuration parameters.

Handover admission control may be performed by the target eNB dependent on many factors, for example, QoS required for the UE bearers, UE capabilities, UE configuration, target eNB load, a combination of the above, and/or the like. The target eNB may configure the required resources according to the received information from the serving eNB and may reserve a C-RNTI and/or a RACH preamble. The access stratum configuration to be used in the target cell may be specified independently (for example as an establishment) or as a delta compared to the access stratum-configuration used in the source cell (for example as a reconfiguration).

The target eNB may prepare handover with L1/L2 and may send the handover request acknowledge message to the source eNB. The handover request acknowledge message may include a transparent container to be sent to the UE as an RRC message to perform the handover. The container may include a new C-RNTI, target eNB security algorithm identifiers for the selected security algorithms, a dedicated RACH preamble, access parameters, SIBs, and/or other configuration parameters. The transparent container may further comprise the V2X configurations for connection of the UE to the target eNB. The V2X configurations may modify the V2X of the UE or may keep the same V2X configuration that the UE has with the serving base station. The target eNB may generate the RRC message to perform the handover, for example, RRC connection reconfiguration message including the mobility control information. The RRC message may be sent by the source eNB towards the UE. The source eNB may perform the necessary integrity protection and ciphering of the message. The UE may receive the RRC connection reconfiguration message from the source eNB and may start performing the handover. The UE may not need to delay the handover execution for delivering the HARQ/ARQ responses to the source eNB.

After receiving the RRC connection reconfiguration message including the mobility control information, UE may perform synchronisation to the target eNB and accesses the target cell via RACH on the primary cell. UE Random access procedure may employ a contention-free procedure if a dedicated RACH preamble was indicated in the mobility control information. The UE random access procedure may employ a contention-based procedure if no dedicated preamble was indicated. UE may derive target eNB specific keys and may configure the selected security algorithms to be used in the target cell. The target eNB may respond with uplink allocation and timing advance. After the UE has successfully accessed the target cell, the UE may send an RRC connection reconfiguration complete message (C-RNTI) to confirm the handover and to indicate that the handover procedure is completed for the UE. UE may transmit a MAC uplink Buffer Status Report (BSR) Control Element (CE) along with the uplink RRC Connection Reconfiguration Complete message or may transmit a MAC uplink BSR CE whenever possible to the target eNB. The target eNB verifies the C-RNTI sent in the RRC Connection Reconfiguration Complete message. The target eNB may now begin sending data to the UE and receiving data from the UE.

According to some of the various aspects of embodiments, a serving base station may receive a first message from a wireless device on a primary cell in a plurality of cells. The first message may be an RRC UE capability message. The plurality of cells may comprise the primary cell and at least one secondary cell. The first message may comprise at least one parameter indicating whether the wireless device supports configuration of V2X(s). The base station may receive a plurality of radio capability parameters from the wireless device.

In an example embodiment, the capability message may comprise one or more parameters explicitly and/or implicitly indicating that the UE support configuration of V2X. For example, a parameter may indicate that the UE is capable of handling some types of V2X configuration, and this may imply that the UE is V2X capable. In an example, a parameter may indicate that the UE is capable of supporting a set of enhanced configuration parameters including enhanced SPS (e.g. V2X). In an example, a parameter may explicitly indicate that the UE is capable of handling enhanced SPS configuration. The eNB after receiving the UE capability message, may determine whether the UE can support configuration of enhanced SPS (V2X). The UE may selectively configure V2X for a UE by transmitting one or more RRC messages to the UE.

In an example embodiment, the capability may be received on a first signalling bearer on the primary cell. The plurality of radio capability parameters may comprise a first sequence of one or more radio configuration parameters. A first radio configuration parameter in the first sequence may comprise a first parameter indicating whether V2X may be supported for a first band and/or first band combination. The first band and/or first band combination may be in a second sequence of one or more band combinations. The index of the first radio configuration parameter in the first sequence may determine the index of the first band combination in the second sequence.

According to some of the various embodiments, the size of the first sequence may be the same as the size of the second sequence. The index may determine the order of: the first radio configuration parameter in the first sequence; and the first band combination in the second sequence. The first band combination may be identified by a first band combination parameter. The first band combination parameter may comprise a list of band identifier(s). Each of the band identifier(s) may be one of a finite set of numbers. Each of the numbers may identify a specific band.

According to some of the various embodiments, the wireless device may support one or more inter-band V2Xs if the list of band identifier(s) includes more than one band; and the first parameter indicates that V2X is supported. In yet other embodiments, the wireless device may support multiple intra-band V2X if the list of band identifier(s) includes one band; and the first parameter indicates that V2X is supported.

According to some of the various embodiments, the wireless device may not support V2X if none of the radio configuration parameters comprise a parameter indicating that V2X is supported.

In an example embodiment, a wireless device may transmit an RRC message comprising UE capability information. The UE capability information may comprise one or more information elements comprising wireless device LTE radio capability parameters. The LTE radio capability parameters may comprise a plurality of parameters indicating various capability of the wireless device LTE radio.

The serving base station may selectively transmit at least one second message to the wireless device if the at least one parameter indicates support for configuration of V2X. The at least one second message may configure V2X in the wireless device. If the at least one parameter does not indicate support for configuration V2X, the base station may not configure V2X in the wireless device. If the at least one parameter indicates support for configuration of the V2X, the base station may or may not configure V2X in the wireless device depending on the required wireless device configuration and many other parameters, such as types of application running on the UE and the traffic requirements. Transmission or not transmission (selective transmission) of at least one second message to configure V2X is determined by the base station based on many criteria described in this specification.

The at least one second control message may be configured to cause in the wireless device configuration of at least one cell in the plurality of cells and configuration of V2X. The first V2X may comprise a first subset of the plurality of cells. The second V2X may comprise a second subset of the at least one secondary cell.

The at least one second control message may be configured to further cause in the wireless device configuration of one or more SPS configuration. A cell add-modify information element may comprise a first plurality of dedicated parameters. The first plurality of dedicated parameters may comprise a first cell index for a first secondary cell in the at least one secondary cell. The at least one second control message may further include configuration information for physical channels for the wireless device. The at least one second control message may be configured to further cause the wireless device to set up or modify at least one radio bearer.

The serving base station may receive at least one measurement report from the wireless device in response to the at least one second message. The at least one measurement report may comprise signal quality information of at least one of the at least one cell of at least one of the at least one target base station. The signal quality information may be derived at least in part employing measurements of at least one OFDM subcarrier. The serving base station may make a handover decision, based, at least in part, on the at least one measurement report, and/or other parameters, such as load, QoS, mobility, etc. The serving base station may also make a decision depending on base station internal proprietary algorithm.

The serving base station may transmit at least one third message to at least one of the at least one target base station. The at least one third message may comprise the at least one parameter indicating whether the wireless device supports configuration of V2X. The at least one third message may comprise a plurality of parameters of the configuration at least indicating association between at least one cell and a corresponding V2X (configuration information of one or more V2Xs). The at least one third message may be a handover request message transmitted to at least one target base station to prepare the target base stations for the handover of the wireless device. The UE capability parameters may be included in the at least one third message. UE dedicated radio parameters comprising UE V2X configuration may also be included in the handover request message. UE dedicated radio parameters may comprise MACMainconfig information element. UE dedicated radio parameters may comprise V2X configuration including V2X indices and associated cell indices.

According to some of the various aspects of embodiments, a serving base station, in response to making a handover decision by the serving base station for a wireless device, may transmit at least one third message to at least one target base station. The at least one third message may comprise the at least one parameter indicating whether the wireless device supports configuration of V2X. The format of the parameter (information element) indicating whether the wireless device supports configuration of a V2X is the same format as the UE capability message transmitted by the wireless device to the base station in the first message as described in the specification. The at least one third message may further comprise a plurality of parameters of the configuration of V2X (configuration information of V2X). The parameters included in the configuration information of V2X may be the same as the ones included in the at least one second message as described in this specification. The at least one third message may be a handover request message transmitted to at least one target base station to prepare the target base stations for the handover of the wireless device. The UE capability parameters may be included in the at least one third message. UE dedicated radio parameters comprising UE V2X configuration may also be included in the handover request message. UE dedicated radio parameters may comprise MACMainconfig information element. UE dedicated radio parameters may comprise V2X configuration including V2X indices and associated cell indices.

The serving base station may receive from one of the at least one target base station at least one fourth message. The at least one fourth message may comprise configuration of a plurality of cells for the wireless device. The plurality of cells may comprise a primary cell and at least one secondary cell. The configuration may associate V2X configuration with a cell in the plurality of cells.

The serving base station may transmit a fifth message to the wireless device. The fifth message may comprise a plurality of parameters of the configuration at least indicating association between at least one cell and a corresponding V2X (configuration information of V2X). The fifth message may cause the wireless device to start a synchronization process with the target base station (with a cell in the target base station).

The base station may, before transmission of the fifth message, encrypt the fifth message and protect the fifth message by an integrity header. The fifth message may further include configuration information for physical channels for the wireless device. The fifth message may be configured to cause the wireless device to set up or modify at least one radio bearer. The fifth message may be configured to further cause the wireless device to configure at least one of a physical layer parameter, a MAC layer parameter, and an RLC layer parameter. The plurality of cells of the target base station may be in more than one frequency band, for example, one or more cells may be in frequency band A and one or more other cells may be in frequency band B (inter-band carrier aggregation). The wireless device may support configuration of V2X.

In an example, a request message for a UE (e.g. handover request message, SeNB addition request message, SeNB modification request message, and/or the like) may comprise one or more bearer configuration information. The one or more bearer configuration information may indicate that a bearer support at least one V2X service and/or comprise V2X service information associated with the bearer (e.g. V2V, V2I, V2P, V2N, MBSFN, SC-PTM, QoS requirement information, required latency information, TMGI, sidelink requirement information, and/or the like). In the legacy system, the request message may comprise QoS information comprising V2X QoS requirement information for a bearer. However, because an information field (QCI) indicating V2X QoS requirement information may be associated with V2X services or other type of services in the legacy system (e.g. QCI 3 for Real Time Gaming or V2X messages), a base station receiving the request message with the V2X QoS requirement information may be confused in whether a bearer required for the UE is associated with V2X services or other type of services, and it may not be able to make a decision on accepting the request if it does not support V2X services. An example embodiment provides V2X service indications for a bearer to resolve this confusing scenario.

In an example, a UE with V2X services may handover from one cell to another cell. An eNB may send a handover request to a target eNB comprising the target cell. An eNB receiving a handover request for a UE with V2X services may decide that it will accept the handover request or not. An eNB receiving a handover request for a UE with V2X services may decide that it will setup bearers for V2X services or not. The current X2 protocol and handover mechanisms/signaling may require enhancements to enable an eNB to make a decision on accepting a handover request for a UE and/or a decision on setting up bearers for V2X services. The current X2 protocol and handover mechanisms/signaling may require enhancements to improve handover procedures for the UE with V2X services. In the legacy network, handover of a UE with V2X services may fail or V2X services may be interrupted due to handover.

In an example, a UE with V2X services may handover from one cell to another cell. An eNB may send a handover required message to an MME. An eNB receiving a handover request for a UE from the MME may decide that it will accept the handover request or not. An eNB receiving a handover request for a UE with V2X services may decide that it will setup bearers for V2X services or not. The current protocol and handover mechanisms/signaling may require enhancements to enable an eNB to make a decision on accepting a handover request for a UE and/or a decision on setting up bearers for V2X services. The current protocol and handover mechanisms/signaling may require enhancements to improve handover procedures for the UE with V2X services. In the legacy network, handover of a UE with V2X services may fail or V2X services may be interrupted due to handover.

Example embodiments may improve the handover procedures for a UE with V2X services. Example embodiments provide enhancements to current handover mechanism and increase V2X service reliability and continuity. In an example embodiment, a UE with V2X services may continue the V2X service that is provided to the UE in the current cell after moving to another cell, or a UE without V2X services in the current cell may initiate a V2X service after moving to another cell. Example embodiments enable a serving UE to continue its V2X service or initiate its V2X service when it is moving in an area covered by multiple eNB. Example embodiments enable an eNB to make a decision on accepting a handover request for a UE with an existing V2X service, or for a UE initiating a V2X service. Example embodiments enable an eNB to make a decision on setting up bearers for V2X services for a UE with an existing V2X service, or for a UE initiating a V2X service. Example embodiments may enhance network performance by enabling an eNB to employ information of bearers for V2X services from an eNB sending a handover request for a UE with V2X services. Example embodiments may enable an eNB receiving a handover request to make a handover decision and/or an (dual connectivity) SeNB addition decision for a UE with V2X services in the future.

Figure 10:
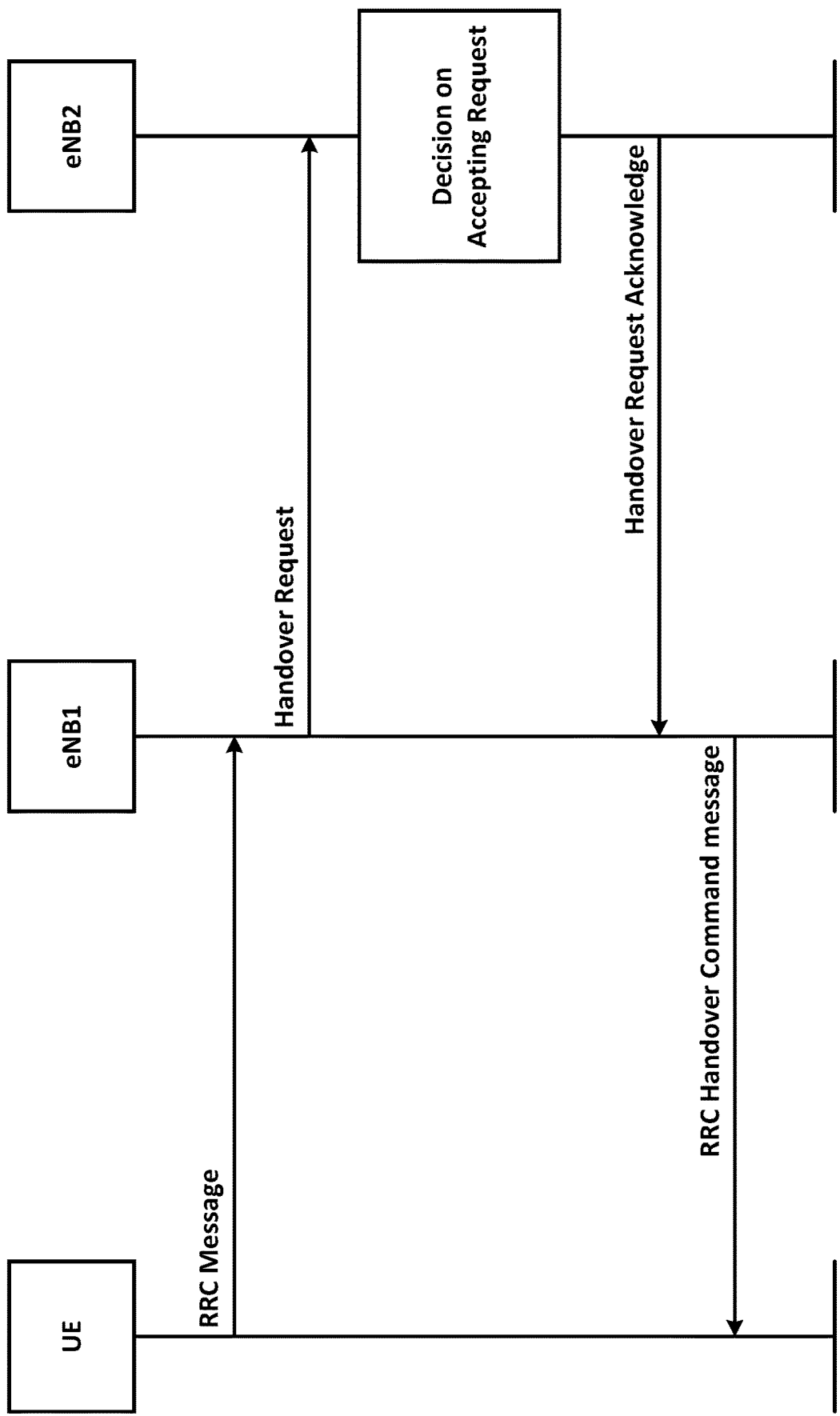
FIG. 10 is an example data flow diagram as per an aspect of embodiments of the present disclosure.

In an example embodiment, in FIG. 10, a first eNB may transmit a first message to a second eNB. The second eNB may transmit a second message to the first eNB. The first message for example may be a handover request message. The second message may be a handover request acknowledge message. The first message and the second message may be exchanged as a part of an X2 mobility procedure.

In an example embodiment, the first eNB may transfer to the second eNB the information that a UE requesting a handover to a cell of the second eNB may continue V2X services or initiate a V2X service through bearers for V2X services after moving to a cell of the second eNB. For example, the first message may comprise information of a list of bearers for V2X services required by a UE requesting a handover to a cell of the second eNB in a cell of the second eNB. In an example, a handover request message may be used to transfer this information from the information sending eNB to the information receiving eNB.

In an example, in the X2 mobility procedure, the handover request message may comprise the information that a UE requesting a handover requires V2X services after completing a handover procedure. The handover request message may contain information indicating whether a bearer required for the UE requesting a handover is to provide V2X services or not. In an example, the handover request message may comprise one or more V2X service indications for a bearer required by a UE requesting a handover. For example, the message may comprise one or more PLMN IDs of the V2X services, various types of V2X services (e.g. V2V, V2N, V2P, V2I, and/or the like), multimedia broadcast multicast service single frequency network (MBSFN) or single cell point to multipoint (SC-PTM) services and/or parameters for V2X downlink, uplink V2X services requirements (semi-persistent scheduling (SPS) requirements, etc), sidelink V2X services requirements, temporary mobile group identities (TMGIs) of the V2X services, and/or other information related to V2X services for a bearer (e.g. packet flow, session, and/or the like) required by a UE requesting a handover. In an example an IE may include whether a cell is only for V2X or it may support both data and V2X. In an example an IE may include whether the node has roadside unit (RSU) and/or eNB capabilities. In an example an IE may indicate whether a PLMN is only for V2X or for both V2X and data. In an example an IE may indicate the TMGI.

In an example, in the X2 mobility procedure, the handover request message may comprise the information that a UE requesting a handover requires V2X services after completing a handover procedure. The E-RABs To Be Setup Item IE in the handover request message may contain information indicating whether a bearer required for the UE requesting a handover is to provide V2X services or not. In an example, the handover request message may comprise one or more V2X service indications for a bearer required by a UE requesting a handover. For example, the message may comprise one or more PLMN IDs of the V2X services, various types of V2X services (e.g. V2V, V2N, V2P, V2I, and/or the like), MBSFN or SC-PTM services and/or parameters for V2X downlink, uplink V2X services requirements (SPS requirements, etc), sidelink V2X services requirements, TMGIs of the V2X services, and/or other information related to V2X services for a bearer required by a UE requesting a handover. The example indications may be included in an E-RABs To Be Setup Item IE in the handover request message and/or the handover request message. In an example an IE may include whether a cell is only for V2X or it may support both data and V2X. In an example an IE may include whether the node has RSU and/or eNB capabilities. In an example an IE may indicate whether a PLMN is only for V2X or for both V2X and data. In an example an IE may indicate the TMGI.

In an example, in the X2 mobility procedure, the handover request message may comprise the information that a UE requesting a handover requires V2X services after completing a handover procedure. The Bearer Type IE in the E-RABs To Be Setup Item IE in the handover request message may contain information indicating whether a bearer required for the UE requesting a handover is to provide V2X services or not. In an example, the handover request message may comprise one or more V2X service indications for a bearer required by a UE requesting a handover. For example, the message may comprise one or more PLMN IDs of the V2X services, various types of V2X services (e.g. V2V, V2N, V2P, V2I, and/or the like), MBSFN or SC-PTM services and/or parameters for V2X downlink, uplink V2X services requirements (SPS requirements, etc), sidelink V2X services requirements, TMGIs of the V2X services, and/or other information related to V2X services for a bearer required by a UE requesting a handover. The example indications may be included in a Bearer Type IE in the E-RABs To Be Setup Item IE in the handover request message and/or the handover request message. In an example an IE may include whether a cell is only for V2X or it may support both data and V2X. In an example an IE may include whether the node has RSU and/or eNB capabilities. In an example an IE may indicate whether a PLMN is only for V2X or for both V2X and data. In an example an IE may indicate the TMGI.

In an example, in the X2 mobility procedure, the handover request message may comprise the information that a UE requesting a handover requires V2X services after completing a handover procedure. The E-RAB ID IE in the E-RABs To Be Setup Item IE in the handover request message may contain information indicating whether a bearer required for the UE requesting a handover is to provide V2X services or not. In an example, the E-RAB ID IE may be an ID assigned for V2X services. In an example, the handover request message may comprise one or more V2X service indications for a bearer required by a UE requesting a handover. For example, the message may comprise one or more PLMN IDs of the V2X services, various types of V2X services (e.g. V2V, V2N, V2P, V2I, and/or the like), MBSFN or SC-PTM services and/or parameters for V2X downlink, uplink V2X services requirements (SPS requirements, etc), sidelink V2X services requirements, TMGIs of the V2X services, and/or other information related to V2X services for a bearer required by a UE requesting a handover. The example indications may be included in an E-RAB ID IE in the E-RABs To Be Setup Item IE in the handover request message and/or the handover request message. In an example an IE may include whether a cell is only for V2X or it may support both data and V2X. In an example an IE may include whether the node has RSU and/or eNB capabilities. In an example an IE may indicate whether a PLMN is only for V2X or for both V2X and data. In an example an IE may indicate the TMGI.

In an example, in the X2 mobility procedure, the handover request message may comprise the information that a UE requesting a handover requires V2X services after completing a handover procedure. The E-RAB Level QoS Parameters IE in the E-RABs To Be Setup Item IE in the handover request message may contain information indicating whether a bearer required for the UE requesting a handover is to provide V2X services or not. In an example, a QCI IE in the E-RAB Level QoS Parameters IE may comprise a QCI value dedicated for V2X services. In an example, the handover request message may comprise one or more V2X service indications for a bearer required by a UE requesting a handover. For example, the message may comprise one or more PLMN IDs of the V2X services, various types of V2X services (e.g. V2V, V2N, V2P, V2I, and/or the like), MBSFN or SC-PTM services and/or parameters for V2X downlink, uplink V2X services requirements (SPS requirements, etc), sidelink V2X services requirements, TMGIs of the V2X services, and/or other information related to V2X services for a bearer required by a UE requesting a handover. The example indications may be included in an E-RAB Level QoS Parameters IE in the E-RABs To Be Setup Item IE in the handover request message and/or the handover request message. In an example an IE may include whether a cell is only for V2X or it may support both data and V2X. In an example an IE may include whether the node has RSU and/or eNB capabilities. In an example an IE may indicate whether a PLMN is only for V2X or for both V2X and data. In an example an IE may indicate the TMGI.

In an example, in the X2 mobility procedure, the handover request message may comprise the information that a UE requesting a handover requires V2X services after completing a handover procedure. The UL GTP Tunnel Endpoint IE in the E-RABs To Be Setup Item IE in the handover request message may contain information indicating whether a bearer required for the UE requesting a handover is to provide V2X services or not. In an example, the UL GTP Tunnel Endpoint IE may indicate an UL GTP tunnel endpoint address of a core network supporting V2X services. In an example, the handover request message may comprise one or more V2X service indications for a bearer required by a UE requesting a handover. For example, the message may comprise one or more PLMN IDs of the V2X services, various types of V2X services (e.g. V2V, V2N, V2P, V2I, and/or the like), MBSFN or SC-PTM services and/or parameters for V2X downlink, uplink V2X services requirements (SPS requirements, etc), sidelink V2X services requirements, TMGIs of the V2X services, and/or other information related to V2X services for a bearer required by a UE requesting a handover. The example indications may be included in an UL GTP Tunnel Endpoint IE in the E-RABs To Be Setup Item IE in the handover request message and/or the handover request message. In an example an IE may include whether a cell is only for V2X or it may support both data and V2X. In an example an IE may include whether the node has RSU and/or eNB capabilities. In an example an IE may indicate whether a PLMN is only for V2X or for both V2X and data. In an example an IE may indicate the TMGI.

In an example, in the X2 mobility procedure, a handover request acknowledge message may comprise information that a list of bearers may not be admitted at the information sending eNB because a handover target cell of the information sending eNB and/or the information sending eNB may not support V2X services. In an example, the E-RABs Not Admitted List IE in the handover request acknowledge message may contain information that a list of bearers may be rejected at the information sending eNB because a handover target cell of the information sending eNB and/or the information sending eNB may not support V2X services.

In an example, in the X2 mobility procedure, a handover request acknowledge message may comprise information that a list of bearers may not be admitted at the information sending eNB because a handover target cell of the information sending eNB and/or the information sending eNB may not support V2X services. In an example, the Cause IE in the E-RABs Not Admitted List IE in the handover request acknowledge message may contain information that a list of bearers may be rejected at the information sending eNB because a handover target cell of the information sending eNB and/or the information sending eNB may not support V2X services.

In an example, in the X2 mobility procedure, a handover preparation failure message may comprise the information that a handover request for a UE may not be allowed because a handover target cell of the information sending eNB and/or the information sending eNB may not support V2X services. In an example, the Cause IE in the handover preparation failure message may contain information that a handover request for a UE may be rejected because a handover target cell of the information sending eNB and/or the information sending eNB may not support V2X services.

Figure 11:
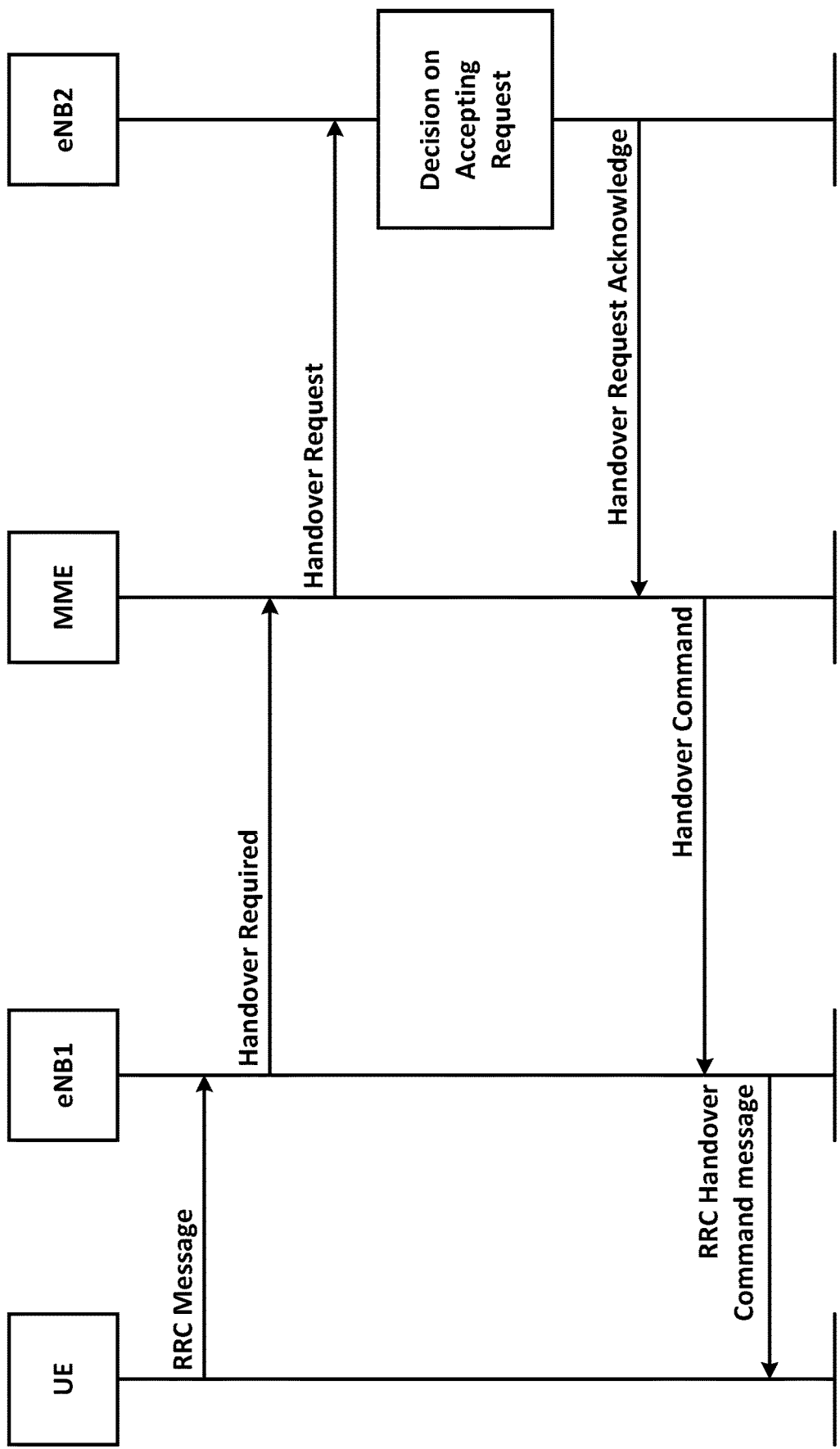
FIG. 11 is an example data flow diagram as per an aspect of embodiments of the present disclosure.

In an example embodiment, in FIG. 11, a first eNB may transmit a first message to an MME. The MME may transmit a second message to a second eNB. The second eNB may transmit a third message to the MME. The MME may transmit a fourth message to the first eNB.

The first message for example may be a handover required message. The second message may be a handover request message. The third message may be a handover request acknowledge message. The fourth message may be a handover command message. The first message, the second message, the third message, and the fourth message may be exchanged as a part of an S1-based handover procedure. The first message and the fourth message may be a part of a handover preparation procedure. The second message and the third message may be a part of a handover resource allocation procedure.

In an example embodiment, the first eNB, the second eNB, and the MME may exchange the information that a UE requesting a handover to a cell of the second eNB may continue V2X services or initiate a V2X service through bearers for V2X services after moving to a cell of the second eNB. For example, the first message and/or the second message may comprise information of a list of bearers for V2X service required by a UE requesting a handover to a cell of the second eNB in a cell of the second eNB. In an example, a handover required message may be used to transfer this information from the information sending eNB to the MME, and the handover request message may be used to forward this information from the MME to the information receiving eNB.

In an example, in the S1-based handover procedure, the handover required message from a first eNB to an MME and/or the handover request message from an MME to a second eNB may comprise the information that a UE requesting a handover requires V2X services after completing a handover procedure. The handover required message and/or the handover request message may contain information indicating whether a bearer required for the UE requesting a handover is to provide V2X services or not. In an example, the handover required message and/or the handover request message may comprise one or more V2X service indications for a bearer required by a UE requesting a handover. For example, the message may comprise one or more PLMN IDs of the V2X services, various types of V2X services (e.g. V2V, V2N, V2P, V2I, and/or the like), MBSFN or SC-PTM services and/or parameters for V2X downlink, uplink V2X services requirements (SPS requirements, etc), sidelink V2X services requirements, TMGIs of the V2X services, and/or other information related to V2X services for a bearer required by a UE requesting a handover. In an example an IE may include whether a cell is only for V2X or it may support both data and V2X. In an example an IE may include whether the node has RSU and/or eNB capabilities. In an example an IE may indicate whether a PLMN is only for V2X or for both V2X and data. In an example an IE may indicate the TMGI.

In an example, in the S1-based handover procedure, the handover required message from a first eNB to an MME and/or the handover request message from an MME to a second eNB may comprise the information that a UE requesting a handover requires V2X services after completing a handover procedure. The E-RABs To Be Setup Item IEs in the handover request message may contain information indicating whether a bearer required for the UE requesting a handover is to provide V2X services or not. In an example, the handover required message and/or the handover request message may comprise one or more V2X service indications for a bearer required by a UE requesting a handover. For example, the message may comprise one or more PLMN IDs of the V2X services, various types of V2X services (e.g. V2V, V2N, V2P, V2I, and/or the like), MBSFN or SC-PTM services and/or parameters for V2X downlink, uplink V2X services requirements (SPS requirements, etc), sidelink V2X services requirements, TMGIs of the V2X services, and/or other information related to V2X services for a bearer required by a UE requesting a handover. The example indications may be included in an E-RABs To Be Setup Item IEs in the handover request message. In an example an IE may include whether a cell is only for V2X or it may support both data and V2X. In an example an IE may include whether the node has RSU and/or eNB capabilities. In an example an IE may indicate whether a PLMN is only for V2X or for both V2X and data. In an example an IE may indicate the TMGI.

In an example, in the S1-based handover procedure, the handover required message from a first eNB to an MME and/or the handover request message from an MME to a second eNB may comprise the information that a UE requesting a handover requires V2X services after completing a handover procedure. The Bearer Type IE in the E-RABs To Be Setup Item IEs in the handover request message may contain information indicating whether a bearer required for the UE requesting a handover is to provide V2X services or not. In an example, the handover required message and/or the handover request message may comprise one or more V2X service indications for a bearer required by a UE requesting a handover. For example, the message may comprise one or more PLMN IDs of the V2X services, various types of V2X services (e.g. V2V, V2N, V2P, V2I, and/or the like), MBSFN or SC-PTM services and/or parameters for V2X downlink, uplink V2X services requirements (SPS requirements, etc), sidelink V2X services requirements, TMGIs of the V2X services, and/or other information related to V2X services for a bearer required by a UE requesting a handover. The example indications may be included in a Bearer Type IE in the E-RABs To Be Setup Item IEs in the handover request message. In an example an IE may include whether a cell is only for V2X or it may support both data and V2X. In an example an IE may include whether the node has RSU and/or eNB capabilities. In an example an IE may indicate whether a PLMN is only for V2X or for both V2X and data. In an example an IE may indicate the TMGI.

In an example, in the S1-based handover procedure, the handover required message from a first eNB to an MME and/or the handover request message from an MME to a second eNB may comprise the information that a UE requesting a handover requires V2X services after completing a handover procedure. The E-RAB ID IE in the E-RABs To Be Setup Item IEs in the handover request message may contain information indicating whether a bearer required for the UE requesting a handover is to provide V2X services or not. In an example, the E-RAB ID IE may be an ID assigned for V2X services. In an example, the handover required message and/or the handover request message may comprise one or more V2X service indications for a bearer required by a UE requesting a handover. For example, the message may comprise one or more PLMN IDs of the V2X services, various types of V2X services (e.g. V2V, V2N, V2P, V2I, and/or the like), MBSFN or SC-PTM services and/or parameters for V2X downlink, uplink V2X services requirements (SPS requirements, etc), sidelink V2X services requirements, TMGIs of the V2X services, and/or other information related to V2X services for a bearer required by a UE requesting a handover. The example indications may be included in an E-RAB ID in the E-RABs To Be Setup Item IEs in the handover request message. In an example an IE may include whether a cell is only for V2X or it may support both data and V2X. In an example an IE may include whether the node has RSU and/or eNB capabilities. In an example an IE may indicate whether a PLMN is only for V2X or for both V2X and data. In an example an IE may indicate the TMGI.

In an example, in the S1-based handover procedure, the handover required message from a first eNB to an MME and/or the handover request message from an MME to a second eNB may comprise the information that a UE requesting a handover requires V2X services after completing a handover procedure. The E-RAB Level QoS Parameters IE in the E-RABs To Be Setup Item IEs in the handover request message may contain information indicating whether a bearer required for the UE requesting a handover is to provide V2X services or not. In an example, a QCI IE in the E-RAB Level QoS Parameters IE may comprise a QCI value dedicated for V2X services. In an example, the handover required message and/or the handover request message may comprise one or more V2X service indications for a bearer required by a UE requesting a handover. For example, the message may comprise one or more PLMN IDs of the V2X services, various types of V2X services (e.g. V2V, V2N, V2P, V2I, and/or the like), MBSFN or SC-PTM services and/or parameters for V2X downlink, uplink V2X services requirements (SPS requirements, etc), sidelink V2X services requirements, TMGIs of the V2X services, and/or other information related to V2X services for a bearer required by a UE requesting a handover. The example indications may be included in an E-RAB Level QoS Parameters IE in the E-RABs To Be Setup Item IEs in the handover request message. In an example an IE may include whether a cell is only for V2X or it may support both data and V2X. In an example an IE may include whether the node has RSU and/or eNB capabilities. In an example an IE may indicate whether a PLMN is only for V2X or for both V2X and data. In an example an IE may indicate the TMGI.

In an example, in the S1-based handover procedure, the handover required message from a first eNB to an MME and/or the handover request message from an MME to a second eNB may comprise the information that a UE requesting a handover requires V2X services after completing a handover procedure. The GTP-TEID IE in the E-RABs To Be Setup Item IEs in the handover request message may contain information indicating whether a bearer required for the UE requesting a handover is to provide V2X services or not. In an example, the GTP-TEID IE may indicate an UL GTP tunnel endpoint address of a core network supporting V2X services. In an example, the handover required message and/or the handover request message may comprise one or more V2X service indications for a bearer required by a UE requesting a handover. For example, the message may comprise one or more PLMN IDs of the V2X services, various types of V2X services (e.g. V2V, V2N, V2P, V2I, and/or the like), MBSFN or SC-PTM services and/or parameters for V2X downlink, uplink V2X services requirements (SPS requirements, etc), sidelink V2X services requirements, TMGIs of the V2X services, and/or other information related to V2X services for a bearer required by a UE requesting a handover. The example indications may be included in a GTP-TEID IE in the E-RABs To Be Setup Item IEs in the handover request message. In an example an IE may include whether a cell is only for V2X or it may support both data and V2X. In an example an IE may include whether the node has RSU and/or eNB capabilities. In an example an IE may indicate whether a PLMN is only for V2X or for both V2X and data. In an example an IE may indicate the TMGI.

In an example, in the S1-based handover procedure, a handover request acknowledge message and/or a handover command message may comprise information that a list of bearers may not be admitted at the information sending eNB because a handover target cell of the information sending eNB and/or the information sending eNB may not support V2X services. In an example, the E-RABs Failed to Setup List IE in the handover request acknowledge message may contain information that a list of bearers may be rejected at the information sending eNB because a handover target cell of the information sending eNB and/or the information sending eNB may not support V2X services. In an example, the E-RABs to Release List IE in the handover command message may contain information that a list of bearers may be rejected at the information sending eNB because a handover target cell of the information sending eNB and/or the information sending eNB may not support V2X services.

In an example, in the S1-based handover procedure, a handover request acknowledge message and/or a handover command message may comprise information that a list of bearers may not be admitted at the information sending eNB because a handover target cell of the information sending eNB and/or the information sending eNB may not support V2X services. In an example, the Cause IE in the E-RABs Failed to Setup List IE in the handover request acknowledge message and/or in the E-RABs to Release List IE in the handover command message may contain information that a list of bearers may be rejected at the information sending eNB because a handover target cell of the information sending eNB and/or the information sending eNB may not support V2X services.

In an example, in the S1-based handover procedure, a handover preparation failure message and/or a handover failure message may comprise the information that a handover request for a UE may not be allowed because a handover target cell of the information sending eNB and/or the information sending eNB may not support V2X services. In an example, the Cause IE in the handover preparation failure message and/or a handover failure message may contain information that a handover request for a UE may be rejected because a handover target cell of the information sending eNB and/or the information sending eNB may not support V2X services.

Figure 12:
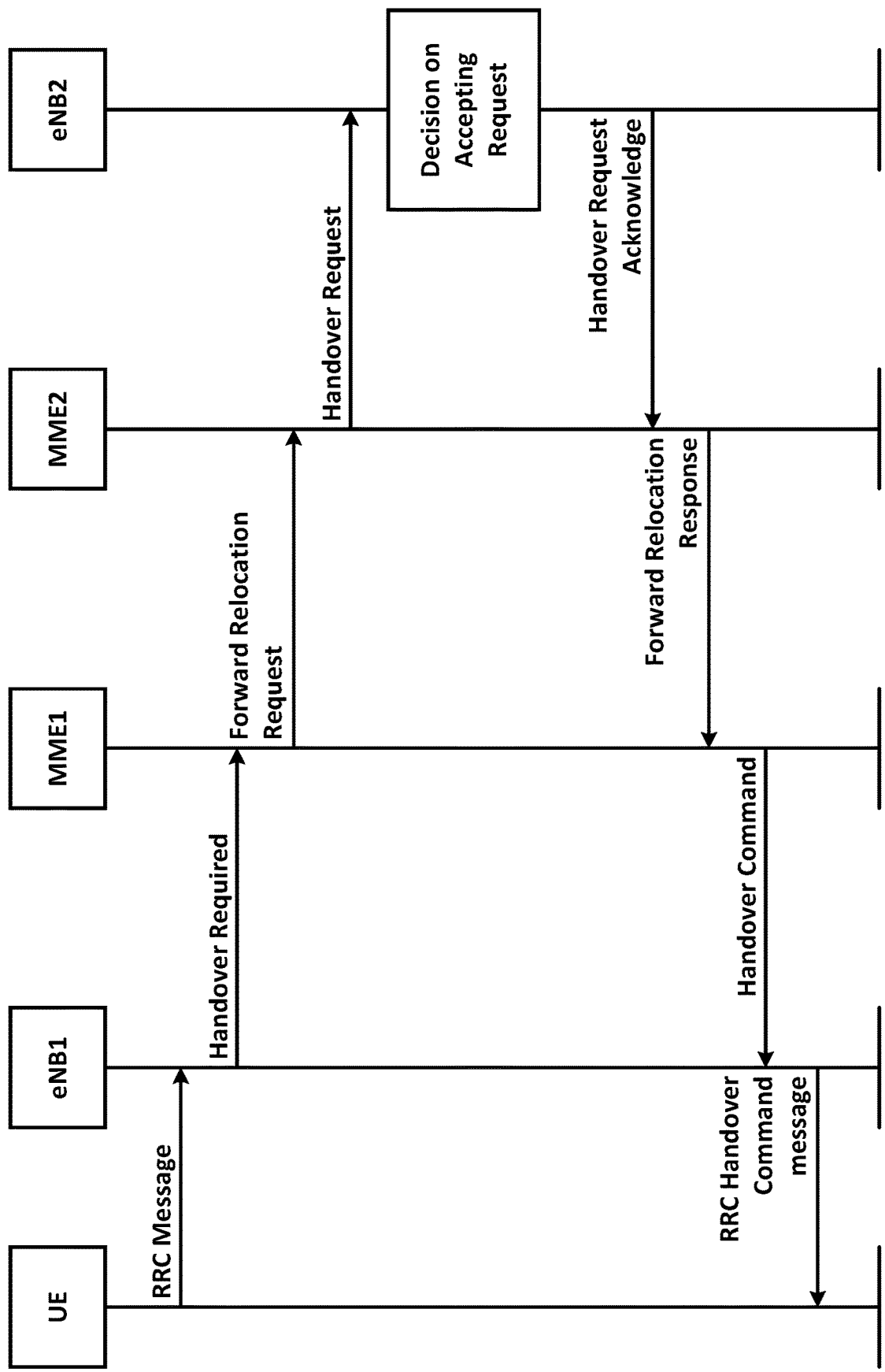
FIG. 12 is an example data flow diagram as per an aspect of embodiments of the present disclosure.

In an example embodiment, in FIG. 12, a first eNB may transmit a first message to an first MME. The first MME may transmit a second message to a second MME. The second MME may transmit a third message to a second eNB. The second eNB may transmit a fourth message to the second MME. The second MME may transmit a fifth message to the first MME. The first MME may transmit a sixth message to the first eNB.

The first message, for example, may be a handover required message. The second message may be a forward relocation request message. The third message may be a handover request message. The fourth message may be a handover request acknowledge message. The fifth message may be a forward relocation response message. The sixth message may be a handover command message. The first message, the second message, the third message, the fourth message, the fifth message, and the sixth message may be exchanged as a part of an S1-based handover procedure. The first message and the sixth message may be a part of a handover preparation procedure. The third message and the fourth message may be a part of a handover resource allocation procedure. The second message and the fifth message may be a part of S10 mobility management messages.

In an example embodiment, the first eNB, the second eNB, the first MME, and the second MME may exchange the information that a UE requesting a handover to a cell of the second eNB may continue V2X services or initiate a V2X service after moving to a cell of the second eNB. For example, the first message, the second message, and/or the third message may comprise information of a list of bearers for V2X service required by a UE requesting a handover to a cell of the second eNB in a cell of the second eNB. In an example, a handover required message may be used to transfer this information from the information sending eNB to the first MME, the forward relocation request message may be used to forward this information from the first MME to the second MME, and the handover request message may be used to forward this information from the second MME to the information receiving eNB.

In an example, in the S1-based handover procedure, the handover required message from a first eNB to a first MME, the forward relocation request message from a first MME to a second MME, and/or the handover request message from a second MME to a second eNB may comprise the information that a UE requesting a handover requires V2X services after completing a handover procedure. The handover required message, the forward relocation request message, and/or the handover request message may contain information indicating whether a bearer required for the UE requesting a handover is to provide V2X services or not. In an example, the handover required message, the forward relocation request message, and/or the handover request message may comprise one or more V2X service indications for a bearer required by a UE requesting a handover. For example, the message may comprise one or more PLMN IDs of the V2X services, various types of V2X services (e.g.

V2V, V2N, V2P, V2I, and/or the like), MBSFN or SC-PTM services and/or parameters for V2X downlink, uplink V2X services requirements (SPS requirements, etc), sidelink V2X services requirements, TMGIs of the V2X services, and/or other information related to V2X services for a bearer required by a UE requesting a handover. In an example an IE may include whether a cell is only for V2X or it may support both data and V2X. In an example an IE may include whether the node has RSU and/or eNB capabilities. In an example an IE may indicate whether a PLMN is only for V2X or for both V2X and data. In an example an IE may indicate the TMGI.

In an example, in the S1-based handover procedure, the handover required message from a first eNB to a first MME, the forward relocation request message from a first MME to a second MME, and/or the handover request message from a second MME to a second eNB may comprise the information that a UE requesting a handover requires V2X services after completing a handover procedure. The E-RABs To Be Setup Item IEs in the handover request message may contain information indicating whether a bearer required for the UE requesting a handover is to provide V2X services or not. In an example, the handover required message, the forward relocation request message, and/or the handover request message may comprise one or more V2X service indications for a bearer required by a UE requesting a handover. For example, the message may comprise one or more PLMN IDs of the V2X services, various types of V2X services (e.g. V2V, V2N, V2P, V2I, and/or the like), MBSFN or SC-PTM services and/or parameters for V2X downlink, uplink V2X services requirements (SPS requirements, etc), sidelink V2X services requirements, TMGIs of the V2X services, and/or other information related to V2X services for a bearer required by a UE requesting a handover. The example indications may be included in an E-RABs To Be Setup Item IEs in the handover request message. In an example an IE may include whether a cell is only for V2X or it may support both data and V2X. In an example an IE may include whether the node has RSU and/or eNB capabilities. In an example an IE may indicate whether a PLMN is only for V2X or for both V2X and data. In an example an IE may indicate the TMGI.

In an example, in the S1-based handover procedure, the handover required message from a first eNB to a first MME, the forward relocation request message from a first MME to a second MME, and/or the handover request message from a second MME to a second eNB may comprise the information that a UE requesting a handover requires V2X services after completing a handover procedure. The Bearer Type IE in the E-RABs To Be Setup Item IEs in the handover request message may contain information indicating whether a bearer required for the UE requesting a handover is to provide V2X services or not. In an example, the handover required message, the forward relocation request message, and/or the handover request message may comprise one or more V2X service indications for a bearer required by a UE requesting a handover. For example, the message may comprise one or more PLMN IDs of the V2X services, various types of V2X services (e.g. V2V, V2N, V2P, V2I, and/or the like), MBSFN or SC-PTM services and/or parameters for V2X downlink, uplink V2X services requirements (SPS requirements, etc), sidelink V2X services requirements, TMGIs of the V2X services, and/or other information related to V2X services for a bearer required by a UE requesting a handover. The example indications may be included in a Bearer Type IE in the E-RABs To Be Setup Item IEs in the handover request message. In an example an IE may include whether a cell is only for V2X or it may support both data and V2X. In an example an IE may include whether the node has RSU and/or eNB capabilities. In an example an IE may indicate whether a PLMN is only for V2X or for both V2X and data. In an example an IE may indicate the TMGI.

In an example, in the S1-based handover procedure, the handover required message from a first eNB to a first MME, the forward relocation request message from a first MME to a second MME, and/or the handover request message from a second MME to a second eNB may comprise the information that a UE requesting a handover requires V2X services after completing a handover procedure. The E-RAB ID IE in the E-RABs To Be Setup Item IEs in the handover request message may contain information indicating whether a bearer required for the UE requesting a handover is to provide V2X services or not. In an example, the E-RAB ID IE may be an ID assigned for V2X services. In an example, the handover required message, the forward relocation request message, and/or the handover request message may comprise one or more V2X service indications for a bearer required by a UE requesting a handover. For example, the message may comprise one or more PLMN IDs of the V2X services, various types of V2X services (e.g. V2V, V2N, V2P, V2I, and/or the like), MBSFN or SC-PTM services and/or parameters for V2X downlink, uplink V2X services requirements (SPS requirements, etc), sidelink V2X services requirements, TMGIs of the V2X services, and/or other information related to V2X services for a bearer required by a UE requesting a handover. The example indications may be included in an E-RAB ID in the E-RABs To Be Setup Item IEs in the handover request message. In an example an IE may include whether a cell is only for V2X or it may support both data and V2X. In an example an IE may include whether the node has RSU and/or eNB capabilities. In an example an IE may indicate whether a PLMN is only for V2X or for both V2X and data. In an example an IE may indicate the TMGI.

In an example, in the S1-based handover procedure, the handover required message from a first eNB to a first MME, the forward relocation request message from a first MME to a second MME, and/or the handover request message from a second MME to a second eNB may comprise the information that a UE requesting a handover requires V2X services after completing a handover procedure. The E-RAB Level QoS Parameters IE in the E-RABs To Be Setup Item IEs in the handover request message may contain information indicating whether a bearer required for the UE requesting a handover is to provide V2X services or not. In an example, a QCI IE in the E-RAB Level QoS Parameters IE may comprise a QCI value dedicated for V2X services. In an example, the handover required message, the forward relocation request message, and/or the handover request message may comprise one or more V2X service indications for a bearer required by a UE requesting a handover. For example, the message may comprise one or more PLMN IDs of the V2X services, various types of V2X services (e.g. V2V, V2N, V2P, V2I, and/or the like), MBSFN or SC-PTM services and/or parameters for V2X downlink, uplink V2X services requirements (SPS requirements, etc), sidelink V2X services requirements, TMGIs of the V2X services, and/or other information related to V2X services for a bearer required by a UE requesting a handover. The example indications may be included in an E-RAB Level QoS Parameters IE in the E-RABs To Be Setup Item IEs in the handover request message. In an example an IE may include whether a cell is only for V2X or it may support both data and V2X. In an example an IE may include whether the node has RSU and/or eNB capabilities. In an example an IE may indicate whether a PLMN is only for V2X or for both V2X and data. In an example an IE may indicate the TMGI.

In an example, in the S1-based handover procedure, the handover required message from a first eNB to a first MME, the forward relocation request message from a first MME to a second MME, and/or the handover request message from a second MME to a second eNB may comprise the information that a UE requesting a handover requires V2X services after completing a handover procedure. The GTP-TEID IE in the E-RABs To Be Setup Item IEs in the handover request message may contain information indicating whether a bearer required for the UE requesting a handover is to provide V2X services or not. In an example, the GTP-TEID IE may indicate an UL GTP tunnel endpoint address of a core network supporting V2X services. In an example, the handover required message, the forward relocation request message, and/or the handover request message may comprise one or more V2X service indications for a bearer required by a UE requesting a handover. For example, the message may comprise one or more PLMN IDs of the V2X services, various types of V2X services (e.g. V2V, V2N, V2P, V2I, and/or the like), MBSFN or SC-PTM services and/or parameters for V2X downlink, uplink V2X services requirements (SPS requirements, etc), sidelink V2X services requirements, TMGIs of the V2X services, and/or other information related to V2X services for a bearer required by a UE requesting a handover. The example indications may be included in a GTP-TEID IE in the E-RABs To Be Setup Item IEs in the handover request message. In an example an IE may include whether a cell is only for V2X or it may support both data and V2X. In an example an IE may include whether the node has RSU and/or eNB capabilities. In an example an IE may indicate whether a PLMN is only for V2X or for both V2X and data. In an example an IE may indicate the TMGI.

In an example, in the S1-based handover procedure, the handover required message from a first eNB to a first MME, the forward relocation request message from a first MME to a second MME, and/or the handover request message from a second MME to a second eNB may comprise the information that a UE requesting a handover requires V2X services after completing a handover procedure. The MME/SGSN UE EPS PDN Connections IE in the forward relocation request message may contain information indicating whether a bearer required for the UE requesting a handover is to provide V2X services or not. In an example, the handover required message, the forward relocation request message, and/or the handover request message may comprise one or more V2X service indications for a bearer required by a UE requesting a handover. For example, the message may comprise one or more PLMN IDs of the V2X services, various types of V2X services (e.g. V2V, V2N, V2P, V2I, and/or the like), MBSFN or SC-PTM services and/or parameters for V2X downlink, uplink V2X services requirements (SPS requirements, etc), sidelink V2X services requirements, TMGIs of the V2X services, and/or other information related to V2X services for a bearer required by a UE requesting a handover. The example indications may be included in an MME/SGSN UE EPS PDN Connections IE in the forward relocation request message. In an example an IE may include whether a cell is only for V2X or it may support both data and V2X. In an example an IE may include whether the node has RSU and/or eNB capabilities. In an example an IE may indicate whether a PLMN is only for V2X or for both V2X and data. In an example an IE may indicate the TMGI.

In an example, in the S1-based handover procedure, the handover required message from a first eNB to a first MME, the forward relocation request message from a first MME to a second MME, and/or the handover request message from a second MME to a second eNB may comprise the information that a UE requesting a handover requires V2X services after completing a handover procedure. The Bearer Contexts IE in the MME/SGSN UE EPS PDN Connections IE in the forward relocation request message may contain information indicating whether a bearer required for the UE requesting a handover is to provide V2X services or not. In an example, the handover required message, the forward relocation request message, and/or the handover request message may comprise one or more V2X service indications for a bearer required by a UE requesting a handover. For example, the message may comprise one or more PLMN IDs of the V2X services, various types of V2X services (e.g. V2V, V2N, V2P, V2I, and/or the like), MBSFN or SC-PTM services and/or parameters for V2X downlink, uplink V2X services requirements (SPS requirements, etc), sidelink V2X services requirements, TMGIs of the V2X services, and/or other information related to V2X services for a bearer required by a UE requesting a handover. The example indications may be included in a Bearer Contexts IE in the MME/SGSN UE EPS PDN Connections IE in the forward relocation request message. In an example an IE may include whether a cell is only for V2X or it may support both data and V2X. In an example an IE may include whether the node has RSU and/or eNB capabilities. In an example an IE may indicate whether a PLMN is only for V2X or for both V2X and data. In an example an IE may indicate the TMGI.

In an example, in the S1-based handover procedure, the handover required message from a first eNB to a first MME, the forward relocation request message from a first MME to a second MME, and/or the handover request message from a second MME to a second eNB may comprise the information that a UE requesting a handover requires V2X services after completing a handover procedure. The EPS Bearer ID IE in the Bearer Contexts IE in the MME/SGSN UE EPS PDN Connections IE in the forward relocation request message may contain information indicating whether a bearer required for the UE requesting a handover is to provide V2X services or not. In an example, the EPS Bearer ID IE may be an ID assigned for V2X services. In an example, the handover required message, the forward relocation request message, and/or the handover request message may comprise one or more V2X service indications for a bearer required by a UE requesting a handover. For example, the message may comprise one or more PLMN IDs of the V2X services, various types of V2X services (e.g. V2V, V2N, V2P, V2I, and/or the like), MBSFN or SC-PTM services and/or parameters for V2X downlink, uplink V2X services requirements (SPS requirements, etc), sidelink V2X services requirements, TMGIs of the V2X services, and/or other information related to V2X services for a bearer required by a UE requesting a handover. The example indications may be included in an EPS Bearer ID IE in the Bearer Contexts IE in the MME/SGSN UE EPS PDN Connections IE in the forward relocation request message. In an example an IE may include whether a cell is only for V2X or it may support both data and V2X. In an example an IE may include whether the node has RSU and/or eNB capabilities. In an example an IE may indicate whether a PLMN is only for V2X or for both V2X and data. In an example an IE may indicate the TMGI.

In an example, in the S1-based handover procedure, the handover required message from a first eNB to a first MME, the forward relocation request message from a first MME to a second MME, and/or the handover request message from a second MME to a second eNB may comprise the information that a UE requesting a handover requires V2X services after completing a handover procedure. The SGW S1/S4/S12 IP Address and TEID for user plane IE in the Bearer Contexts IE in the MME/SGSN UE EPS PDN Connections IE in the forward relocation request message may contain information indicating whether a bearer required for the UE requesting a handover is to provide V2X services or not. In an example, the SGW S1/S4/S12 IP Address and TEID for user plane IE may indicate an UL GTP tunnel endpoint address of a core network supporting V2X services. In an example, the handover required message, the forward relocation request message, and/or the handover request message may comprise one or more V2X service indications for a bearer required by a UE requesting a handover. For example, the message may comprise one or more PLMN IDs of the V2X services, various types of V2X services (e.g. V2V, V2N, V2P, V2I, and/or the like), MBSFN or SC-PTM services and/or parameters for V2X downlink, uplink V2X services requirements (SPS requirements, etc), sidelink V2X services requirements, TMGIs of the V2X services, and/or other information related to V2X services for a bearer required by a UE requesting a handover. The example indications may be included in an SGW S1/S4/S12 IP Address and TEID for user plane IE in the Bearer Contexts IE in the MME/SGSN UE EPS PDN Connections IE in the forward relocation request message. In an example an IE may include whether a cell is only for V2X or it may support both data and V2X. In an example an IE may include whether the node has RSU and/or eNB capabilities. In an example an IE may indicate whether a PLMN is only for V2X or for both V2X and data. In an example an IE may indicate the TMGI.

In an example, in the S1-based handover procedure, the handover required message from a first eNB to a first MME, the forward relocation request message from a first MME to a second MME, and/or the handover request message from a second MME to a second eNB may comprise the information that a UE requesting a handover requires V2X services after completing a handover procedure. The Bearer Level QoS IE in the Bearer Contexts IE in the MME/SGSN UE EPS PDN Connections IE in the forward relocation request message may contain information indicating whether a bearer required for the UE requesting a handover is to provide V2X services or not. In an example, a QCI IE in the Bearer Level QoS IE may comprise a QCI value dedicated for V2X services. In an example, the handover required message, the forward relocation request message, and/or the handover request message may comprise one or more V2X service indications for a bearer required by a UE requesting a handover. For example, the message may comprise one or more PLMN IDs of the V2X services, various types of V2X services (e.g. V2V, V2N, V2P, V2I, and/or the like), MBSFN or SC-PTM services and/or parameters for V2X downlink, uplink V2X services requirements (SPS requirements, etc), sidelink V2X services requirements, TMGIs of the V2X services, and/or other information related to V2X services for a bearer required by a UE requesting a handover. The example indications may be included in a Bearer Level QoS IE in the Bearer Contexts IE in the MME/SGSN UE EPS PDN Connections IE in the forward relocation request message. In an example an IE may include whether a cell is only for V2X or it may support both data and V2X. In an example an IE may include whether the node has RSU and/or eNB capabilities. In an example an IE may indicate whether a PLMN is only for V2X or for both V2X and data. In an example an IE may indicate the TMGI.

In an example, in the S1-based handover procedure, the handover required message from a first eNB to a first MME, the forward relocation request message from a first MME to a second MME, and/or the handover request message from a second MME to a second eNB may comprise the information that a UE requesting a handover requires V2X services after completing a handover procedure. The Bearer Flags IE in the Bearer Contexts IE in the MME/SGSN UE EPS PDN Connections IE in the forward relocation request message may contain information indicating whether a bearer required for the UE requesting a handover is to provide V2X services or not. In an example, the handover required message, the forward relocation request message, and/or the handover request message may comprise one or more V2X service indications for a bearer required by a UE requesting a handover. For example, the message may comprise one or more PLMN IDs of the V2X services, various types of V2X services (e.g. V2V, V2N, V2P, V2I, and/or the like), MBSFN or SC-PTM services and/or parameters for V2X downlink, uplink V2X services requirements (SPS requirements, etc), sidelink V2X services requirements, TMGIs of the V2X services, and/or other information related to V2X services for a bearer required by a UE requesting a handover. The example indications may be included in a Bearer Flags IE in the Bearer Contexts IE in the MME/SGSN UE EPS PDN Connections IE in the forward relocation request message. In an example an IE may include whether a cell is only for V2X or it may support both data and V2X. In an example an IE may include whether the node has RSU and/or eNB capabilities. In an example an IE may indicate whether a PLMN is only for V2X or for both V2X and data. In an example an IE may indicate the TMGI.

In an example, in the S1-based handover procedure, the handover required message from a first eNB to a first MME, the forward relocation request message from a first MME to a second MME, and/or the handover request message from a second MME to a second eNB may comprise the information that a UE requesting a handover requires V2X services after completing a handover procedure. The Indication Flags IE in the MME/SGSN UE EPS PDN Connections IE in the forward relocation request message may contain information indicating whether a bearer required for the UE requesting a handover is to provide V2X services or not. In an example, the handover required message, the forward relocation request message, and/or the handover request message may comprise one or more V2X service indications for a bearer required by a UE requesting a handover. For example, the message may comprise one or more PLMN IDs of the V2X services, various types of V2X services (e.g. V2V, V2N, V2P, V2I, and/or the like), MBSFN or SC-PTM services and/or parameters for V2X downlink, uplink V2X services requirements (SPS requirements, etc), sidelink V2X services requirements, TMGIs of the V2X services, and/or other information related to V2X services for a bearer required by a UE requesting a handover. The example indications may be included in an Indication Flags IE in the MME/SGSN UE EPS PDN Connections IE in the forward relocation request message. In an example an IE may include whether a cell is only for V2X or it may support both data and V2X. In an example an IE may include whether the node has RSU and/or eNB capabilities. In an example an IE may indicate whether a PLMN is only for V2X or for both V2X and data. In an example an IE may indicate the TMGI.

In an example, in the S1-based handover procedure, the handover required message from a first eNB to a first MME, the forward relocation request message from a first MME to a second MME, and/or the handover request message from a second MME to a second eNB may comprise the information that a UE requesting a handover requires V2X services after completing a handover procedure. The Indication Flags IE in the forward relocation request message may contain information indicating whether a bearer required for the UE requesting a handover is to provide V2X services or not. In an example, the handover required message, the forward relocation request message, and/or the handover request message may comprise one or more V2X service indications for a bearer required by a UE requesting a handover. For example, the message may comprise one or more PLMN IDs of the V2X services, various types of V2X services (e.g. V2V, V2N, V2P, V2I, and/or the like), MBSFN or SC-PTM services and/or parameters for V2X downlink, uplink V2X services requirements (SPS requirements, etc), sidelink V2X services requirements, TMGIs of the V2X services, and/or other information related to V2X services for a bearer required by a UE requesting a handover. The example indications may be included in an Indication Flags IE in the forward relocation request message. In an example an IE may include whether a cell is only for V2X or it may support both data and V2X. In an example an IE may include whether the node has RSU and/or eNB capabilities. In an example an IE may indicate whether a PLMN is only for V2X or for both V2X and data. In an example an IE may indicate the TMGI.

In an example, in the S1-based handover procedure, the handover required message from a first eNB to a first MME, the forward relocation request message from a first MME to a second MME, and/or the handover request message from a second MME to a second eNB may comprise the information that a UE requesting a handover requires V2X services after completing a handover procedure. The UE Usage Type IE in the forward relocation request message may contain information indicating whether a bearer required for the UE requesting a handover is to provide V2X services or not. In an example, the UE Usage Type IE may comprise information of a dedicated core network for V2X services. In an example, the handover required message, the forward relocation request message, and/or the handover request message may comprise one or more V2X service indications for a bearer required by a UE requesting a handover. For example, the message may comprise one or more PLMN IDs of the V2X services, various types of V2X services (e.g. V2V, V2N, V2P, V2I, and/or the like), MBSFN or SC-PTM services and/or parameters for V2X downlink, uplink V2X services requirements (SPS requirements, etc), sidelink V2X services requirements, TMGIs of the V2X services, and/or other information related to V2X services for a bearer required by a UE requesting a handover. The example indications may be included in an UE Usage Type IE in the forward relocation request message. In an example an IE may include whether a cell is only for V2X or it may support both data and V2X. In an example an IE may include whether the node has RSU and/or eNB capabilities. In an example an IE may indicate whether a PLMN is only for V2X or for both V2X and data. In an example an IE may indicate the TMGI.

In an example, in the S1-based handover procedure, the handover required message from a first eNB to a first MME, the forward relocation request message from a first MME to a second MME, and/or the handover request message from a second MME to a second eNB may comprise the information that a UE requesting a handover requires V2X services after completing a handover procedure. The Selected PLMN ID IE in the forward relocation request message may contain information indicating whether a bearer required for the UE requesting a handover is to provide V2X services or not. In an example, the Selected PLMN ID IE may comprise a target network operator PLMN ID for V2X services. In an example, the handover required message, the forward relocation request message, and/or the handover request message may comprise one or more V2X service indications for a bearer required by a UE requesting a handover. For example, the message may comprise one or more PLMN IDs of the V2X services, various types of V2X services (e.g. V2V, V2N, V2P, V2I, and/or the like), MBSFN or SC-PTM services and/or parameters for V2X downlink, uplink V2X services requirements (SPS requirements, etc), sidelink V2X services requirements, TMGIs of the V2X services, and/or other information related to V2X services for a bearer required by a UE requesting a handover. The example indications may be included in an Selected PLMN ID IE in the forward relocation request message. In an example an IE may include whether a cell is only for V2X or it may support both data and V2X. In an example an IE may include whether the node has RSU and/or eNB capabilities. In an example an IE may indicate whether a PLMN is only for V2X or for both V2X and data. In an example an IE may indicate the TMGI.

In an example, in the S1-based handover procedure, a handover request acknowledge message, a handover command message, and/or a forward relocation response message may comprise information that a list of bearers may not be admitted at the information sending eNB because a handover target cell of the information sending eNB and/or the information sending eNB may not support V2X services. In an example, the E-RABs Failed to Setup List IE in the handover request acknowledge message may contain information that a list of bearers may be rejected at the information sending eNB because a handover target cell of the information sending eNB and/or the information sending eNB may not support V2X services. In an example, the E-RABs to Release List IE in the handover command message may contain information that a list of bearers may be rejected at the information sending eNB because a handover target cell of the information sending eNB and/or the information sending eNB may not support V2X services.

In an example, in the S1-based handover procedure, a handover request acknowledge message, a handover command message, and/or a forward relocation response message may comprise information that a list of bearers may not be admitted at the information sending eNB because a handover target cell of the information sending eNB and/or the information sending eNB may not support V2X services. In an example, the Cause IE in the E-RABs Failed to Setup List IE in the handover request acknowledge message and/or in the E-RABs to Release List IE in the handover command message may contain information that a list of bearers may be rejected at the information sending eNB because a handover target cell of the information sending eNB and/or the information sending eNB may not support V2X services.

In an example, in the S1-based handover procedure, a handover preparation failure message, a handover failure message, and/or a forward relocation response message may comprise the information that a handover request for a UE may not be allowed because a handover target cell of the information sending eNB and/or the information sending eNB may not support V2X services. In an example, the Cause IE in the handover preparation failure message, a handover failure message, and/or a forward relocation response message may contain information that a handover request for a UE may be rejected because a handover target cell of the information sending eNB and/or the information sending eNB may not support V2X services.

In an example, in the S1-based handover procedure, a handover preparation failure message, a handover failure message, and/or a forward relocation response message may comprise the information that a handover request for a UE may not be allowed because a handover target cell of the information sending eNB and/or the information sending eNB may not support V2X services. In an example, the Indication Flags IE in the forward relocation response message may contain information that a handover request for a UE may be rejected because a handover target cell of the information sending eNB and/or the information sending eNB may not support V2X services.

In an example, in the S1-based handover procedure, a handover preparation failure message, a handover failure message, and/or a forward relocation response message may comprise the information that a handover request for a UE may not be allowed because a handover target cell of the information sending eNB and/or the information sending eNB may not support V2X services. In an example, the S1-AP Cause IE in the forward relocation response message may contain information that a handover request for a UE may be rejected because a handover target cell of the information sending eNB and/or the information sending eNB may not support V2X services.

In an example, a first base station may transmit, to a second base station, a handover request message comprising indication parameters for a wireless device requesting a handover. The indication parameters may comprise at least a list of bearers for V2X services. The second base station may make a decision on accepting the handover request for the wireless device at least based on the at least V2X service indication parameter.

In an example, a first base station may transmit, to a second base station, a handover request message comprising indication parameters for a wireless device requesting a handover. The indication parameters may comprise at least a list of bearers for V2X services. The second base station may accept the handover request for the wireless device at least based on the at least V2X service indication parameter. The second base station may transmit, to the first base station, a handover request acknowledge message comprising a notification that the second base station accepts the handover request of the first base station for the wireless device, and/or a list of bearers for V2X services accepted by the second base station. The handover request acknowledge message may comprise at least a list of bearers not admitted with a cause that V2X services are not supported in a cell of the second base station and/or the second base station.

In an example, a first base station may transmit, to a second base station a handover request message comprising indication parameters for a wireless device requesting a handover. The indication parameters may comprise at least a list of bearers for V2X services. The second base station may accept the handover request for a wireless device at least based on the at least V2X service indication parameter. The second base station may transmit, to the first base station, a handover request acknowledge message comprising a notification that the second base station accepts the handover request of the first base station for the wireless device, and/or a list of bearers for V2X services accepted by the second base station. The first base station may transmit, to the wireless device, at least one third message. The third message may initiate a handover of the wireless device to the second base station.

In an example, a second base station may accept a handover request of a first base station for a wireless device at least based on the at least V2X service indication parameter included in a handover request message from the first base station. The second base station may make a handover decision for the wireless device after completing the first handover procedure. The second base station at least may take into account at least that the wireless device needs at least the list of bearers accepted by the second base station for the V2X services.

In an example, a second base station may accept a handover request of a first base station for a wireless device at least based on the at least V2X service indication parameter included in a handover request message from the first base station. The second base station may make an SeNB addition decision and/or an SeNB modification decision for the wireless device after completing the first handover procedure. The second base station at least may take into account at least that the wireless device needs at least the list of bearers accepted by the second base station for the V2X services.

In an example, a first base station may transmit, to a second base station, a handover request message comprising indication parameters for a wireless device requesting a handover. The indication parameters may comprise at least a list of bearers for V2X services. The second base station may reject the handover request for a wireless device at least based on the at least V2X service indication parameter. The second base station may transmit, to the first base station, a handover preparation failure message comprising a notification that the second base station rejects the handover request of the first base station for the wireless device. The handover preparation failure message may comprise at least an indication that the second base station does not support V2X services. The handover preparation failure message may comprise at least an indication that a handover target cell of the second base station does not support V2X services.

In an example, a first base station may transmit, to an MME (e.g. core network entity), a handover required message comprising indication parameters for a wireless device requesting a handover. The indication parameters may comprise at least a list of bearers for V2X services. The MME may transmit, to a second base station, a handover request message comprising indication parameters for a wireless device requesting a handover. The indication parameters may comprise at least a list of bearers for V2X services. The second base station may make a decision on accepting the handover request for a wireless device at least based on the at least V2X service indication parameter.

In an example, a first base station may transmit, to an MME, a handover required message, which may comprise indication parameters for a wireless device requesting a handover. The indication parameters may comprise at least a list of bearers for V2X services. The MME may transmit, to a second base station, a handover request message comprising indication parameters for a wireless device requesting a handover. The indication parameters may comprise at least a list of bearers for V2X services. The second base station may accept the handover request for a wireless device at least based on the at least V2X service indication parameter. The second base station transmit, to the MME, a handover request acknowledge message comprising a notification that the second base station accepts the handover request of the first base station for the wireless device, and/or a list of bearers for V2X services accepted by the second base station. The MME may transmit, to the first base station, a handover command message comprising a notification that the second base station accepts the handover request of the first base station for the wireless device, and/or a list of bearers for V2X services accepted by the second base station. The handover request acknowledge message and/or the handover command message may comprise at least a list of bearers not admitted and/or a cause information element (IE) that V2X services are not supported in a cell of the second base station and/or the second base station.

In an example, a first base station may transmit, to an MME, a handover required message, which may comprise indication parameters for a wireless device requesting a handover. The indication parameters may comprise at least a list of bearers for V2X services. The MME may transmit, to a second base station, a handover request message comprising indication parameters for a wireless device requesting a handover. The indication parameters may comprise at least a list of bearers for V2X services. The second base station may accept the handover request for a wireless device at least based on the at least V2X service indication parameter. The second base station may transmit, to the MME, a handover request acknowledge message comprising a notification that the second base station accepts the handover request of the first base station for the wireless device, and/or a list of bearers for V2X services accepted by the second base station. The MME may transmit, to the first base station, a handover command message comprising a notification that the second base station accepts the handover request of the first base station for the wireless device, and/or a list of bearers for V2X services accepted by the second base station. The first base station may transmit, to the wireless device, at least one fifth message initiating a handover of the wireless device to the second base station.

In an example, a second base station may accept a handover request of a first base station for a wireless device at least based on the at least V2X service indication parameter included in a handover required message from the first base station and/or a handover request message from the MME. The second base station may make a handover decision for the wireless device after completing the first handover procedure. The second base station may at least take into account at least that the wireless device needs at least the list of bearers accepted by the second base station for the V2X services.

In an example, a second base station may accept a handover request of a first base station for a wireless device at least based on the at least V2X service indication parameter included in a handover required message from the first base station and/or a handover request message from the MME. The second base station may make an SeNB addition decision and/or an SeNB modification decision for the wireless device after completing the first handover procedure. The second base station may at least take into account at least that the wireless device needs at least the list of bearers accepted by the second base station for the V2X services.

In an example, a first base station may transmit, to an MME, a handover required message, which may comprise indication parameters for a wireless device requesting a handover. The indication parameters may comprise at least a list of bearers for V2X services. The MME may transmit, to a second base station, a handover request message comprising indication parameters for a wireless device requesting a handover. The indication parameters may comprise at least a list of bearers for V2X services. The second base station may reject the handover request for a wireless device at least based on the at least V2X service indication parameter. The second base station transmit, to the MME, a handover failure message comprising a notification that the second base station rejects the handover request of the first base station for the wireless device. The MME may transmit, to the first base station, a handover preparation failure message comprising a notification that the second base station rejects the handover request of the first base station for the wireless device. The handover preparation failure message and/or the handover failure message may comprise at least an indication that the second base station does not support V2X services. The handover preparation failure message and/or the handover failure message may comprise at least an indication that a handover target cell of the second base station does not support V2X services.

In an example, a first base station may transmit, to a first MME, a handover required message, which may comprise indication parameters for a wireless device requesting a handover. The indication parameters may comprise at least a list of bearers for V2X services. The first MME may transmit a forward relocation request message to a second MME comprising indication parameters for a wireless device requesting a handover. The indication parameters may comprise at least a list of bearers for V2X services. The second MME may transmit, to a second base station, a handover request message comprising indication parameters for a wireless device requesting a handover. The indication parameters may comprise at least a list of bearers for V2X services. The second base station may make a decision on accepting the handover request for a wireless device at least based on the at least V2X service indication parameter.

In an example, a first base station may transmit, to a first MME, a handover required message, which may comprise indication parameters for a wireless device requesting a handover. The indication parameters may comprise at least a list of bearers for V2X services. The first MME may transmit, to a second MME, a forward relocation request message comprising indication parameters for a wireless device requesting a handover. The indication parameters may comprise at least a list of bearers for V2X services. The second MME may transmit, to a second base station, a handover request message comprising indication parameters for a wireless device requesting a handover. The indication parameters may comprise at least a list of bearers for V2X services. The second base station may accept the handover request for a wireless device at least based on the at least V2X service indication parameter. The second base station may transmit, to the second MME, a handover request acknowledge message comprising a notification that the second base station accepts the handover request of the first base station for the wireless device, and/or a list of bearers for V2X services accepted by the second base station. The second MME may transmit, to the first MME, a forward relocation response message comprising a notification that the second base station accepts the handover request of the first base station for the wireless device, and/or a list of bearers for V2X services accepted by the second base station. The first MME may transmit, to the first base station, a handover command message comprising a notification that the second base station accepts the handover request of the first base station for the wireless device, and/or a list of bearers for V2X services accepted by the second base station. The handover request acknowledge message, the forward relocation response message, and/or the handover command message may comprise at least a list of bearers not admitted with a cause that V2X services are not supported in a cell of the second base station and/or the second base station.

In an example, a first base station may transmit, to a first MME, a handover required message, which may comprise indication parameters for a wireless device requesting a handover. The indication parameters may comprise at least a list of bearers for V2X services. The first MME may transmit, to a second MME, a forward relocation request message comprising indication parameters for a wireless device requesting a handover. The indication parameters may comprise at least a list of bearers for V2X services. The second MME may transmit, to a second base station, a handover request message comprising indication parameters for a wireless device requesting a handover. The indication parameters may comprise at least a list of bearers for V2X services. The second base station may accept the handover request for a wireless device at least based on the at least V2X service indication parameter. The second base station may transmit, to the second MME, a handover request acknowledge message comprising a notification that the second base station accepts the handover request of the first base station for the wireless device, and/or a list of bearers for V2X services accepted by the second base station. The second MME may transmit, to the first MME, a forward relocation response message comprising a notification that the second base station accepts the handover request of the first base station for the wireless device, and/or a list of bearers for V2X services accepted by the second base station. The first MME may transmit, to the first base station, a handover command message comprising a notification that the second base station accepts the handover request of the first base station for the wireless device, and/or a list of bearers for V2X services accepted by the second base station. The first base station may transmit at least one seventh message to the wireless device, wherein the seventh message may initiate a handover of the wireless device to the second base station.

In an example, a second base station may accept a handover request of a first base station for a wireless device at least based on the at least V2X service indication parameter included in a handover required message from the first base station, a forward relocation request from the first MME, and/or a handover request message from the second MME. The second base station may make a handover decision for the wireless device after completing the first handover procedure. The second base station at least may take into account at least that the wireless device needs at least the list of bearers accepted by the second base station for the V2X services.

In an example, a second base station may accept a handover request of a first base station for a wireless device at least based on the at least V2X service indication parameter included in a handover required message from the first base station, a forward relocation request from the first MME, and/or a handover request message from the second MME. The second base station may make an SeNB (secondary base station) addition decision and/or an SeNB modification decision for the wireless device after completing the first handover procedure. The second base station at least takes into account at least that the wireless device needs at least the list of bearers accepted by the second base station for the V2X services.

In an example, a first base station may transmit, to a first MME, a handover required message, which may comprise indication parameters for a wireless device requesting a handover. The indication parameters may comprise at least a list of bearers for V2X services. The first MME may transmit, to a second MME, a forward relocation request message comprising indication parameters for a wireless device requesting a handover. The indication parameters may comprise at least a list of bearers for V2X services. The second MME transmit, to a second base station, a handover request message comprising indication parameters for a wireless device requesting a handover. The indication parameters may comprise at least a list of bearers for V2X services. The second base station may reject the handover request for a wireless device at least based on the at least V2X service indication parameter. The second base station may transmit, to the second MME, a handover failure message comprising a notification that the second base station rejects the handover request of the first base station for the wireless device. The second MME may transmit, to the first MME, a forward relocation response message comprising a notification that the second base station rejects the handover request of the first base station for the wireless device. The first MME may transmit, to the first base station, a handover preparation failure message comprising a notification that the second base station rejects the handover request of the first base station for the wireless device. The handover preparation failure message, the forward relocation response message, and/or the handover failure message may comprise at least an indication that the second base station does not support V2X services. The handover preparation failure message, the forward relocation response message, and/or the handover failure message may comprise at least an indication that a handover target cell of the second base station does not support V2X services.

In an example, a UE with V2X services may handover from one cell (or eNB) to another cell (or eNB). An eNB may send a handover request message to a target eNB. An eNB receiving a handover request for a UE with V2X services may decide whether it will accept the handover request or not. The current X2 protocol and handover mechanisms/signaling may require enhancements to enable an eNB to make a decision on accepting a handover request for a UE and improve handover procedures for the UE with V2X services. In the legacy network, handover of a UE with V2X services may fail or V2X services may be interrupted due to handover.

In an example, a UE with V2X services may handover from one cell (or eNB) to another cell (or eNB). An eNB may send a handover required message to MME to handover the UE to a target eNB. The current S1 handover protocol and handover mechanisms/signaling may require enhancements to enable an eNB to make a decision on accepting a handover request for a UE and improve handover procedures for the UE with V2X services. In the legacy network, handover of a UE with V2X services may fail or V2X services may be interrupted due to handover.

Example embodiments may improve the handover procedures for a UE with V2X services. Example embodiments provide enhancements to current handover mechanism and increase V2X service reliability and continuity. In an example embodiment, a UE with V2X services may continue the V2X service that is provided to the UE in the current cell after moving to another cell, or a UE without V2X services in the current cell may initiate a V2X service after moving to another cell. Example embodiments enables a serving UE to continue its V2X service or initiate its V2X service when it is moving in an area covered by multiple eNB. Example embodiments enable an eNB to make a decision on accepting a handover request for a UE with an existing V2X service, or for a UE initiating a V2X service. Example embodiments may enhance network performance by enabling an eNB to employ a purpose/cause of an inbound handover of a UE with V2X services from an eNB sending a handover request. Example embodiments may enable an eNB receiving a handover request to make a handover decision for a UE with V2X services in the future. In an example embodiment, handover procedure is enhanced to indicate handover cause or handover failure cause in one or more messages communicated in the network.

In an example embodiment, in FIG. 10, a first eNB may transmit a first message to a second eNB. The second eNB may transmit a second message to the first eNB. The first message for example may be a handover request message. The second message may be a handover request acknowledge message. The first message and the second message may be exchanged as a part of an X2 mobility procedure.

In an example embodiment, the first eNB may transfer to the second eNB the information that a UE requesting a handover to a cell of the second eNB may continue V2X services or initiate a V2X service after moving to a cell of the second eNB. For example, the first message may comprise information that a UE requesting a handover to a cell of the second eNB may require V2X services in a cell of the second eNB. In an example, a handover request message may be used to transfer this information from the information sending eNB to the information receiving eNB. In an example, the first message may include an information element indicating that the cause for handover is V2X services, e.g. V2I, V2N, V2P, and/or V2V services.

In an example, in the X2 mobility procedure, the handover request message may comprise the information whether a UE requesting a handover requires V2X services after completing a handover procedure or not. The handover request message may contain information indicating whether the UE requesting a handover requires V2X services or not. In an example, the handover request message may comprise one or more V2X service indications required by a UE requesting a handover. For example, the message may indicate one or more PLMN IDs of the V2X services, various types of V2X services (e.g. V2V, V2N, V2P, V2I, and/or the like), MBSFN or SC-PTM services and/or parameters for V2X downlink, uplink V2X services requirements (SPS requirements, etc), sidelink V2X services requirements, TMGIs of the V2X services and/or other information related to V2X services required a UE. In an example an IE may include whether a cell is only for V2x or it may support both data and V2X. In an example an IE may include whether the node has RSU and/or eNB capabilities. In an example an IE may indicate whether a PLMN is only for V2x or for both V2X and data. In an example an IE may indicate the TMGI associated with at least one V2X service.

In an example, in the X2 mobility procedure, the handover request message may comprise the information whether a UE requesting a handover requires V2X services after completing a handover procedure or not. The Cause IE in the handover request message may contain information indicating whether the UE requesting a handover requires V2X services or not. In an example, the handover request message may comprise one or more V2X service indications required by a UE requesting a handover. For example, the message may indicate one or more PLMN IDs of the V2X services, various types of V2X services (e.g. V2V, V2N, V2P, V2I, and/or the like), MBSFN or SC-PTM services and/or parameters for V2X downlink, uplink V2X services requirements (SPS requirements, etc), sidelink V2X services requirements, TMGIs of the V2X services and/or other information related to V2X services required a UE. The example indications may be included in a Cause IE in the handover request message and/or the handover request message. In an example the existing cause IE in the message may be employed to indicate this cause.

In an example, in the X2 mobility procedure, a handover preparation failure message may comprise the information that a handover request for a UE may not be allowed because a handover target cell of the information sending eNB and/or the information sending eNB may not support V2X services. In an example, the Cause IE in the handover preparation failure message may contain information that a handover request for a UE may be rejected because a handover target cell of the information sending eNB and/or the information sending eNB may not support V2X services.

In an example embodiment, a first base station may transmit to a second base station a handover request message comprising indication parameters for a wireless device requesting a handover. The indication parameters may comprise at least V2X service indication parameter. The second base station may decide on accepting or rejecting the handover request for a wireless device at least based on the indication parameters. The second base station may decide on accepting or rejecting the handover request for a wireless device at least based the at least V2X service indication parameter.

In an example embodiment, a first base station may transmit to a second base station a handover request message comprising indication parameters of a wireless device requesting a handover. The indication parameters may comprise at least V2X service indication parameter. The second base station may accept the handover request for a wireless device at least based on the at least V2X service indication parameter. The second base station may transmit to the first base station a handover request acknowledge message comprising a notification that the second base station accepts the handover request of the first base station for the wireless device. The first base station may transmit at least one third message to the wireless device. The third message initiates a handover of the wireless device to the second base station.

In an example embodiment, a first base station may accept a handover request of for a wireless device, by a second base station, at least based on the at least V2X service indication parameter included in a handover request message from the first base station. The second base station may make a handover decision for the wireless device after completing the first handover procedure. The second base station may at least take into account at least that the first base station initiated the first handover at least based on the V2X services required by the wireless device.

In an example embodiment, a first base station may transmitting by a first base station to a second base station a handover request message comprising indication parameters of a wireless device requesting a handover, the indication parameters comprises at least V2X service indication parameter. The second base station may reject the handover request for a wireless device at least based on the at least V2X service indication parameter. The second base station may transmit by the second base station to the first base station a handover preparation failure message comprising a notification that the second base station rejects the handover request of the first base station for the wireless device. The handover preparation failure message may comprise at least an indication that the second base station does not support V2X services. The handover preparation failure message may comprise at least an indication that a handover target cell of the second base station does not support V2X services.

In an example embodiment, in FIG. 11, a first eNB may transmit a first message to an MME. The MME may transmit a second message to a second eNB. The second eNB may transmit a third message to the MME. The MME may transmit a fourth message to the first eNB.

The first message for example may be a handover required message. The second message may be a handover request message. The third message may be a handover request acknowledge message. The fourth message may be a handover command message. The first message, the second message, the third message, and the fourth message may be exchanged as a part of an S1-based handover procedure. The first message and the fourth message may be a part of a handover preparation procedure. The second message and the third message may be a part of a handover resource allocation procedure.

In an example embodiment, the first eNB, the second eNB, and the MME may exchange the information that a UE requesting a handover to a cell of the second eNB may continue V2X services or initiate a V2X service after moving to a cell of the second eNB. For example, the first message and/or the second message may comprise information that a UE requesting a handover to a cell of the second eNB may require V2X services in a cell of the second eNB. In an example, a handover required message may be used to transfer this information from the information sending eNB to the MME, and the handover request message may be used to forward this information from the MME to the information receiving eNB.

In an example, in the S1-based handover procedure, the handover required message and/or the handover request message may comprise the information whether a UE requesting a handover requires V2X services after completing a handover procedure or not. The handover required message and/or the handover request message may contain information indicating whether the UE requesting a handover requires V2X services or not. In an example, the handover required message and/or the handover request message may comprise one or more V2X service indications required by a UE requesting a handover. For example, the message may indicate one or more PLMN IDs of the V2X services, various types of V2X services (e.g. V2V, V2N, V2P, V2I, and/or the like), MBSFN or SC-PTM services and/or parameters for V2X downlink, uplink V2X services requirements (SPS requirements, etc), sidelink V2X services requirements, TMGIs of the V2X services, and/or other information related to V2X services required a UE. In an example an IE may include whether a cell is only for V2x or it may support both data and V2X. In an example an IE may include whether the node has RSU and/or eNB capabilities. In an example an IE may indicate whether a PLMN is only for V2x or for both V2X and data. In an example an IE may indicate the TMGI.

In an example, in the S1-based handover procedure, the handover required message and/or the handover request message may comprise the information whether a UE requesting a handover requires V2X services after completing a handover procedure or not. The Cause IE in the handover required message and/or the handover request message may contain information indicating whether the UE requesting a handover requires V2X services or not. In an example, the handover required message and/or the handover request message may comprise one or more V2X service indications required by a UE requesting a handover. For example, the message may indicate one or more PLMN IDs of the V2X services, various types of V2X services (e.g. V2V, V2N, V2P, V2I, and/or the like), MBSFN or SC-PTM services and/or parameters for V2X downlink, uplink V2X services requirements (SPS requirements, etc), sidelink V2X services requirements, TMGIs of the V2X services, and/or other information related to V2X services required a UE. The example indications may be included in a Cause IE in the handover request message and/or the handover request message. In an example an IE may include whether a cell is only for V2x or it may support both data and V2X. In an example an IE may include whether the node has RSU and/or eNB capabilities. In an example an IE may indicate whether a PLMN is only for V2x or for both V2X and data. In an example an IE may indicate the TMGI.

In an example, in the S1-based handover procedure, a handover preparation failure message and/or a handover failure message may comprise the information that a handover request for a UE may not be allowed because a handover target cell of the information sending eNB and/or the information sending eNB may not support V2X services. In an example, the Cause IE in the handover preparation failure message and/or a handover failure message may contain information that a handover request for a UE may be rejected because a handover target cell of the information sending eNB and/or the information sending eNB may not support V2X services.

In an example embodiment, a first base station may transmit to an MME a handover required message comprising indication parameters for a wireless device requesting a handover. The indication parameters may comprise at least V2X service indication parameter. The MME may transmit to a second base station a handover request message comprising indication parameters for a wireless device requesting a handover. The indication parameters may comprise at least V2X service indication parameter. The second base station may make a decision on accepting or rejecting the handover request for a wireless device at least based on the at least V2X service indication parameter.

In an example embodiment, a first base station may transmit to a MME a handover required message comprising indication parameters for a wireless device requesting a handover. The indication parameters may comprise at least V2X service indication parameter. The MME may transmit transmit to a second base station a handover request message comprising indication parameters for a wireless device requesting a handover. The indication parameters may comprise at least V2X service indication parameter. The second base station may accept the handover request for a wireless device at least based on the at least V2X service indication parameter. The second base station may transmit to the MME a handover request acknowledge message comprising a notification that the second base station accepts the handover request of the first base station for the wireless device. The MME may transmit to the first base station a handover command message comprising a notification that the second base station accepts the handover request of the first base station for the wireless device.

In an example embodiment, a first base station may transmit to a MME a handover required message comprising indication parameters for a wireless device requesting a handover. The indication parameters may comprise at least V2X service indication parameter. The MME may transmit to a second base station a handover request message comprising indication parameters for a wireless device requesting a handover. The indication parameters comprises at least V2X service indication parameter. The second base station may accept the handover request for a wireless device at least based on the at least V2X service indication parameter. The second base station may transmit to the MME a handover request acknowledge message comprising a notification that the second base station accepts the handover request of the first base station for the wireless device. The MME may transmit to the first base station a handover command message comprising a notification that the second base station accepts the handover request of the first base station for the wireless device. The first base station may transmit at least one fifth message to the wireless device. The fifth message may initiate a handover of the wireless device to the second base station.

In an example embodiment, the second base station may accept a handover request of a first base station for a wireless device at least based on the at least V2X service indication parameter included in a handover required message from the first base station and/or a handover request message from a MME. The second base station may make a handover decision for the wireless device, by the second base station, after completing the first handover procedure. The second base station at least takes into account at least that the first base station initiated the first handover at least based on the V2X services required by the wireless device.

In an example embodiment, a first base station may transmit by a first base station to a MME a handover required message comprising indication parameters for a wireless device requesting a handover. The indication parameters may comprise at least V2X service indication parameter. The MME may transmit to a second base station a handover request message comprising indication parameters for a wireless device requesting a handover. The indication parameters may comprise at least V2X service indication parameter. The second base station may reject the handover request for a wireless device at least based on the at least V2X service indication parameter. The second base station may transmit to the MME a handover failure message comprising a notification that the second base station rejects the handover request of the first base station for the wireless device. The MME may transmit by the MME to the first base station a handover preparation failure message comprising a notification that the second base station rejects the handover request of the first base station for the wireless device. The handover failure message and/or the handover preparation failure message may comprise at least an indication that the second base station does not support V2X services. The handover failure message and/or the handover preparation failure message comprising at least an indication that a handover target cell of the second base station does not support V2X services.

In an example embodiment, in FIG. 12, a first eNB may transmit a first message to an first MME. The first MME may transmit a second message to a second MME. The second MME may transmit a third message to a second eNB. The second eNB may transmit a fourth message to the second MME. The second MME may transmit a fifth message to the first MME. The first MME may transmit a sixth message to the first eNB.

The first message for example may be a handover required message. The second message may be a forward relocation request message. The third message may be a handover request message. The fourth message may be a handover request acknowledge message. The fifth message may be a forward relocation response message. The sixth message may be a handover command message. The first message, the second message, the third message, the fourth message, the fifth message, and the sixth message may be exchanged as a part of an S1-based handover procedure. The first message and the sixth message may be a part of a handover preparation procedure. The third message and the fourth message may be a part of a handover resource allocation procedure. The second message and the fifth message may be a part of S10 mobility management messages.

In an example embodiment, the first eNB, the second eNB, the first MME, and the second MME may exchange the information that a UE requesting a handover to a cell of the second eNB may continue V2X services or initiate a V2X service after moving to a cell of the second eNB. For example, the first message, the second message, and/or the third message may comprise information that a UE requesting a handover to a cell of the second eNB may require V2X services in a cell of the second eNB. In an example, a handover required message may be used to transfer this information from the information sending eNB to the first MME, the forward relocation request message may be used to forward this information from the first MME to the second MME, and the handover request message may be used to forward this information from the second MME to the information receiving eNB.

In an example, in the S1-based handover procedure, the handover required message, the forward relocation request message, and/or the handover request message may comprise the information whether a UE requesting a handover requires V2X services after completing a handover procedure or not. The handover required message, the forward relocation request message, and/or the handover request message may contain information indicating whether the UE requesting a handover requires V2X services or not. In an example, the handover required message, the forward relocation request message, and/or the handover request message may comprise one or more V2X service indications required by a UE requesting a handover. For example, the message may indicate one or more PLMN IDs of the V2X services, various types of V2X services (e.g. V2V, V2N, V2P, V2I, and/or the like), MBSFN or SC-PTM services and/or parameters for V2X downlink, uplink V2X services requirements (SPS requirements, etc), sidelink V2X services requirements, TMGIs of the V2X services, and/or other information related to V2X services required a UE. In an example an IE may include whether a cell is only for V2x or it may support both data and V2X. In an example an IE may include whether the node has RSU and/or eNB capabilities. In an example an IE may indicate whether a PLMN is only for V2x or for both V2X and data. In an example an IE may indicate the TMGI.

In an example, in the S1-based handover procedure, the handover required message, the forward relocation request message, and/or the handover request message may comprise the information whether a UE requesting a handover requires V2X services after completing a handover procedure or not. The Cause IE in the handover required message and/or the handover request message may contain information indicating whether the UE requesting a handover requires V2X services or not. The S1-AP Cause IE in the forward relocation request message may contain information indicating whether the UE requesting a handover requires V2X services or not. In an example, the handover required message, the forward relocation request message, and/or the handover request message may comprise one or more V2X service indications required by a UE requesting a handover. For example, the message may indicate one or more PLMN IDs of the V2X services, various types of V2X services (e.g. V2V, V2N, V2P, V2I, and/or the like), MBSFN or SC-PTM services and/or parameters for V2X downlink, uplink V2X services requirements (SPS requirements, etc), sidelink V2X services requirements, TMGIs of the V2X services, and/or other information related to V2X services required a UE. In an example an IE may include whether a cell is only for V2x or it may support both data and V2X. In an example an IE may include whether the node has RSU and/or eNB capabilities. In an example an IE may indicate whether a PLMN is only for V2x or for both V2X and data. In an example an IE may indicate the TMGI.

TMGI. The example indications may be included in a Cause IE in the handover request message and/or the handover request message. The example indications may be included in a S1-AP Cause IE in the forward relocation request message.

In an example, in the S1-based handover procedure, the handover required message, the forward relocation request message, and/or the handover request message may comprise the information whether a UE requesting a handover requires V2X services after completing a handover procedure or not. The MME/SGSN UE EPS PDN Connections IE in the forward relocation request message may contain information indicating whether the UE requesting a handover requires V2X services or not. In an example, the handover required message, the forward relocation request message, and/or the handover request message may comprise one or more V2X service indications required by a UE requesting a handover. For example, the message may indicate one or more PLMN IDs of the V2X services, various types of V2X services (e.g. V2V, V2N, V2P, V2I, and/or the like), MBSFN or SC-PTM services and/or parameters for V2X downlink, uplink V2X services requirements (SPS requirements, etc), sidelink V2X services requirements, TMGIs of the V2X services, and/or other information related to V2X services required a UE. The example indications may be included in a MME/SGSN UE EPS PDN Connections IE in the forward relocation request message.

In an example an IE may include whether a cell is only for V2x or it may support both data and V2X. In an example an IE may include whether the node has RSU and/or eNB capabilities. In an example an IE may indicate whether a PLMN is only for V2x or for both V2X and data. In an example an IE may indicate the TMGI.

In an example, in the S1-based handover procedure, the handover required message, the forward relocation request message, and/or the handover request message may comprise the information whether a UE requesting a handover requires V2X services after completing a handover procedure or not. The Indication Flags IE in the MME/SGSN UE EPS PDN Connections IE in the forward relocation request message may contain information indicating whether the UE requesting a handover requires V2X services or not. In an example, the handover required message, the forward relocation request message, and/or the handover request message may comprise one or more V2X service indications required by a UE requesting a handover. For example, the message may indicate one or more PLMN IDs of the V2X services, various types of V2X services (e.g. V2V, V2N, V2P, V2I, and/or the like), MBSFN or SC-PTM services and/or parameters for V2X downlink, uplink V2X services requirements (SPS requirements, etc), sidelink V2X services requirements, TMGIs of the V2X services, and/or other information related to V2X services required a UE. The example indications may be included in an Indication Flags IE in the MME/SGSN UE EPS PDN Connections IE in the forward relocation request message.

In an example an IE may include whether a cell is only for V2x or it may support both data and V2X. In an example an IE may include whether the node has RSU and/or eNB capabilities. In an example an IE may indicate whether a PLMN is only for V2x or for both V2X and data. In an example an IE may indicate the TMGI.

In an example, in the S1-based handover procedure, the handover required message, the forward relocation request message, and/or the handover request message may comprise the information whether a UE requesting a handover requires V2X services after completing a handover procedure or not. The Indication Flags IE in the forward relocation request message may contain information indicating whether the UE requesting a handover requires V2X services or not. In an example, the handover required message, the forward relocation request message, and/or the handover request message may comprise one or more V2X service indications required by a UE requesting a handover. For example, the message may indicate one or more PLMN IDs of the V2X services, various types of V2X services (e.g. V2V, V2N, V2P, V2I, and/or the like), MBSFN or SC-PTM services and/or parameters for V2X downlink, uplink V2X services requirements (SPS requirements, etc), sidelink V2X services requirements, TMGIs of the V2X services, and/or other information related to V2X services required a UE. The example indications may be included in a Indication Flags IE in the forward relocation request message.

In an example an IE may include whether a cell is only for V2x or it may support both data and V2X. In an example an IE may include whether the node has RSU and/or eNB capabilities. In an example an IE may indicate whether a PLMN is only for V2x or for both V2X and data. In an example an IE may indicate the TMGI.

In an example, in the S1-based handover procedure, the handover required message, the forward relocation request message, and/or the handover request message may comprise the information whether a UE requesting a handover requires V2X services after completing a handover procedure or not. The UE Usage Type IE in the forward relocation request message may contain information indicating whether the UE requesting a handover requires V2X services or not. In an example, the UE Usage Type IE may comprise information of a dedicated core network for V2X services. In an example, the handover required message, the forward relocation request message, and/or the handover request message may comprise one or more V2X service indications required by a UE requesting a handover. For example, the message may indicate one or more PLMN IDs of the V2X services, various types of V2X services (e.g. V2V, V2N, V2P, V2I, and/or the like), MBSFN or SC-PTM services and/or parameters for V2X downlink, uplink V2X services requirements (SPS requirements, etc), sidelink V2X services requirements, TMGIs of the V2X services, and/or other information related to V2X services required a UE. The example indications may be included in a UE Usage Type IE in the forward relocation request message.

In an example an IE may include whether a cell is only for V2x or it may support both data and V2X. In an example an IE may include whether the node has RSU and/or eNB capabilities. In an example an IE may indicate whether a PLMN is only for V2x or for both V2X and data. In an example an IE may indicate the TMGI.

In an example, in the S1-based handover procedure, the handover required message, the forward relocation request message, and/or the handover request message may comprise the information whether a UE requesting a handover requires V2X services after completing a handover procedure or not. The Selected PLMN ID IE in the forward relocation request message may contain information indicating whether the UE requesting a handover requires V2X services or not. In an example, the Selected PLMN ID IE may comprise a target network operator PLMN ID for V2X services. In an example, the handover required message, the forward relocation request message, and/or the handover request message may comprise one or more V2X service indications required by a UE requesting a handover. For example, the message may indicate one or more PLMN IDs of the V2X services, various types of V2X services (e.g. V2V, V2N, V2P, V2I, and/or the like), MBSFN or SC-PTM services and/or parameters for V2X downlink, uplink V2X services requirements (SPS requirements, etc), sidelink V2X services requirements, TMGIs of the V2X services, and/or other information related to V2X services required a UE. The example indications may be included in a Selected PLMN ID IE in the forward relocation request message.

In an example an IE may include whether a cell is only for V2x or it may support both data and V2X. In an example an IE may include whether the node has RSU and/or eNB capabilities. In an example an IE may indicate whether a PLMN is only for V2x or for both V2X and data. In an example an IE may indicate the TMGI.

In an example, in the S1-based handover procedure, a handover preparation failure message, a handover failure message, and/or a forward relocation response message may comprise the information that a handover request for a UE may not be allowed because a handover target cell of the information sending eNB and/or the information sending eNB may not support V2X services. In an example, the Cause IE in the handover preparation failure message, a handover failure message, and/or a forward relocation response message may contain information that a handover request for a UE may be rejected because a handover target cell of the information sending eNB and/or the information sending eNB may not support V2X services.

In an example, in the S1-based handover procedure, a handover preparation failure message, a handover failure message, and/or a forward relocation response message may comprise the information that a handover request for a UE may not be allowed because a handover target cell of the information sending eNB and/or the information sending eNB may not support V2X services. In an example, the Indication Flags IE in the forward relocation response message may contain information that a handover request for a UE may be rejected because a handover target cell of the information sending eNB and/or the information sending eNB may not support V2X services.

In an example, in the S1-based handover procedure, a handover preparation failure message, a handover failure message, and/or a forward relocation response message may comprise the information that a handover request for a UE may not be allowed because a handover target cell of the information sending eNB and/or the information sending eNB may not support V2X services. In an example, the S1-AP Cause IE in the forward relocation response message may contain information that a handover request for a UE may be rejected because a handover target cell of the information sending eNB and/or the information sending eNB may not support V2X services.

In an example embodiment, a first base station may transmit to a first MME a first message comprising indication parameters for a wireless device requesting a handover. The indication parameters may comprise at least V2X service indication parameter. The first MME may transmit to a second MME a second message comprising indication parameters for a wireless device requesting a handover. The indication parameters may comprise at least V2X service indication parameter. The second MME may transmit to a second base station a third message comprising indication parameters for a wireless device requesting a handover. The indication parameters comprises at least V2X service indication parameters. The second base station may make a decision on accepting the handover request for a wireless device at least based on the at least V2X service indication parameter.

In an example embodiment, a first base station may transmit to a first MME a handover required message comprising indication parameters for a wireless device requesting a handover. The indication parameters may comprise at least V2X service indication parameter.

In an example embodiment, the first MME may transmit to a second MME a first message comprising indication parameters for a wireless device requesting a handover. The indication parameters may comprise at least V2X service indication parameter. The second MME may transmit to a second base station a second message comprising indication parameters for a wireless device requesting a handover. The indication parameters may comprise at least V2X service indication parameter. The second base station may accept the handover request for a wireless device, at least based on the at least V2X service indication parameter. The second base station may transmit to the second MME a third message comprising a notification that the second base station accepts the handover request of the first base station for the wireless device. The second MME may transmit to the first MME a forward relocation response message comprising a notification that the second base station accepts the handover request of the first base station for the wireless device. The first MME may transmit to the first base station a handover command message comprising a notification that the second base station accepts the handover request of the first base station for the wireless device.

In an example embodiment, a first base station may transmit to a first MME a handover required message comprising indication parameters for a wireless device requesting a handover. The indication parameters may comprise at least V2X service indication parameter. The first MME may transmit to a second MME a forward relocation request message comprising indication parameters for a wireless device requesting a handover. The indication parameters may comprise at least V2X service indication parameter. The second MME may transmit to a second base station a handover request message comprising indication parameters for a wireless device requesting a handover. The indication parameters may comprise at least V2X service indication parameter. The second base station may accept the handover request for a wireless device at least based on the at least V2X service indication parameter. The second base station may transmit to the second MME a handover request acknowledge message comprising a notification that the second base station accepts the handover request of the first base station for the wireless device. The second MME may transmit to the first MME a forward relocation response message comprising a notification that the second base station accepts the handover request of the first base station for the wireless device. The first MME may transmit to the first base station a handover command message comprising a notification that the second base station accepts the handover request of the first base station for the wireless device.

The first base station may transmit at least one fifth message to the wireless device. The seventh message may initiate a handover of the wireless device to the second base station.

In an example embodiment, a second base station may accept a handover request of a first base station for a wireless device at least based on the at least V2X service indication parameter included in a handover required message from the first base station, a forward relocation request message from a first MME and/or a handover request message from a second MME. The second base station may make a handover decision for the wireless device after completing the first handover procedure. The second base station may at least take into account at least that the first base station initiated the first handover at least based on the V2X services required by the wireless device.

In an example embodiment, the first base station may transmit to a first MME a handover required message comprising indication parameters for a wireless device requesting a handover. The indication parameters may comprise at least V2X service indication parameter. The first MME may transmit to a second MME a forward relocation request message comprising indication parameters for a wireless device requesting a handover. The indication parameters may comprise at least V2X service indication parameter. The second MME may transmit to a second base station a handover request message comprising indication parameters for a wireless device requesting a handover. The indication parameters may comprise at least V2X service indication parameter.

In an example embodiment, the second base station may reject the handover request for a wireless device at least based on the at least V2X service indication parameter. The second base station may transmit to the second MME a handover failure message comprising a notification that the second base station rejects the handover request of the first base station for the wireless device. The second MME may transmit to the first MME a forward relocation response message comprising a notification that the second base station rejects the handover request of the first base station for the wireless device. The first MME may transmit to the first base station a handover preparation failure message comprising a notification that the second base station rejects the handover request of the first base station for the wireless device. The handover failure message and/or the handover preparation failure message may comprise at least an indication that the second base station does not support V2X services. The handover failure message and/or the handover preparation failure message may comprise at least an indication that a handover target cell of the second base station does not support V2X services.

In an example embodiment, a UE with V2X services may add another cell (SeNB, secondary base station, secondary eNB) in addition to a current serving cell (MeNB, master base station, master eNB). An MeNB may send an SeNB addition request and/or an SeNB modification request to an SeNB. An SeNB receiving an SeNB addition request message and/or an SeNB modification request message for a UE with V2X services may decide whether it will accept the SeNB addition request and/or the SeNB modification request or not. An SeNB receiving an SeNB addition request message and/or an SeNB modification request message for a UE with V2X services may decide whether it will setup bearers for V2X services or not. The current X2 protocol and SeNB addition and/or MeNB initiated SeNB modification mechanisms/signaling may require enhancements to enable an SeNB to make a decision on accepting an SeNB addition request and/or an SeNB modification request for a UE and/or a decision on setting up bearers for V2X services. The current X2 protocol and SeNB addition and/or MeNB initiated SeNB modification mechanisms/signaling may require enhancements to improve an SeNB addition preparation procedure and/or an MeNB initiated SeNB modification preparation procedure for the UE with V2X services. In the legacy network, SeNB addition and/or MeNB initiated SeNB modification of a UE with V2X services may fail or V2X services may be interrupted due to SeNB addition preparation procedure and/or MeNB initiated SeNB modification preparation procedure.

Example embodiments may improve the SeNB addition preparation procedure and/or the MeNB initiated SeNB modification preparation procedure for a UE with V2X services. Example embodiments provide enhancements to current SeNB addition and/or MeNB initiated SeNB modification mechanism and increase V2X service reliability and continuity. In an example embodiment, a UE with V2X services may continue the V2X service that is provided to the UE after adding another cell of SeNB, or a UE without V2X services may initiate a V2X service after adding another cell of SeNB. In an example embodiment, a UE with V2X services may continue the V2X service that is provided to the UE after modifying a cell of SeNB, or a UE without V2X services may initiate a V2X service after modifying a cell of SeNB. Example embodiments enables a serving UE to continue its V2X service or initiate its V2X service when it is adding and/or modifying cells in an area covered by multiple eNBs. Example embodiments enable an SeNB to make a decision on accepting an SeNB addition request and/or an SeNB modification request for a UE with an existing V2X service, or for a UE initiating a V2X service. Example embodiments enable an SeNB to make a decision on setting up bearers for V2X services for a UE with an existing V2X service, or for a UE initiating a V2X service. Example embodiments may enhance network performance by enabling an SeNB to employ information of bearers for V2X services from an MeNB sending an SeNB addition request message and/or an SeNB modification request message for a UE with V2X services. Example embodiments may enable an SeNB receiving an SeNB addition request message and/or an SeNB modification request message to make an SeNB initiated SeNB release decision and/or an SeNB initiated SeNB modification decision for a UE with V2X services in the future.

Figure 13:
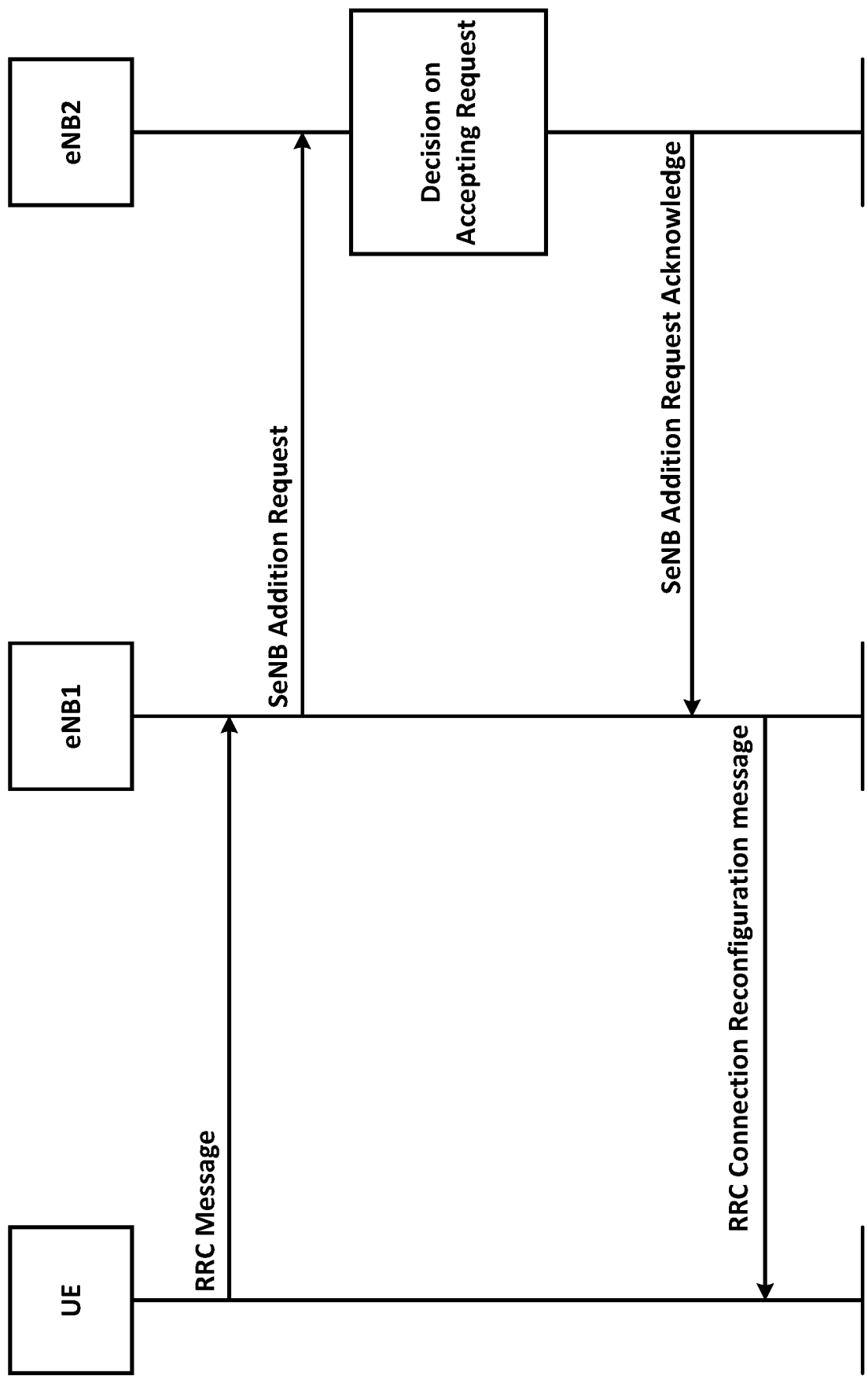
FIG. 13 is an example data flow diagram as per an aspect of embodiments of the present disclosure.

In an example embodiment, in FIG. 13, a MeNB may transmit a first message to a SeNB. The SeNB may transmit a second message to the MeNB. The first message for example may be an SeNB addition request message. The second message may be an SeNB addition request acknowledge message. The first message and the second message may be exchanged as a part of an SeNB addition preparation procedure.

In an example embodiment, the MeNB may transfer to the SeNB the information that a UE requesting an SeNB addition may continue V2X services or initiate a V2X service after adding another cell of the SeNB. For example, the first message may comprise information of a list of bearers for V2X services required by a UE requesting an SeNB addition to a cell of the SeNB in a cell of the SeNB. In an example, a SeNB addition request message may be used to transfer this information from the information sending eNB (MeNB) to the information receiving eNB (SeNB).

In an example, in the SeNB addition preparation procedure, the SeNB addition request message may comprise the information that a UE requesting an SeNB addition requires V2X services after completing a SeNB addition preparation procedure. The SeNB addition request message may contain information indicating whether a bearer required for the UE requesting an SeNB addition is to provide V2X services or not. In an example, the SeNB addition request message may comprise one or more V2X service indications for a bearer required by a UE requesting an SeNB addition. For example, the message may indicate one or more PLMN IDs of the V2X services, various types of V2X services (e.g. V2V, V2N, V2P, V2I, and/or the like), MBSFN or SC-PTM services and/or parameters for V2X downlink, uplink V2X services requirements (SPS requirements, etc), sidelink V2X services requirements, TMGIs of the V2X services and/or other information related to V2X services for a bearer required by a UE requesting an SeNB addition. In an example an IE may include whether a cell is only for V2x or it may support both data and V2X. In an example an IE may include whether the node has RSU and/or eNB capabilities. In an example an IE may indicate whether a PLMN is only for V2x or for both V2X and data. In an example an IE may indicate the TMGI.

In an example, in the SeNB addition preparation procedure, the SeNB addition request message may comprise the information that a UE requesting an SeNB addition requires V2X services after completing a SeNB addition preparation procedure. The E-RABs To Be Added Item IE in the SeNB addition request message may contain information indicating whether a bearer required for the UE requesting an SeNB addition is to provide V2X services or not. In an example, the SeNB addition request message may comprise one or more V2X service indications for a bearer required by a UE requesting an SeNB addition. For example, the message may indicate one or more PLMN IDs of the V2X services, various types of V2X services (e.g. V2V, V2N, V2P, V2I, and/or the like), MBSFN or SC-PTM services and/or parameters for V2X downlink, uplink V2X services requirements (SPS requirements, etc), sidelink V2X services requirements, TMGIs of the V2X services and/or other information related to V2X services for a bearer required by a UE requesting an SeNB addition. The example indications may be included in an E-RABs To Be Added Item IE in the SeNB addition request message and/or the SeNB addition request message. In an example an IE may include whether a cell is only for V2x or it may support both data and V2X. In an example an IE may include whether the node has RSU and/or eNB capabilities. In an example an IE may indicate whether a PLMN is only for V2x or for both V2X and data. In an example an IE may indicate the TMGI.

In an example, in the SeNB addition preparation procedure, the SeNB addition request message may comprise the information that a UE requesting an SeNB addition requires V2X services after completing a SeNB addition preparation procedure. The E-RAB ID IE in the SCG Bearer IE and/or Split Bearer IE in the E-RABs To Be Added Item IE in the SeNB addition request message may contain information indicating whether a bearer required for the UE requesting an SeNB addition is to provide V2X services or not. In an example, the E-RAB ID IE may be an ID assigned for V2X services. In an example, the SeNB addition request message may comprise one or more V2X service indications for a bearer required by a UE requesting an SeNB addition. For example, the message may indicate one or more PLMN IDs of the V2X services, various types of V2X services (e.g. V2V, V2N, V2P, V2I, and/or the like), MBSFN or SC-PTM services and/or parameters for V2X downlink, uplink V2X services requirements (SPS requirements, etc), sidelink V2X services requirements, TMGIs of the V2X services and/or other information related to V2X services for a bearer required by a UE requesting an SeNB addition. The example indications may be included in an E-RAB ID IE in the SCG Bearer IE and/or Split Bearer IE in the E-RABs To Be Added Item IE in the SeNB addition request message and/or the SeNB addition request message. In an example an IE may include whether a cell is only for V2x or it may support both data and V2X. In an example an IE may include whether the node has RSU and/or eNB capabilities. In an example an IE may indicate whether a PLMN is only for V2x or for both V2X and data. In an example an IE may indicate the TMGI.

In an example, in the SeNB addition preparation procedure, the SeNB addition request message may comprise the information that a UE requesting an SeNB addition requires V2X services after completing a SeNB addition preparation procedure. The E-RAB Level QoS Parameters IE in the SCG Bearer IE and/or Split Bearer IE in the E-RABs To Be Added Item IE in the SeNB addition request message may contain information indicating whether a bearer required for the UE requesting an SeNB addition is to provide V2X services or not. In an example, the E-RAB Level QoS Parameters IE may comprise a QCI value dedicated for V2X services. In an example, the SeNB addition request message may comprise one or more V2X service indications for a bearer required by a UE requesting an SeNB addition. For example, the message may indicate one or more PLMN IDs of the V2X services, various types of V2X services (e.g. V2V, V2N, V2P, V2I, and/or the like), MBSFN or SC-PTM services and/or parameters for V2X downlink, uplink V2X services requirements (SPS requirements, etc), sidelink V2X services requirements, TMGIs of the V2X services and/or other information related to V2X services for a bearer required by a UE requesting an SeNB addition. The example indications may be included in an E-RAB Level QoS Parameters IE in the SCG Bearer IE and/or Split Bearer IE in the E-RABs To Be Added Item IE in the SeNB addition request message and/or the SeNB addition request message. In an example an IE may include whether a cell is only for V2x or it may support both data and V2X. In an example an IE may include whether the node has RSU and/or eNB capabilities. In an example an IE may indicate whether a PLMN is only for V2x or for both V2X and data. In an example an IE may indicate the TMGI.

In an example, in the SeNB addition preparation procedure, the SeNB addition request message may comprise the information that a UE requesting an SeNB addition requires V2X services after completing a SeNB addition preparation procedure. The S1 UL GTP Tunnel Endpoint IE in the SCG Bearer IE in the E-RABs To Be Added Item IE in the SeNB addition request message may contain information indicating whether a bearer required for the UE requesting an SeNB addition is to provide V2X services or not. In an example, the S1 UL GTP Tunnel Endpoint IE may indicate an UL GTP tunnel endpoint address of a core network supporting V2X services. In an example, the SeNB addition request message may comprise one or more V2X service indications for a bearer required by a UE requesting an SeNB addition. For example, the message may indicate one or more PLMN IDs of the V2X services, various types of V2X services (e.g. V2V, V2N, V2P, V2I, and/or the like), MBSFN or SC-PTM services and/or parameters for V2X downlink, uplink V2X services requirements (SPS requirements, etc), sidelink V2X services requirements, TMGIs of the V2X services and/or other information related to V2X services for a bearer required by a UE requesting an SeNB addition. The example indications may be included in an S1 UL GTP Tunnel Endpoint IE in the SCG Bearer IE in the E-RABs To Be Added Item IE in the SeNB addition request message and/or the SeNB addition request message. In an example an IE may include whether a cell is only for V2x or it may support both data and V2X. In an example an IE may include whether the node has RSU and/or eNB capabilities. In an example an IE may indicate whether a PLMN is only for V2x or for both V2X and data. In an example an IE may indicate the TMGI.

In an example, in the SeNB addition preparation procedure, an SeNB addition request acknowledge message may comprise information that a list of bearers may not be admitted at the information sending eNB (SeNB) because an SeNB addition target cell of the information sending eNB (SeNB) and/or the information sending eNB (SeNB) may not support V2X services. In an example, the E-RABs Not Admitted List IE in the SeNB addition request acknowledge message may contain information that a list of bearers may be rejected at the information sending eNB (SeNB) because an SeNB addition target cell of the information sending eNB (SeNB) and/or the information sending eNB (SeNB) may not support V2X services.

In an example, in the SeNB addition preparation procedure, an SeNB addition request acknowledge message may comprise information that a list of bearers may not be admitted at the information sending eNB (SeNB) because an SeNB addition target cell of the information sending eNB (SeNB) and/or the information sending eNB (SeNB) may not support V2X services. In an example, the Cause IE in the E-RABs Not Admitted List IE in the SeNB addition request acknowledge message may contain information that a list of bearers may be rejected at the information sending eNB (SeNB) because an SeNB addition target cell of the information sending eNB (SeNB) and/or the information sending eNB (SeNB) may not support V2X services.

In an example, in the SeNB addition preparation procedure, an SeNB addition request reject message may comprise the information that an SeNB addition request for a UE may not be allowed because an SeNB addition target cell of the information sending eNB (SeNB) and/or the information sending eNB (SeNB) may not support V2X services. In an example, the Cause IE in the SeNB addition request reject message may contain information that an SeNB addition request for a UE may be rejected because an SeNB addition target cell of the information sending eNB (SeNB) and/or the information sending eNB (SeNB) may not support V2X services.

Figure 14:
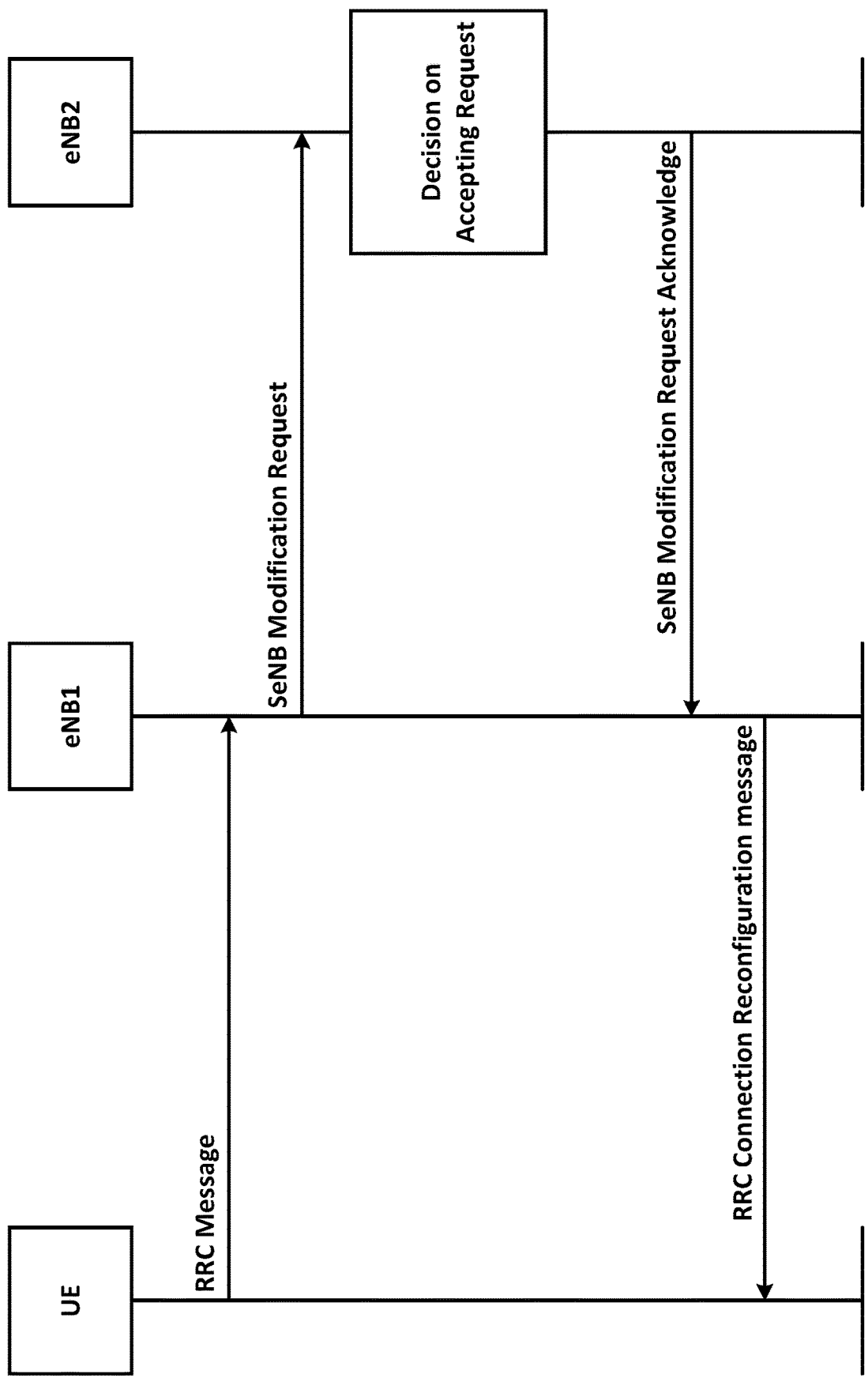
FIG. 14 is an example data flow diagram as per an aspect of an embodiment of the present disclosure.

In an example embodiment, in FIG. 14, a MeNB transmits a first message to a SeNB. The SeNB may transmit a second message to the MeNB. The first message for example may be an SeNB modification request message. The second message may be an SeNB modification request acknowledge message. The first message and the second message may be exchanged as a part of an MeNB initiated SeNB modification preparation procedure.

In an example embodiment, the MeNB may transfer to the SeNB the information that a UE requesting an SeNB modification may continue V2X services or initiate a V2X service after modifying a cell of the SeNB. For example, the first message may comprise information of a list of bearers for V2X services required by a UE requesting an SeNB modification of a cell of the SeNB in a cell of the SeNB. In an example, a SeNB modification request message may be used to transfer this information from the information sending eNB (MeNB) to the information receiving eNB (SeNB).

In an example, in the MeNB initiated SeNB modification preparation procedure, the SeNB modification request message may comprise the information that a UE requesting an SeNB modification requires V2X services after completing an MeNB initiated SeNB modification preparation procedure. The SeNB modification request message may contain information indicating whether a bearer required for the UE requesting an SeNB modification is to provide V2X services or not. In an example, the SeNB modification request message may comprise one or more V2X service indications for a bearer required by a UE requesting an SeNB modification. For example, the message may indicate one or more PLMN IDs of the V2X services, various types of V2X services (e.g. V2V, V2N, V2P, V2I, and/or the like), MBSFN or SC-PTM services and/or parameters for V2X downlink, uplink V2X services requirements (SPS requirements, etc), sidelink V2X services requirements, TMGIs of the V2X services and/or other information related to V2X services for a bearer required by a UE requesting an SeNB modification. In an example an IE may include whether a cell is only for V2x or it may support both data and V2X. In an example an IE may include whether the node has RSU and/or eNB capabilities. In an example an IE may indicate whether a PLMN is only for V2x or for both V2X and data. In an example an IE may indicate the TMGI.

In an example, in the MeNB initiated SeNB modification preparation procedure, the SeNB modification request message may comprise the information that a UE requesting an SeNB modification requires V2X services after completing an MeNB initiated SeNB modification preparation procedure. The E-RABs To Be Added Item IE and/or the E-RAB To Be Modified Item IE in the SeNB modification request message may contain information indicating whether a bearer required for the UE requesting an SeNB modification is to provide V2X services or not. In an example, the SeNB modification request message may comprise one or more V2X service indications for a bearer required by a UE requesting an SeNB modification. For example, the message may indicate one or more PLMN IDs of the V2X services, various types of V2X services (e.g. V2V, V2N, V2P, V2I, and/or the like), MBSFN or SC-PTM services and/or parameters for V2X downlink, uplink V2X services requirements (SPS requirements, etc), sidelink V2X services requirements, TMGIs of the V2X services and/or other information related to V2X services for a bearer required by a UE requesting an SeNB modification. The example indications may be included in an E-RABs To Be Added Item IE and/or an E-RAB To Be Modified Item IE in the SeNB modification request message and/or the SeNB modification request message. In an example an IE may include whether a cell is only for V2x or it may support both data and V2X. In an example an IE may include whether the node has RSU and/or eNB capabilities. In an example an IE may indicate whether a PLMN is only for V2x or for both V2X and data. In an example an IE may indicate the TMGI.

In an example, in the MeNB initiated SeNB modification preparation procedure, the SeNB modification request message may comprise the information that a UE requesting an SeNB modification requires V2X services after completing an MeNB initiated SeNB modification preparation procedure. The E-RAB ID IE in the SCG Bearer IE and/or Split Bearer IE in the E-RABs To Be Added Item IE and/or the E-RAB To Be Modified Item IE in the SeNB modification request message may contain information indicating whether a bearer required for the UE requesting an SeNB modification is to provide V2X services or not. In an example, the E-RAB ID IE may be an ID assigned for V2X services. In an example, the SeNB modification request message may comprise one or more V2X service indications for a bearer required by a UE requesting an SeNB modification. For example, the message may indicate one or more PLMN IDs of the V2X services, various types of V2X services (e.g. V2V, V2N, V2P, V2I, and/or the like), MBSFN or SC-PTM services and/or parameters for V2X downlink, uplink V2X services requirements (SPS requirements, etc), sidelink V2X services requirements, TMGIs of the V2X services and/or other information related to V2X services for a bearer required by a UE requesting an SeNB modification. The example indications may be included in an E-RAB ID IE in the SCG Bearer IE and/or the Split Bearer IE in the E-RABs To Be Added Item IE and/or the E-RAB To Be Modified Item IE in the SeNB modification request message and/or the SeNB modification request message. In an example an IE may include whether a cell is only for V2x or it may support both data and V2X. In an example an IE may include whether the node has RSU and/or eNB capabilities. In an example an IE may indicate whether a PLMN is only for V2x or for both V2X and data. In an example an IE may indicate the TMGI.

In an example, in the MeNB initiated SeNB modification preparation procedure, the SeNB modification request message may comprise the information that a UE requesting an SeNB modification requires V2X services after completing an MeNB initiated SeNB modification preparation procedure. The E-RAB Level QoS Parameters IE in the SCG Bearer IE and/or Split Bearer IE in the E-RABs To Be Added Item IE and/or the E-RAB To Be Modified Item IE in the SeNB modification request message may contain information indicating whether a bearer required for the UE requesting an SeNB modification is to provide V2X services or not. In an example, the E-RAB Level QoS Parameters IE may comprise a QCI value dedicated for V2X services. In an example, the SeNB modification request message may comprise one or more V2X service indications for a bearer required by a UE requesting an SeNB modification. For example, the message may indicate one or more PLMN IDs of the V2X services, various types of V2X services (e.g. V2V, V2N, V2P, V2I, and/or the like), MBSFN or SC-PTM services and/or parameters for V2X downlink, uplink V2X services requirements (SPS requirements, etc), sidelink V2X services requirements, TMGIs of the V2X services and/or other information related to V2X services for a bearer required by a UE requesting an SeNB modification. The example indications may be included in an E-RAB Level QoS Parameters IE in the SCG Bearer IE and/or the Split Bearer IE in the E-RABs To Be Added Item IE and/or the E-RAB To Be Modified Item IE in the SeNB modification request message and/or the SeNB modification request message. In an example an IE may include whether a cell is only for V2x or it may support both data and V2X. In an example an IE may include whether the node has RSU and/or eNB capabilities. In an example an IE may indicate whether a PLMN is only for V2x or for both V2X and data. In an example an IE may indicate the TMGI.

In an example, in the MeNB initiated SeNB modification preparation procedure, the SeNB modification request message may comprise the information that a UE requesting an SeNB modification requires V2X services after completing an MeNB initiated SeNB modification preparation procedure. The S1 UL GTP Tunnel Endpoint IE in the SCG Bearer IE in the E-RABs To Be Added Item IE and/or the E-RAB To Be Modified Item IE in the SeNB modification request message may contain information indicating whether a bearer required for the UE requesting an SeNB modification is to provide V2X services or not. In an example, the S1 UL GTP Tunnel Endpoint IE may indicate an UL GTP tunnel endpoint address of a core network supporting V2X services. In an example, the SeNB modification request message may comprise one or more V2X service indications for a bearer required by a UE requesting an SeNB modification. For example, the message may indicate one or more PLMN IDs of the V2X services, various types of V2X services (e.g. V2V, V2N, V2P, V2I, and/or the like), MBSFN or SC-PTM services and/or parameters for V2X downlink, uplink V2X services requirements (SPS requirements, etc), sidelink V2X services requirements, TMGIs of the V2X services and/or other information related to V2X services for a bearer required by a UE requesting an SeNB modification. The example indications may be included in an S1 UL GTP Tunnel Endpoint IE in the SCG Bearer IE in the E-RABs To Be Added Item IE and/or the E-RAB To Be Modified Item IE in the SeNB modification request message and/or the SeNB modification request message. In an example an IE may include whether a cell is only for V2x or it may support both data and V2X. In an example an IE may include whether the node has RSU and/or eNB capabilities. In an example an IE may indicate whether a PLMN is only for V2x or for both V2X and data. In an example an IE may indicate the TMGI.

In an example, in the MeNB initiated SeNB modification preparation procedure, an SeNB modification request acknowledge message may comprise information that a list of bearers may not be admitted at the information sending eNB (SeNB) because an SeNB modification target cell of the information sending eNB (SeNB) and/or the information sending eNB (SeNB) may not support V2X services. In an example, the E-RABs Not Admitted List IE in the SeNB modification request acknowledge message may contain information that a list of bearers may be rejected at the information sending eNB (SeNB) because an SeNB modification target cell of the information sending eNB (SeNB) and/or the information sending eNB (SeNB) may not support V2X services.

In an example, in the MeNB initiated SeNB modification preparation procedure, an SeNB modification request acknowledge message may comprise information that a list of bearers may not be admitted at the information sending eNB (SeNB) because an SeNB modification target cell of the information sending eNB (SeNB) and/or the information sending eNB (SeNB) may not support V2X services. In an example, the Cause IE in the E-RABs Not Admitted List IE in the SeNB modification request acknowledge message may contain information that a list of bearers may be rejected at the information sending eNB (SeNB) because an SeNB modification target cell of the information sending eNB (SeNB) and/or the information sending eNB (SeNB) may not support V2X services.

In an example, in the MeNB initiated SeNB modification preparation procedure, an SeNB modification request reject message may comprise the information that an SeNB modification request for a UE may not be allowed because a SeNB modification target cell of the information sending eNB (SeNB) and/or the information sending eNB (SeNB) may not support V2X services. In an example, the Cause IE in the SeNB modification request reject message may contain information that a SeNB modification request for a UE may be rejected because an SeNB modification target cell of the information sending eNB (SeNB) and/or the information sending eNB (SeNB) may not support V2X services.

In an example, a first base station may transmit, to a second base station, an SeNB addition request message comprising indication parameters for a wireless device requesting an SeNB addition. The indication parameters may comprise at least a list of bearers for V2X services. The second base station may make a decision on accepting the SeNB addition request for a wireless device at least based on the at least V2X service indication parameter.

In an example, a first base station may transmit, to a second base station, an SeNB addition request message comprising indication parameters for a wireless device requesting an SeNB addition. The indication parameters may comprise at least a list of bearers for V2X services. The second base station may accept the SeNB addition request for a wireless device at least based on the at least V2X service indication parameter. The second base station may transmit, to the first base station, an SeNB addition request acknowledge message comprising a notification that the second base station accepts the SeNB addition request of the first base station for the wireless device, and/or a list of bearers for V2X services accepted by the second base station. The SeNB addition request acknowledge message may comprise at least a list of bearers not admitted with a cause that V2X services are not supported in a cell of the second base station and/or the second base station.

In an example, a first base station may transmit, to a second base station, an SeNB addition request message comprising indication parameters for a wireless device requesting an SeNB addition. The indication parameters may comprise at least a list of bearers for V2X services. The second base station may accept the SeNB addition request for a wireless device at least based on the at least V2X service indication parameter. The second base station may transmit, to the first base station, an SeNB addition request acknowledge message comprising a notification that the second base station accepts the SeNB addition request of the first base station for the wireless device, and/or a list of bearers for V2X services accepted by the second base station. The first base station may transmit at least one third message to the wireless device. The third message may initiate an SeNB addition of the wireless device to the second base station.

In an example, a second base station may accept an SeNB addition request for a wireless device at least based on the at least V2X service indication parameter included in an SeNB addition request message from a first base station. The second base station may make an SeNB initiated SeNB modification decision for the wireless device after completing the SeNB addition procedure. The second base station at least may take into account at least that the wireless device needs at least the list of bearers accepted by the second base station for the V2X services.

In an example, a second base station may accept an SeNB addition request for a wireless device at least based on the at least V2X service indication parameter included in an SeNB addition request message from a first base station. The second base station may make an SeNB initiated SeNB release decision for the wireless device after completing the SeNB addition procedure. The second base station at least may take into account at least that the wireless device needs at least the list of bearers accepted by the second base station for the V2X services.

In an example, a first base station may transmit, to a second base station, an SeNB addition request message comprising indication parameters for a wireless device requesting an SeNB addition. The indication parameters may comprise at least a list of bearers for V2X services. The second base station may reject the SeNB addition request for a wireless device at least based on the at least V2X service indication parameter. The second base station may transmit, to the first base station, an SeNB addition request reject message comprising a notification that the second base station rejects the SeNB addition request of the first base station for the wireless device. The SeNB addition request reject message may comprise at least an indication that the second base station does not support V2X services. The SeNB addition request reject message may comprise at least an indication that a SeNB addition target cell of the second base station does not support V2X services.

In an example, a first base station may transmit, to a second base station, an SeNB modification request message comprising indication parameters for a wireless device requesting an SeNB modification. The indication parameters may comprise at least a list of bearers for V2X services. The second base station may make a decision on accepting the SeNB modification request for a wireless device at least based on the at least V2X service indication parameter.

In an example, a first base station may transmit, to a second base station, an SeNB modification request message comprising indication parameters for a wireless device requesting an SeNB modification. The indication parameters may comprise at least a list of bearers for V2X services. The second base station may accept the SeNB modification request for a wireless device at least based on the at least V2X service indication parameter. The second base station may transmit, to the first base station, an SeNB modification request acknowledge message comprising a notification that the second base station accepts the SeNB modification request of the first base station for the wireless device, and/or a list of bearers for V2X services accepted by the second base station. The SeNB modification request acknowledge message may comprise at least a list of bearers not admitted with a cause that V2X services are not supported in a cell of the second base station and/or the second base station.

In an example, a first base station may transmit, to a second base station, an SeNB modification request message comprising indication parameters for a wireless device requesting an SeNB modification. The indication parameters may comprise at least a list of bearers for V2X services. The second base station may accept the SeNB modification request for a wireless device at least based on the at least V2X service indication parameter. The second base station may transmit, to the first base station, an SeNB modification request acknowledge message comprising a notification that the second base station accepts the SeNB addition request of the first base station for the wireless device, and/or a list of bearers for V2X services accepted by the second base station. The first base station may transmit at least one third message to the wireless device. The third message may initiate a SeNB modification of the wireless device for the second base station.

In an example, a second base station may accept an SeNB modification request for a wireless device at least based on the at least V2X service indication parameter included in an SeNB modification request message from a first base station. The second base station may make an SeNB initiated SeNB modification decision for the wireless device after completing the SeNB modification procedure. The second base station may at least take into account at least that the wireless device needs at least the list of bearers accepted by the second base station for the V2X services.

In an example, a second base station may accept an SeNB modification request for a wireless device at least based on the at least V2X service indication parameter included in an SeNB modification request message from a first base station. The second base station may make an SeNB initiated SeNB release decision for the wireless device after completing the SeNB modification procedure. The second base station may at least take into account at least that the wireless device needs at least the list of bearers accepted by the second base station for the V2X services.

In an example, a first base station may transmit, to a second base station, an SeNB modification request message comprising indication parameters for a wireless device requesting an SeNB modification. The indication parameters may comprise at least a list of bearers for V2X services. The second base station may reject the SeNB modification request for a wireless device at least based on the at least V2X service indication parameter. The second base station may transmit, to the first base station, an SeNB modification request reject message comprising a notification that the second base station rejects the SeNB modification request of the first base station for the wireless device. The SeNB modification request reject message may comprise at least an indication that the second base station does not support V2X services. The SeNB modification request reject message may comprise at least an indication that a SeNB addition target cell of the second base station does not support V2X services.

In an example, a UE with V2X services may add another cell of an SeNB in addition to a current serving cell of an MeNB. In an example, a UE with V2X services may modify cell of an SeNB in a dual connectivity configuration. An MeNB may send an SeNB addition request and/or an SeNB modification request to an SeNB. An SeNB receiving an SeNB addition request and/or an SeNB modification request for a UE with V2X services may decide whether it will accept the SeNB addition request and/or the SeNB modification request or not. The current X2 protocol and SeNB addition and/or MeNB initiated SeNB modification mechanisms/signaling may require enhancements to enable an SeNB to make a decision on accepting an SeNB addition request and/or an SeNB modification request for a UE and improve an SeNB addition preparation procedure and/or an MeNB initiated SeNB modification preparation procedure for the UE with V2X services. In the legacy network, SeNB addition and/or MeNB initiated SeNB modification of a UE with V2X services may fail or V2X services may be interrupted due to SeNB addition and/or MeNB initiated SeNB modification.

Example embodiments may improve the SeNB addition preparation procedure and/or the MeNB initiated SeNB modification preparation procedure for a UE with V2X services. Example embodiments provide enhancements to current SeNB addition and/or MeNB initiated SeNB modification mechanism and increase V2X service reliability and continuity. In an example embodiment, a UE with V2X services may continue the V2X service that is provided to the UE after adding another cell of an SeNB, or a UE without V2X services may initiate a V2X service after adding another cell of an SeNB. In an example embodiment, a UE with V2X services may continue the V2X service after modifying a cell of an SeNB, or a UE without V2X services may initiate a V2X service after modifying a cell of an SeNB. Example embodiments enables a serving UE to continue its V2X service or initiate its V2X service when it is adding and/or modifying cells in an area covered by multiple eNBs. Example embodiments enable an SeNB to make a decision on accepting an SeNB addition request and/or an SeNB modification request for a UE with an existing V2X service, or for a UE initiating a V2X service. Example embodiments may enhance network performance by enabling an SeNB to employ a purpose of an SeNB addition request and/or an MeNB initiated SeNB modification request of a UE with V2X services from an MeNB. Example embodiments may enable an SeNB receiving an SeNB addition request and/or an SeNB modification request to make an SeNB initiated SeNB release decision and/or an SeNB initiated SeNB modification decision for a UE with V2X services in the future.

In an example embodiment, in FIG. 13, a MeNB may transmit a first message to a SeNB. The SeNB may transmit a second message to the MeNB. The first message for example may be an SeNB addition request message. The second message may be an SeNB addition request acknowledge message. The first message and the second message may be exchanged as a part of an SeNB addition preparation procedure.

In an example embodiment, the MeNB may transfer to the SeNB the information that a UE requesting an SeNB addition may continue V2X services or initiate a V2X service after adding another cell of the SeNB (or after adding the SeNB). For example, the first message may comprise information that a UE requesting an SeNB addition may require V2X services in a cell of the SeNB (or in the SeNB). In an example, an SeNB addition request message may be used to transfer this information from the information sending eNB (MeNB) to the information receiving eNB (SeNB).

In an example, in the SeNB addition preparation procedure, the SeNB addition request message may comprise the information whether a UE requesting an SeNB addition requires V2X services after completing a SeNB addition preparation procedure or not. The SeNB addition request message may contain information indicating whether the UE requesting a SeNB addition requires V2X services or not. In an example, the SeNB addition request message may comprise one or more V2X service indications required by a UE requesting an SeNB addition. For example, the message may indicate one or more PLMN IDs of the V2X services, various types of V2X services (e.g. V2V, V2N, V2P, V2I, and/or the like), MBSFN or SC-PTM services and/or parameters for V2X downlink, uplink V2X services requirements (SPS requirements, etc), sidelink V2X services requirements, TMGIs of the V2X services and/or other information related to V2X services required a UE. In an example an IE may include whether a cell is only for V2x or it may support both data and V2X. In an example an IE may include whether the node has RSU and/or eNB capabilities. In an example an IE may indicate whether a PLMN is only for V2x or for both V2X and data. In an example an IE may indicate the TMGI.

In an example, in the SeNB addition preparation procedure, an SeNB addition request reject message may comprise the information that an SeNB addition request for a UE may not be allowed because a SeNB addition target cell of the information sending eNB (SeNB) and/or the information sending eNB (SeNB) may not support V2X services. In an example, the Cause IE in the SeNB addition request reject message may contain information that a SeNB addition request for a UE may be rejected because a SeNB addition target cell of the information sending eNB (SeNB) and/or the information sending eNB (SeNB) may not support V2X services.

In an example, in the SeNB addition preparation procedure, the SeNB addition request message may comprise the information that the SeNB addition request may be to offload the data traffic of the message sending eNB (MeNB) toward the message receiving eNB (SeNB) for a load balancing between cells and/or between eNBs. In an example, the Cause IE defined in the handover request message for the X2 mobility procedure may be defined in the SeNB addition request message in order to contain the information that the message sending eNB (MeNB) may offload its data traffic toward the message receiving eNB (SeNB) for a load balancing between cells and/or between eNBs.

In an example embodiment, in FIG. 14, a MeNB may transmit a first message to a SeNB. The SeNB may transmit a second message to the MeNB. The first message for example may be an SeNB modification request message. The second message may be an SeNB modification request acknowledge message. The first message and the second message may be exchanged as a part of an MeNB initiated SeNB modification preparation procedure.

In an example embodiment, the MeNB may transfer to the SeNB the information that a UE requesting an SeNB modification may continue V2X services or initiate a V2X service after modifying a cell of the SeNB (or after modifying the SeNB). For example, the first message may comprise information that a UE requesting an SeNB modification may require V2X services in a cell of the SeNB (or in the SeNB). In an example, a SeNB modification request message may be used to transfer this information from the information sending eNB (MeNB) to the information receiving eNB (SeNB).

In an example, in the MeNB initiated SeNB modification preparation procedure, the SeNB modification request message may comprise the information whether a UE requesting an SeNB modification requires V2X services after completing a SeNB modification preparation procedure or not. The SeNB modification request message may contain information indicating whether the UE requesting an SeNB modification requires V2X services or not. In an example, the SeNB modification request message may comprise one or more V2X service indications required by a UE requesting an SeNB modification. For example, the message may indicate one or more PLMN IDs of the V2X services, various types of V2X services (e.g. V2V, V2N, V2P, V2I, and/or the like), MBSFN or SC-PTM services and/or parameters for V2X downlink, uplink V2X services requirements (SPS requirements, etc), sidelink V2X services requirements, TMGIs of the V2X services and/or other information related to V2X services required a UE. In an example an IE may include whether a cell is only for V2x or it may support both data and V2X. In an example an IE may include whether the node has RSU and/or eNB capabilities. In an example an IE may indicate whether a PLMN is only for V2x or for both V2X and data. In an example an IE may indicate the TMGI.

In an example, in the MeNB initiated SeNB modification preparation procedure, an SeNB modification request reject message may comprise the information that an SeNB modification request for a UE may not be allowed because a SeNB modification target cell of the information sending eNB (SeNB) and/or the information sending eNB (SeNB) may not support V2X services. In an example, the Cause IE in the SeNB modification request reject message may contain information that a SeNB modification request for a UE may be rejected because a SeNB modification target cell of the information sending eNB (SeNB) and/or the information sending eNB (SeNB) may not support V2X services.

In an example, in the MeNB initiated SeNB modification preparation procedure, the SeNB modification request message may comprise the information that the SeNB modification request may be to offload the data traffic of the message sending eNB (MeNB) toward the message receiving eNB (SeNB) for a load balancing between cells and/or between eNBs. In an example, the Cause IE defined in the handover request message for the X2 mobility procedure may be defined in the SeNB modification request message in order to contain the information that the message sending eNB (MeNB) may offload its data traffic toward the message receiving eNB (SeNB) for a load balancing between cells and/or between eNBs.

In an example, a first base station may transmit, to a second base station, an SeNB addition request message comprising indication parameters for a wireless device requesting an SeNB addition. The indication parameters may comprise at least V2X service indication parameter. The second base station may make a decision on accepting the SeNB addition request for a wireless device at least based on the at least V2X service indication parameter.

In an example, a first base station may transmit, to a second base station, an SeNB addition request message comprising indication parameters for a wireless device requesting an SeNB addition. The indication parameters may comprise at least V2X service indication parameter. The second base station may accept the SeNB addition request for a wireless device at least based on the at least V2X service indication parameter. The second base station may transmit, to the first base station, an SeNB addition request acknowledge message comprising a notification that the second base station accepts the SeNB addition request of the first base station for the wireless device.

In an example, a first base station may transmit, to a second base station, an SeNB addition request message comprising indication parameters for a wireless device requesting an SeNB addition. The indication parameters may comprise at least V2X service indication parameter. The second base station may accept the SeNB addition request for a wireless device at least based on the at least V2X service indication parameter, The second base station may transmit, to the first base station, an SeNB addition request acknowledge message comprising a notification that the second base station accepts the SeNB addition request of the first base station for the wireless device. The first base station may transmit at least one third message to the wireless device. The third message may initiate an SeNB addition of the wireless device to the second base station.

In an example, a second base station may accept an SeNB addition request for a wireless device at least based on the at least V2X service indication parameter included in an SeNB addition request message from a first base station. The second base station may make an SeNB initiated SeNB modification decision for the wireless device after completing the SeNB addition procedure. The second base station at least may take into account at least that the first base station initiated the SeNB addition at least based on the V2X services required by the wireless device.

In an example, a second base station may accept an SeNB addition request for a wireless device at least based on the at least V2X service indication parameter included in an SeNB addition request message from a first base station. The second base station may make an SeNB initiated SeNB release decision for the wireless device after completing the SeNB addition procedure. The second base station may at least take into account at least that the first base station initiated the SeNB addition at least based on the V2X services required by the wireless device.

In an example, a first base station may transmit, to a second base station, an SeNB addition request message comprising indication parameters for a wireless device requesting an SeNB addition. The indication parameters may comprise at least V2X service indication parameter. The second base station may reject the SeNB addition request for a wireless device at least based on the at least V2X service indication parameter. The second base station may transmit, to the first base station, an SeNB addition request reject message comprising a notification that the second base station rejects the SeNB addition request of the first base station for the wireless device. The SeNB addition request reject message may comprise at least an indication that the second base station does not support V2X services. The SeNB addition request reject message may comprise at least an indication that a SeNB addition target cell of the second base station does not support V2X services.

In an example, a first base station may transmit, to a second base station, an SeNB modification request message comprising indication parameters for a wireless device requesting an SeNB modification. The indication parameters may comprise at least V2X service indication parameter. The second base station may make a decision on accepting the SeNB modification request for a wireless device at least based on the at least V2X service indication parameter.

In an example, a first base station may transmit, to a second base station, an SeNB modification request message comprising indication parameters for a wireless device requesting an SeNB modification. The indication parameters may comprise at least V2X service indication parameter. The second base station may accept the SeNB modification request for a wireless device at least based on the at least V2X service indication parameter. The second base station may transmit, to the first base station, an SeNB modification request acknowledge message comprising a notification that the second base station accepts the SeNB modification request of the first base station for the wireless device.

In an example, a first base station may transmit, to a second base station, an SeNB modification request message comprising indication parameters for a wireless device requesting an SeNB modification. The indication parameters may comprise at least V2X service indication parameter. The second base station may accept the SeNB modification request for a wireless device at least based on the at least V2X service indication parameter. The second base station may transmit, to the first base station an SeNB modification request acknowledge message comprising a notification that the second base station accepts the SeNB modification request of the first base station for the wireless device. The first base station may transmit, to the wireless device, at least one third message. The third message may initiate a SeNB modification of the wireless device for the second base station.

In an example, the second base station may accept an SeNB modification request for a wireless device at least based on the at least V2X service indication parameter included in an SeNB modification request message from a first base station. The second base station may make an SeNB initiated SeNB modification decision for the wireless device after completing the SeNB modification procedure. The second base station may at least take into account at least that the first base station initiated the SeNB modification at least based on the V2X services required by the wireless device.

In an example, the second base station may accept an SeNB modification request for a wireless device at least based on the at least V2X service indication parameter included in an SeNB modification request message from a first base station. The second base station may make an SeNB initiated SeNB release decision for the wireless device after completing the SeNB modification procedure. The second base station may at least take into account at least that the first base station initiated the SeNB modification at least based on the V2X services required by the wireless device.

In an example, a first base station may transmit, to a second base station, an SeNB modification request message comprising indication parameters for a wireless device requesting an SeNB modification. The indication parameters may comprise at least V2X service indication parameter. The second base station may reject the SeNB modification request for a wireless device at least based on the at least V2X service indication parameter. The second base station may transmit, to the first base station, an SeNB modification request reject message comprising a notification that the second base station rejects the SeNB modification request of the first base station for the wireless device. The SeNB modification request reject message may comprise at least an indication that the second base station does not support V2X services. The SeNB modification request reject message may comprise at least an indication that a SeNB modification target cell of the second base station does not support V2X services.

According to various embodiments, a device (such as, for example, a wireless device, an off-network wireless device, a base station, and/or the like), may comprise, for example, one or more processors and memory. The memory may store instructions that, when executed by the one or more processors, cause the device to perform a series of actions. Embodiments of example actions are illustrated in the accompanying figures and specification. Features from various embodiments may be combined to create yet further embodiments.

Figure 15:
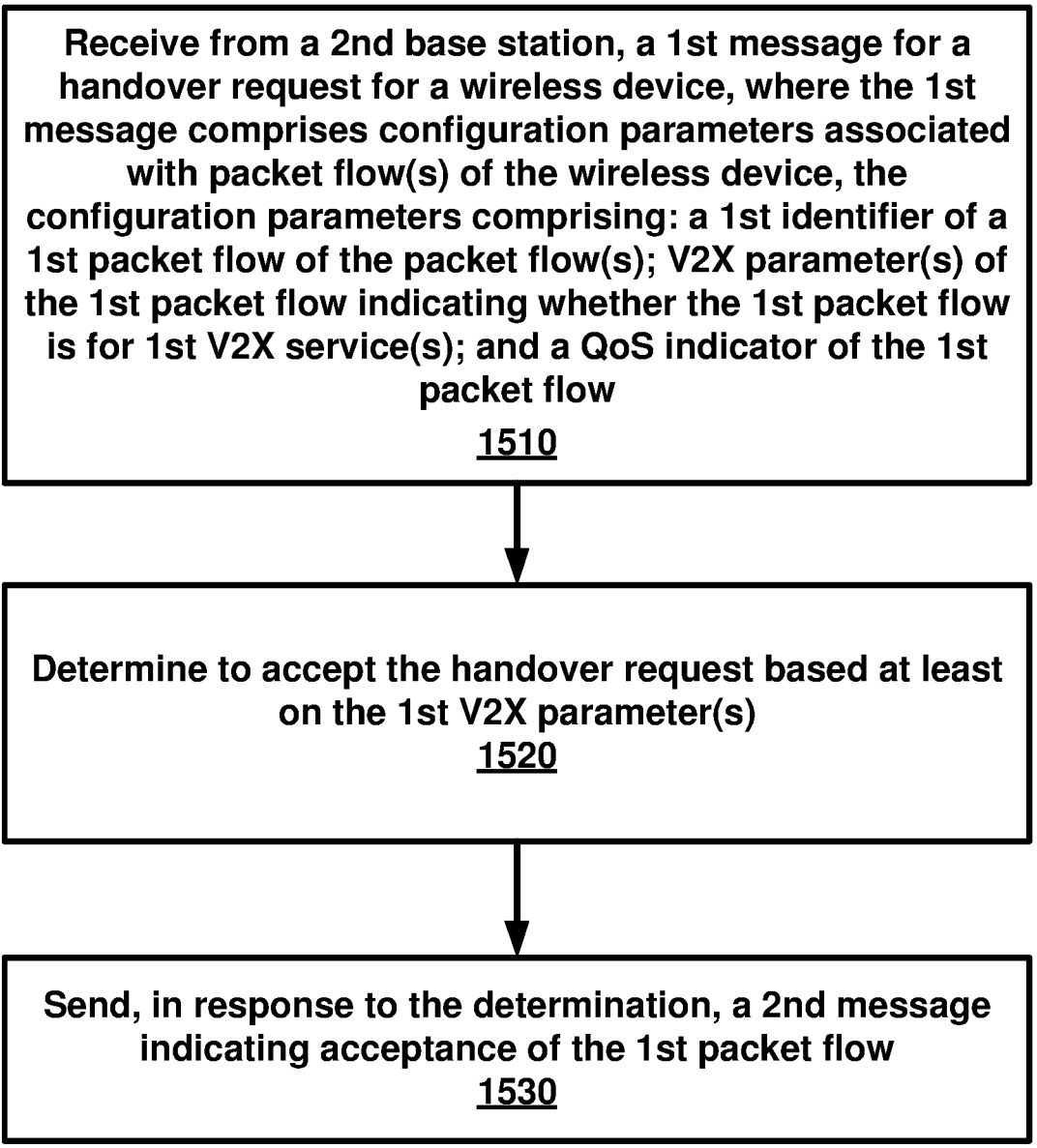
FIG. 15 is an example flow diagram as per an aspect of an embodiment of the present disclosure.

FIG. 15 is an example flow diagram as per an aspect of an embodiment of the present disclosure. At 1510, a first base station may receive from a second base station, a first message for a handover request for a wireless device. The first message may comprise configuration parameters associated with one or more packet flows of the wireless device. The configuration parameters may comprise: a first identifier of a first packet flow of the one or more packets; at least one first vehicle-to-everything (V2X) parameter of the first packet flow indicating whether the first packet flow is for at least one first V2X service; and a quality of service (QoS) indicator of the first packet flow. At 1520, the first base station may determine to accept the handover request based at least on the at least one first V2X parameter. At 530, the first base station may send, in response to the determining, a second message indicating acceptance of the first packet flow.

According to an embodiment, the configuration parameters may further comprise: a second identifier of a second packet flow of the one or more packet flows; at least one second V2X parameter of the second packet flow indicating whether the second packet flow is for at least one second V2X service; and a second QoS indicator of the second packet flow. According to an embodiment, the second base station may further receive a third message comprising the at least one first V2X parameter. The third message may be received from: a core network entity; or a third base station. According to an embodiment, the first base station may further make a handover decision for the wireless device based at least on the at least one first V2X parameter. According to an embodiment, the at least one first V2X parameter may further indicate that the first packet flow is associated with at least one of: at least one vehicle-to-vehicle (V2V) service; at least one vehicle-to-network (V2N) services; at least one vehicle-to-pedestrian (V2P) services; or at least one vehicle-to-infrastructure (V2I) services. According to an embodiment, the at least one first V2X parameter may further indicate that the first packet flow is associated with at least one of: at least one multimedia broadcast multicast service single frequency network (MBSFN) based V2X service; at least one single cell point to multipoint (SC-PTM) based V2X service; or at least one sidelink based V2X service. According to an embodiment, the at least one first V2X parameter may further indicate a temporary mobile group identity (TMGI) associated with the first packet flow; or the at least one first V2X parameter may further indicate a semi-persistent scheduling (SPS) requirement for the first packet flow.

FIG. 16 is an example flow diagram as per an aspect of an embodiment of the present disclosure. At 1610, a first base station may send to a second base station, a first message for a handover request for a wireless device. The first message may comprise configuration parameters associated with one or more packet flows of the wireless device. The configuration parameters may comprise: a first identifier of a first packet flow of the one or more packets; at least one first vehicle-to-everything (V2X) parameter of the first packet flow indicating whether the first packet flow is for at least one first V2X service; and a quality of service (QoS) indicator of the first packet flow. At 1620, the first base station may receive a second message indicating acceptance of the first packet flow. The acceptance may be determined based at least on the at least one first V2X parameter. The second message may comprise one or more configuration parameters for the wireless device. At 1630, the first base station may transmit to the wireless device, a handover command message comprising the one or more configuration parameters.

According to an embodiment, the configuration parameters may further comprise: a second identifier of a second packet flow of the one or more packet flows; at least one second V2X parameter of the second packet flow indicating whether the second packet flow is for at least one second V2X service; and a second QoS indicator of the second packet flow. According to an embodiment, the first base station may further receive a third message comprising the at least one first V2X parameter. The third message may be received from: a core network entity; or a third base station. According to an embodiment, the second base station may further make a handover decision for the wireless device based at least on the at least one first V2X parameter. According to an embodiment, the at least one first V2X parameter may further indicate that the first packet flow is associated with at least one of: at least one vehicle-to-vehicle (V2V) service; at least one vehicle-to-network (V2N) service; at least one vehicle-to-pedestrian (V2P) service; or at least one vehicle-to-infrastructure (V2I) service. According to an embodiment, the at least one first V2X parameter may further indicate that the first packet flow is associated with at least one of: at least one multimedia broadcast multicast service single frequency network (MBSFN) based V2X service; at least one single cell point to multipoint (SC-PTM) based V2X service; or at least one sidelink based V2X service. According to an embodiment, the at least one first V2X parameter may further indicate a temporary mobile group identity (TMGI) associated with the first packet flow; or the at least one first V2X parameter may further indicate a semi-persistent scheduling requirement for the first packet flow.

Figure 17:
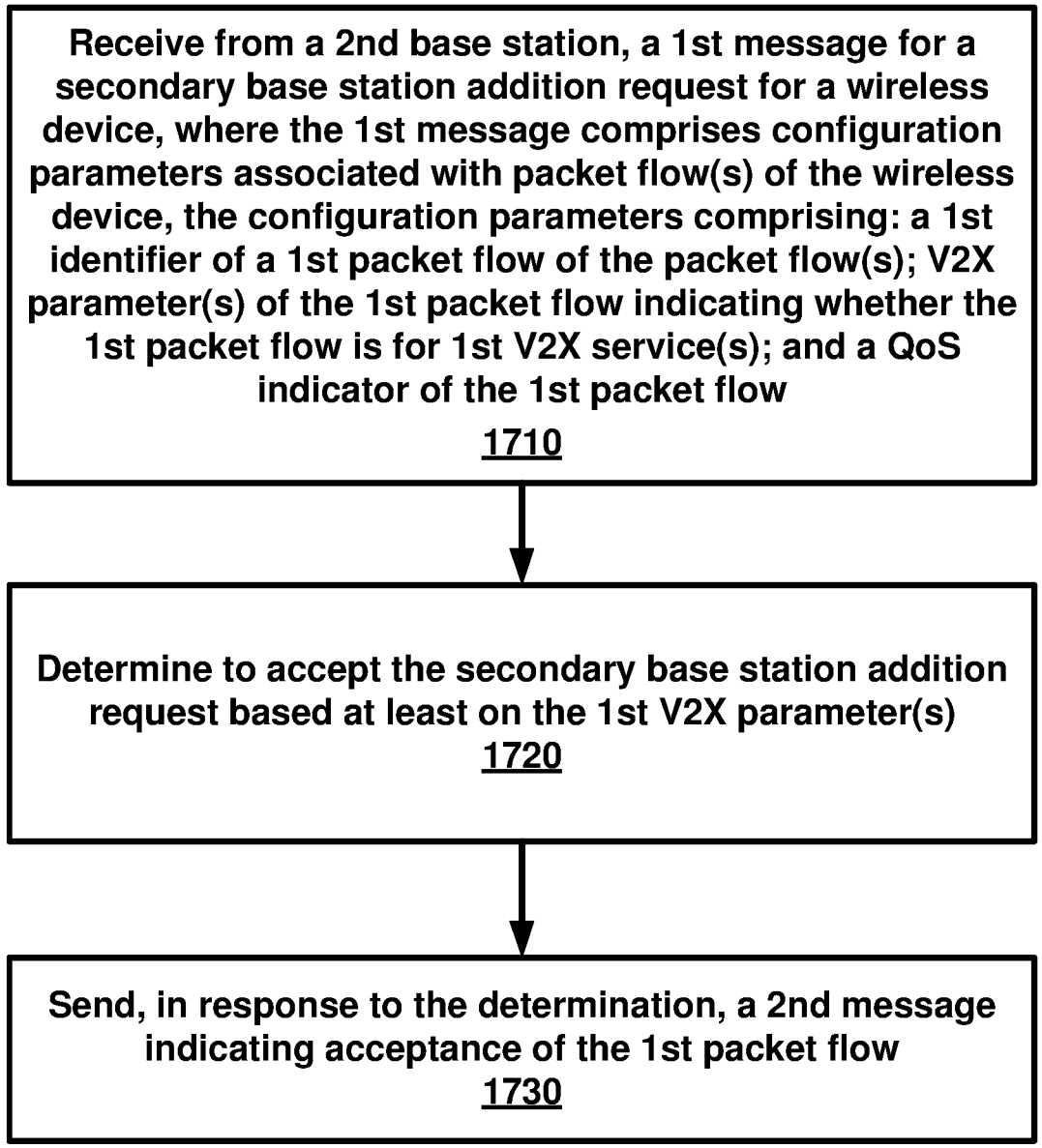
FIG. 17 is an example flow diagram as per an aspect of an embodiment of the present disclosure.

FIG. 17 is an example flow diagram as per an aspect of an embodiment of the present disclosure. At 1710, a first base station may receive from a second base station, a first message for a secondary base station addition request for a wireless device. The first message may comprise configuration parameters associated with one or more packet flows of the wireless device. The configuration parameters may comprise: a first identifier of a first packet flow of the one or more packets; at least one first V2X parameter of the first packet flow indicating whether the first packet flow is for at least one first V2X service; and a quality of service (QoS) indicator of the first packet flow. At 1720, the first base station may determine to accept the secondary base station addition request based at least on the at least one first V2X parameter. At 1730, the first base station may send, in response to the determination, a second message indicating acceptance of the first packet flow. According to an embodiment, the configuration parameters may further comprise: a second identifier of a second packet flow of the one or more packet flows; at least one second V2X parameter of the second packet flow indicating whether the second packet flow is for at least one second V2X services; and a second quality of service (QoS) indicator of the second packet flow.

Figure 18:
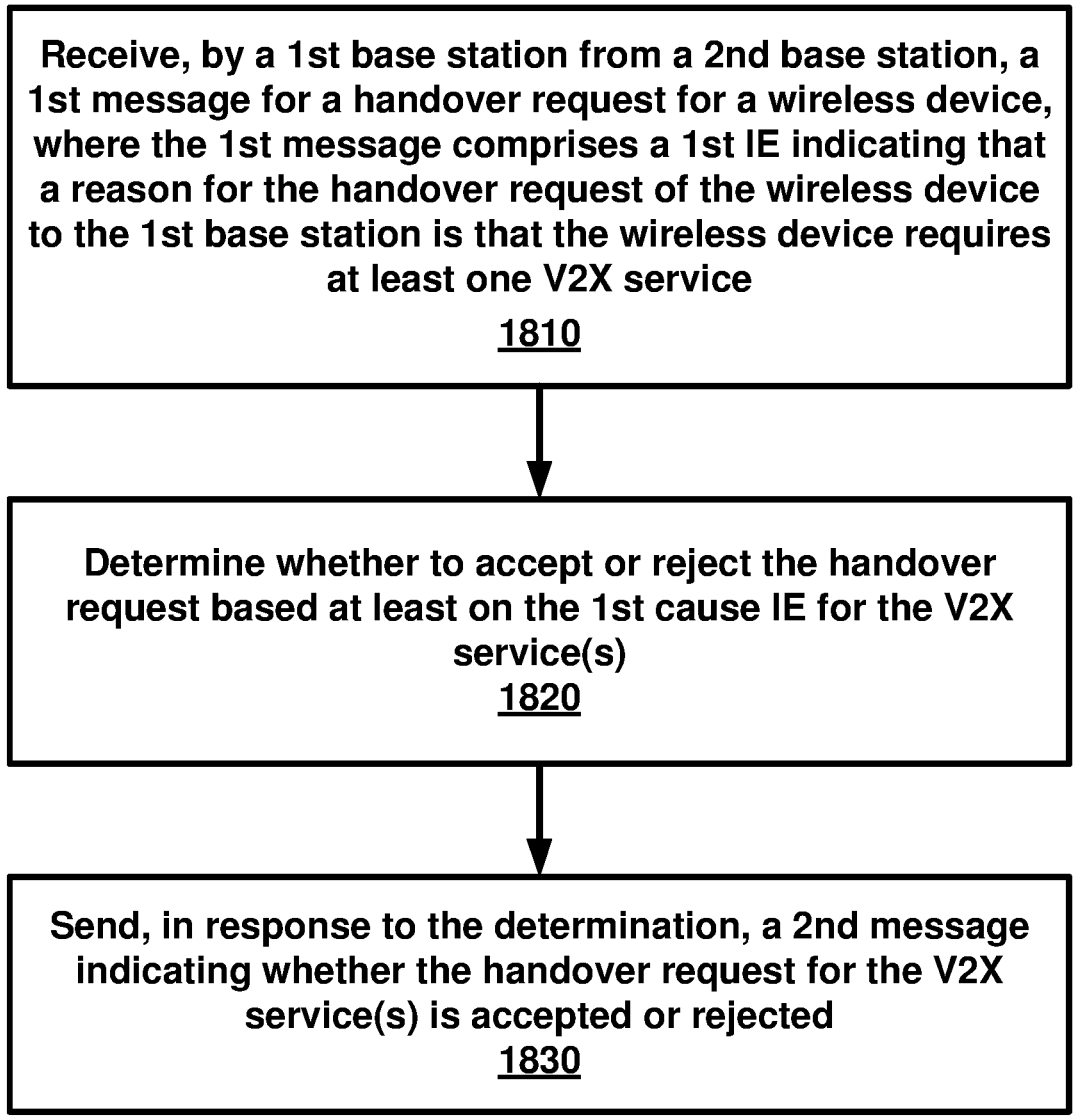
FIG. 18 is an example flow diagram as per an aspect of an embodiment of the present disclosure.

FIG. 18 is an example flow diagram as per an aspect of an embodiment of the present disclosure. At 1810, a first base station may receive from a second base station, a first message for a handover request for a wireless device. The first message may comprise a first cause information element (IE) indicating that a reason for the handover request of the wireless device to the first base station is that the wireless device requires at least one V2X service. At 1820, the first base station may determine whether to accept or reject the handover request based at least on the first cause IE for the at least one V2X service. At 1830, the first base station may send, in response to the determination, a second message indicating whether the handover request for the at least one V2X service is accepted or rejected. According to an embodiment, the second message may comprise a second cause IE indicating that a reason for rejecting the handover request for the wireless device to the first base station is that at least one of the at least one V2X service is not supported by: the first base station; or one or more cells of the first base station.

Figure 19:
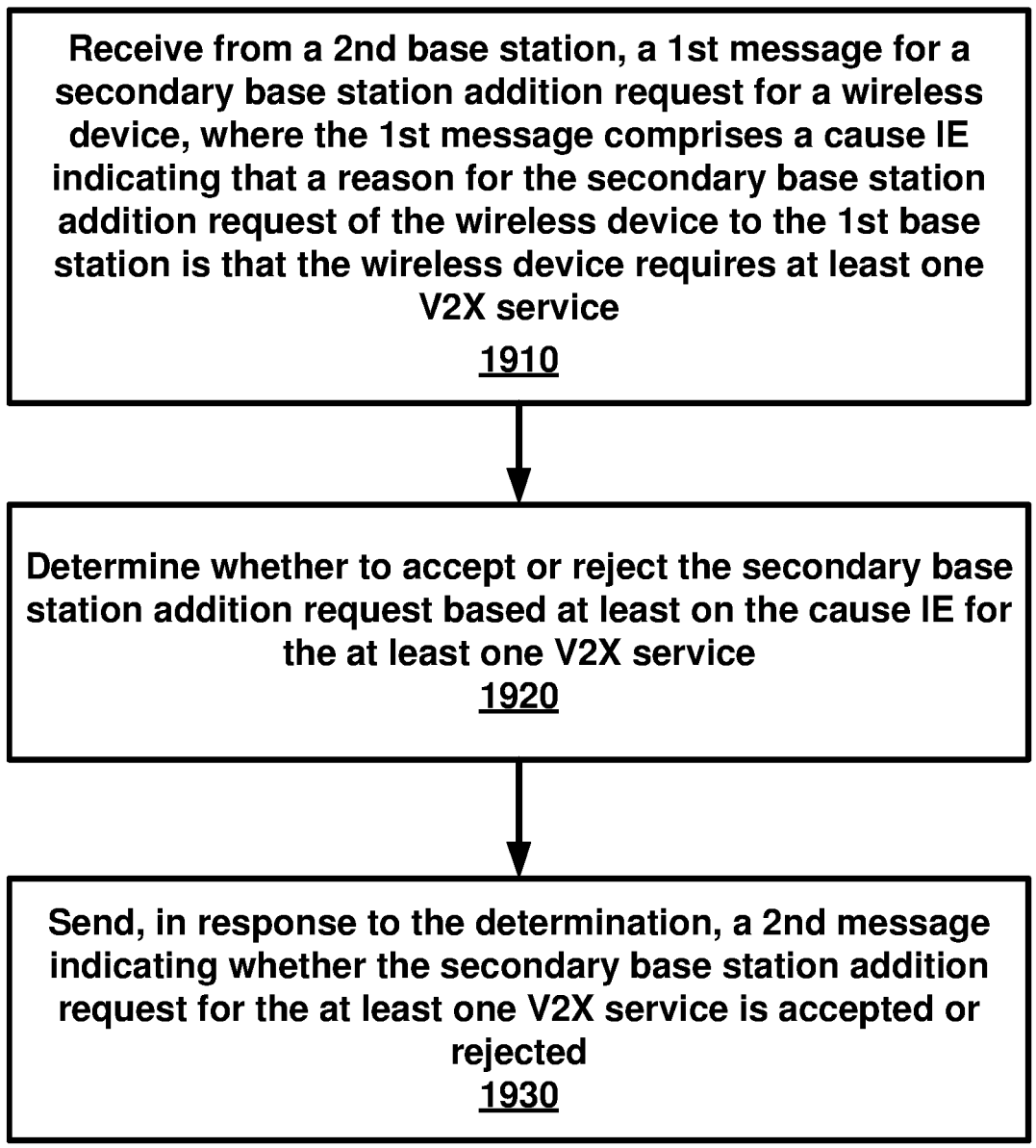
FIG. 19 is an example flow diagram as per an aspect of an embodiment of the present disclosure.

FIG. 19 is an example flow diagram as per an aspect of an embodiment of the present disclosure. At 1910, a first base station may receive from a second base station, a first message for a secondary base station addition request for a wireless device. The first message may comprise a cause information element (IE) indicating that a reason for the secondary base station addition request of the wireless device to the first base station is that the wireless device requires at least one V2X service. At 1920, the first base station may determine whether to accept or reject the secondary base station addition request based at least on the cause IE for the at least one V2X service. At 1920, the first base station, in response to the determination, may send a second message indicating whether the secondary base station addition request for the at least one V2X service is accepted or rejected. According to an embodiment, the second message may comprise a second cause IE indicating that a reason for rejecting the secondary base station addition request for the wireless device to the first base station is that at least one of the at least one V2X service is not supported by: the first base station; or one or more cells of the first base station.

Figure 20:
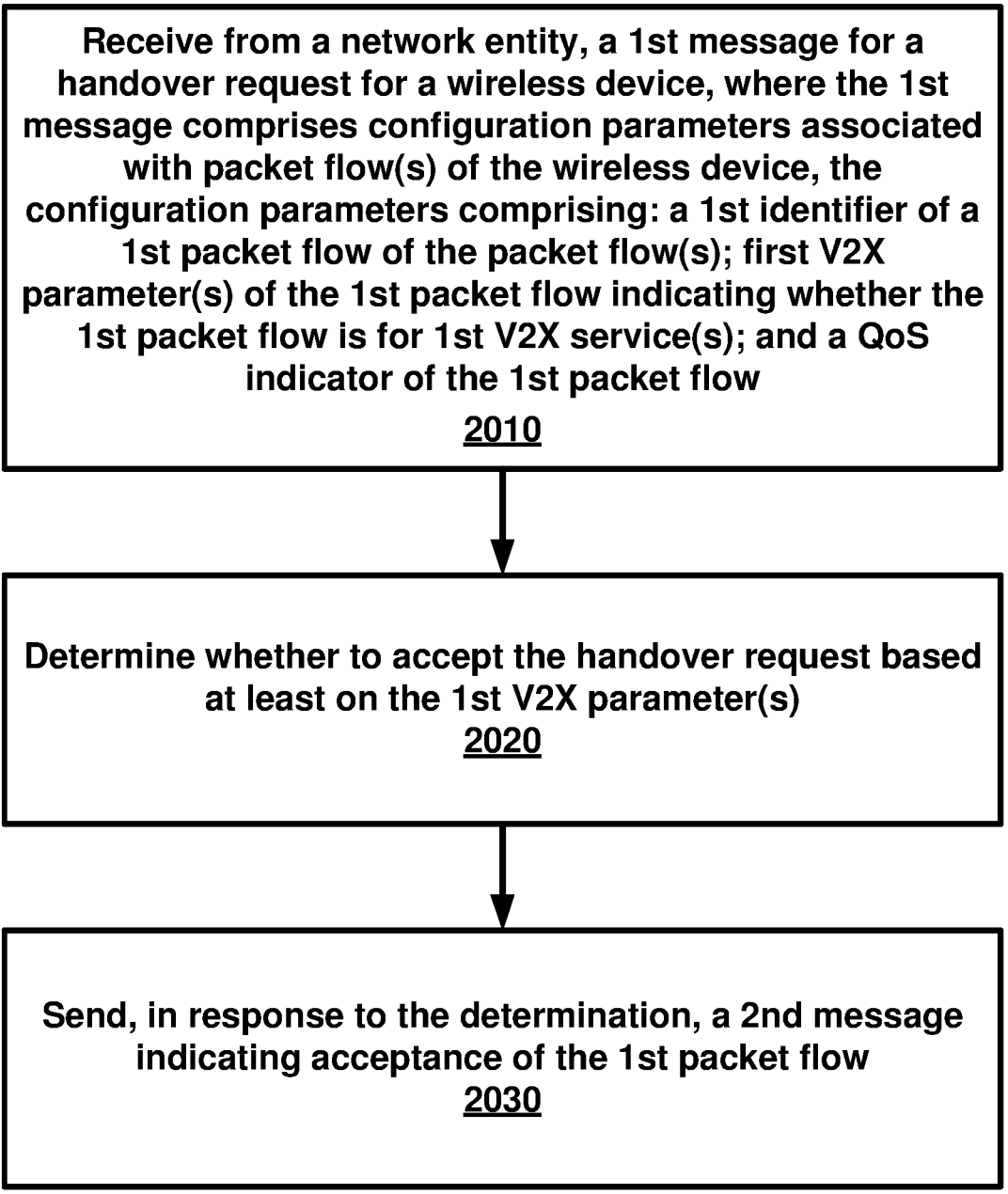
FIG. 20 is an example flow diagram as per an aspect of an embodiment of the present disclosure.

FIG. 20 is an example flow diagram as per an aspect of an embodiment of the present disclosure. At 2010, a first base station may receive from a second base station, a first message for a handover request for a wireless device. The first message may comprise configuration parameters associated with one or more packet flows of the wireless device.

The configuration parameters may comprise: a first identifier of a first packet flow of the one or more packets; at least one first V2X parameter of the first packet flow indicating whether the first packet flow is for at least one first V2X service; and a quality of service (QoS) indicator of the first packet flow. At 2020, the first base station may determine to accept the handover request based at least on the at least one first V2X parameter. At 2030, the first base station, in response to the determination, may send a second message indicating acceptance of the first packet flow.

According to an embodiment, the configuration parameters may further comprise: a second identifier of a second packet flow of the one or more packet flows; at least one second V2X parameter of the second packet flow indicating whether the second packet flow is for at least one second V2X services; and a second quality of service (QoS) indicator of the second packet flow. According to an embodiment, the network entity may comprise one of: a second base station; or a first core network entity.

In this specification, "a" and "an" and similar phrases are to be interpreted as "at least one" and "one or more." In this specification, the term "may" is to be interpreted as "may, for example." In other words, the term "may" is indicative that the phrase following the term "may" is an example of one of a multitude of suitable possibilities that may, or may not, be employed to one or more of the various embodiments. If A and B are sets and every element of A is also an element of B, A is called a subset of B. In this specification, only non-empty sets and subsets are considered. For example, possible subsets of B={cell1, cell2} are: {cell1}, {cell2}, and {cell1, cell2}.

In this specification, parameters (Information elements: IEs) may comprise one or more objects, and each of those objects may comprise one or more other objects. For example, if parameter (IE) N comprises parameter (IE) M, and parameter (IE) M comprises parameter (IE) K, and parameter (IE) K comprises parameter (information element) J, then, for example, N comprises K, and N comprises J. In an example embodiment, when one or more messages comprise a plurality of parameters, it implies that a parameter in the plurality of parameters is in at least one of the one or more messages, but does not have to be in each of the one or more messages.

Many of the elements described in the disclosed embodiments may be implemented as modules. A module is defined here as an isolatable element that performs a defined function and has a defined interface to other elements. The modules described in this disclosure may be implemented in hardware, software in combination with hardware, firmware, wetware (i.e hardware with a biological element) or a combination thereof, all of which are behaviorally equivalent. For example, modules may be implemented as a software routine written in a computer language configured to be executed by a hardware machine (such as C, C++, Fortran, Java, Basic, Matlab or the like) or a modeling/simulation program such as Simulink, Stateflow, GNU Octave, or LabVIEWMathScript. Additionally, it may be possible to implement modules using physical hardware that incorporates discrete or programmable analog, digital and/or quantum hardware. Examples of programmable hardware comprise: computers, microcontrollers, microprocessors, application-specific integrated circuits (ASICs); field programmable gate arrays (FPGAs); and complex programmable logic devices (CPLDs). Computers, microcontrollers and microprocessors are programmed using languages such as assembly, C, C++ or the like. FPGAs, ASICs and CPLDs are often programmed using hardware description languages (HDL) such as VHSIC hardware description language (VHDL) or Verilog that configure connections between internal hardware modules with lesser functionality on a programmable device. Finally, it needs to be emphasized that the above mentioned technologies are often used in combination to achieve the result of a functional module.

The disclosure of this patent document incorporates material which is subject to copyright protection. The copyright owner has no objection to the facsimile reproduction by anyone of the patent document or the patent disclosure, as it appears in the Patent and Trademark Office patent file or records, for the limited purposes required by law, but otherwise reserves all copyright rights whatsoever.

While various embodiments have been described above, it should be understood that they have been presented by way of example, and not limitation. It will be apparent to persons skilled in the relevant art(s) that various changes in form and detail can be made therein without departing from the spirit and scope. In fact, after reading the above description, it will be apparent to one skilled in the relevant art(s) how to implement alternative embodiments. Thus, the present embodiments should not be limited by any of the above described exemplary embodiments. In particular, it should be noted that, for example purposes, the above explanation has focused on the example(s) using FDD communication systems. However, one skilled in the art will recognize that embodiments of the invention may also be implemented in a system comprising one or more TDD cells (e.g. frame structure 2 and/or frame structure 3-licensed assisted access). The disclosed methods and systems may be implemented in wireless or wireline systems. The features of various embodiments presented in this invention may be combined. One or many features (method or system) of one embodiment may be implemented in other embodiments. Only a limited number of example combinations are shown to indicate to one skilled in the art the possibility of features that may be combined in various embodiments to create enhanced transmission and reception systems and methods.

In addition, it should be understood that any figures which highlight the functionality and advantages, are presented for example purposes only. The disclosed architecture is sufficiently flexible and configurable, such that it may be utilized in ways other than that shown. For example, the actions listed in any flowchart may be re-ordered or only optionally used in some embodiments.

Further, the purpose of the Abstract of the Disclosure is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The Abstract of the Disclosure is not intended to be limiting as to the scope in any way.

Finally, it is the applicant's intent that only claims that include the express language "means for" or "step for" be interpreted under 35 U.S.C. 112, paragraph 6. Claims that do not expressly include the phrase "means for" or "step for" are not to be interpreted under 35 U.S.C. 112.

The invention claimed is:
1. A method comprising:
  receiving, by a first base station, a handover request indicating for each packet flow of packet flows of a wireless device:
    whether the packet flow is for at least one vehicle-to-everything (V2X) service; and
    a quality-of-service indicator of the packet flow;

determining whether to accept each packet flow of the packet flows based on whether the packet flow is for the at least one V2X service; and sending, by the first base station, an indication of an acceptance or rejection of each packet flow of the packet flows.

2. The method of claim 1, wherein the indication comprises configuration parameters associated with the at least one V2X service for the wireless device.

3. The method of claim 2, further comprising transmitting, by a second base station to the wireless device, a handover command comprising the configuration parameters, wherein the sending the indication comprises sending the indication by the first base station to the second base station.

4. The method of claim 1, further comprising receiving, by a second base station, a message indicating whether the packet flow is for the at least one V2X service, wherein:
the receiving the message comprises receiving the message from at least one of:
a core network entity; or
a third base station; and
the receiving the handover request comprises receiving the handover request by the first base station from the second base station.

5. The method of claim 1, further comprising determining, by the first base station, whether to accept the handover request for the wireless device based on whether the packet flow is for the at least one V2X service.

6. The method of claim 1, wherein the handover request indicates whether the packet flow is for at least one of:
a vehicle-to-vehicle (V2V) service;
a vehicle-to-network (V2N) services;
a vehicle-to-pedestrian (V2P) services; or
a vehicle-to-infrastructure (V2I) services.

7. The method of claim 1, wherein the handover request indicates whether the packet flow is for at least one of:
a multimedia broadcast multicast service single frequency network (MBSFN) service;
a single cell point to multipoint (SC-PTM) service; or
a sidelink-based V2X service.

8. The method of claim 1, wherein the handover request indicates a temporary mobile group identity (TMGI) associated with the packet flow.

9. The method of claim 1, wherein the handover request indicates a periodic resource scheduling requirement for the packet flow.

10. The method of claim 1, further comprising transmitting, by the first base station to the wireless device, packets via the packet flow.

11. A first base station comprising:
one or more processors;
memory storing instructions that, when executed by the one or more processors, cause the first base station to:
receive a handover request indicating for each packet flow of packet flows of a wireless device:
whether the packet flow is for at least one vehicle-to-everything (V2X) service; and
a quality-of-service indicator of the packet flow;
determine whether to accept each packet flow of the packet flows based on whether the packet flow is for the at least one V2X service; and
send an indication of an acceptance or rejection of each packet flow of the packet flows.

12. The first base station of claim 11, wherein the indication comprises configuration parameters associated with the at least one V2X service for the wireless device.

13. The first base station of claim 12, wherein:
a second base station sends, to the wireless device, a handover command comprising the configuration parameters; and
the sending the indication comprises sending the indication to the second base station.

14. The first base station of claim 11, wherein:
a second base station receives the indication of whether the packet flow is for the at least one V2X service from at least one of:
a core network entity; or
a third base station; and
the receiving the handover request comprises receiving the handover request by the first base station from the second base station.

15. The first base station of claim 11, wherein the instructions, when executed, further cause the first base station to determine whether to accept the handover request for the wireless device based on whether the packet flow is for the at least one V2X service.

16. The first base station of claim 11, wherein the handover request indicates whether the packet flow is for at least one of:
a vehicle-to-vehicle (V2V) service;
a vehicle-to-network (V2N) services;
a vehicle-to-pedestrian (V2P) services; or
a vehicle-to-infrastructure (V2I) services.

17. The first base station of claim 11, wherein the handover request indicates whether the packet flow is for at least one of:
a multimedia broadcast multicast service single frequency network (MBSFN) service;
a single cell point to multipoint (SC-PTM) service; or
a sidelink-based V2X service.

18. The first base station of claim 11, wherein the handover request indicates a temporary mobile group identity (TMGI) associated with the packet flow.

19. The first base station of claim 11, wherein the handover request indicates a periodic resource scheduling requirement for the packet flow.

20. The first base station of claim 11, wherein the instructions, when executed, further cause the first base station to transmit, to the wireless device, packets via the packet flow.

* * * * *